US012356066B2

(12) United States Patent
Liu

(10) Patent No.: US 12,356,066 B2
(45) Date of Patent: Jul. 8, 2025

(54) CAMERA INVOCATION METHOD AND SYSTEM, AND ELECTRONIC DEVICE

(71) Applicant: Huawei Technologies Co., Ltd., Shenzhen (CN)

(72) Inventor: Chang Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 239 days.

(21) Appl. No.: 18/037,719

(22) PCT Filed: Nov. 17, 2021

(86) PCT No.: PCT/CN2021/131243
§ 371 (c)(1),
(2) Date: May 18, 2023

(87) PCT Pub. No.: WO2022/105803
PCT Pub. Date: May 27, 2022

(65) Prior Publication Data
US 2023/0403458 A1 Dec. 14, 2023

(30) Foreign Application Priority Data

Nov. 20, 2020 (CN) .................. 202011315380.X

(51) Int. Cl.
H04N 23/63 (2023.01)
H04M 1/72403 (2021.01)
H04N 23/57 (2023.01)
H04N 23/69 (2023.01)

(52) U.S. Cl.
CPC ...... *H04N 23/632* (2023.01); *H04M 1/72403* (2021.01); *H04N 23/57* (2023.01); *H04N 23/69* (2023.01)

(58) Field of Classification Search
CPC ...... H04N 23/632; H04N 23/57; H04N 23/69; H04N 23/633; H04N 5/265; H04N 21/4223; H04N 21/4334; H04N 23/45; H04N 23/661; H04N 23/67; H04M 1/72403; H04M 1/72412; H04M 2250/52; H04M 1/72454
See application file for complete search history.

(56) References Cited

U.S. PATENT DOCUMENTS

| 9,729,781 B2* | 8/2017 | Cho ........................ H04N 5/772 |
| 10,318,574 B1* | 6/2019 | Bonechi ................ G06F 16/447 |
| 2018/0063361 A1 | 3/2018 | Goo et al. |
| 2019/0364194 A1* | 11/2019 | Penha .................... G11B 27/34 |
| 2020/0019213 A1 | 1/2020 | Lee |
| 2023/0188826 A1* | 6/2023 | Wu ........................ H04N 23/80 348/222.1 |

(Continued)

FOREIGN PATENT DOCUMENTS

| CN | 101594510 A | 12/2009 |
| CN | 106851103 A | 6/2017 |

(Continued)

*Primary Examiner* — Hung H Lam
(74) *Attorney, Agent, or Firm* — Conley Rose, P.C.

(57) ABSTRACT

A camera invocation method includes preview interfaces corresponding to a plurality of applications in an electronic device that simultaneously display an image captured in real time by a camera of the electronic device, where the applications share the camera.

20 Claims, 42 Drawing Sheets

Mobile phone

Tablet

(56) References Cited

U.S. PATENT DOCUMENTS

| | | | |
|---|---|---|---|
| 2023/0276136 A1* | 8/2023 | Cui | .................... H04N 23/667 348/226.1 |
| 2024/0129621 A1* | 4/2024 | Yi | ....................... G06F 3/04842 |
| 2024/0196082 A1* | 6/2024 | Wang | ..................... H04N 23/62 |

FOREIGN PATENT DOCUMENTS

| | | |
|---|---|---|
| CN | 107483812 A | 12/2017 |
| CN | 107592459 A | 1/2018 |
| CN | 107786794 A | 3/2018 |
| CN | 107948592 B | 3/2019 |
| CN | 110753187 A | 2/2020 |
| CN | 111818669 A | 10/2020 |
| JP | H0746568 A | 2/1995 |

* cited by examiner

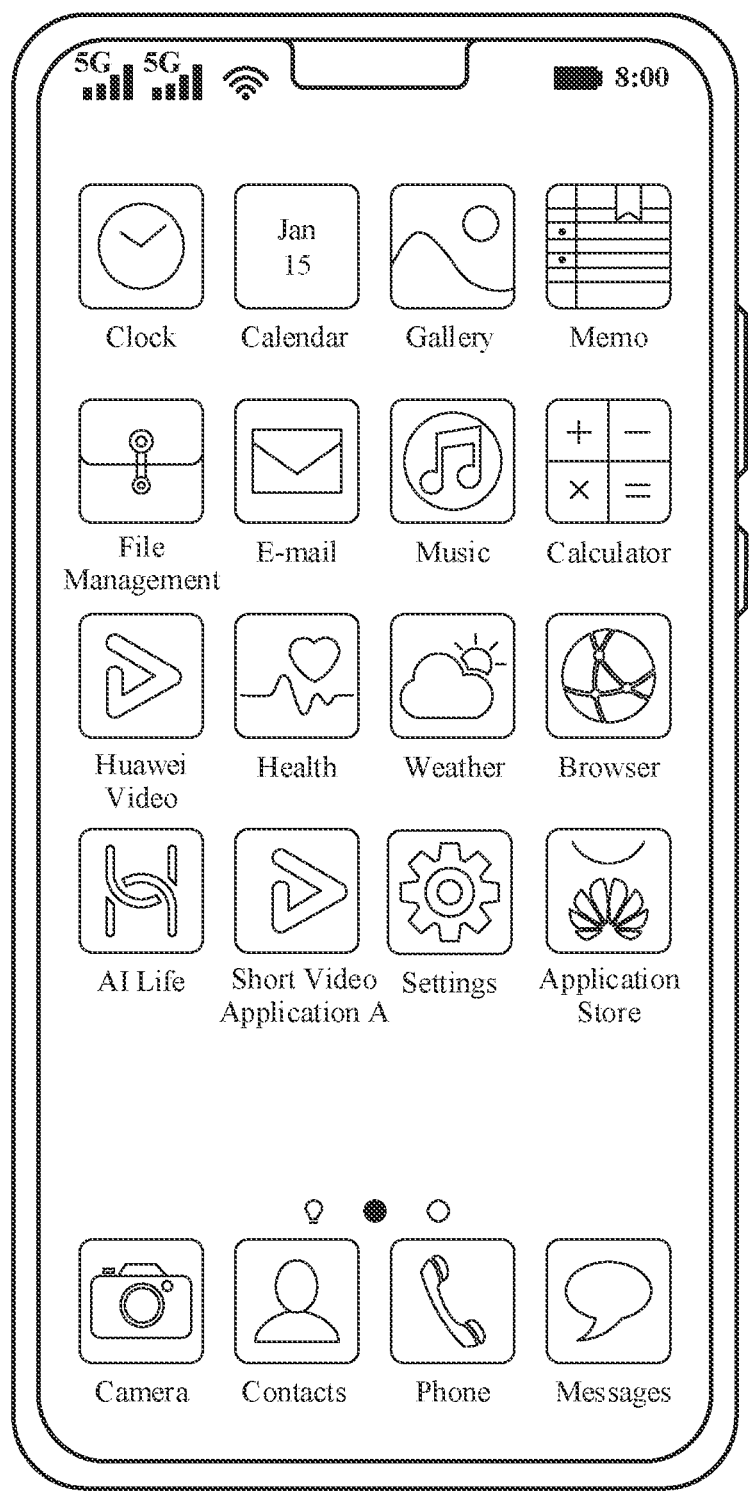
FIG. 15a(1)

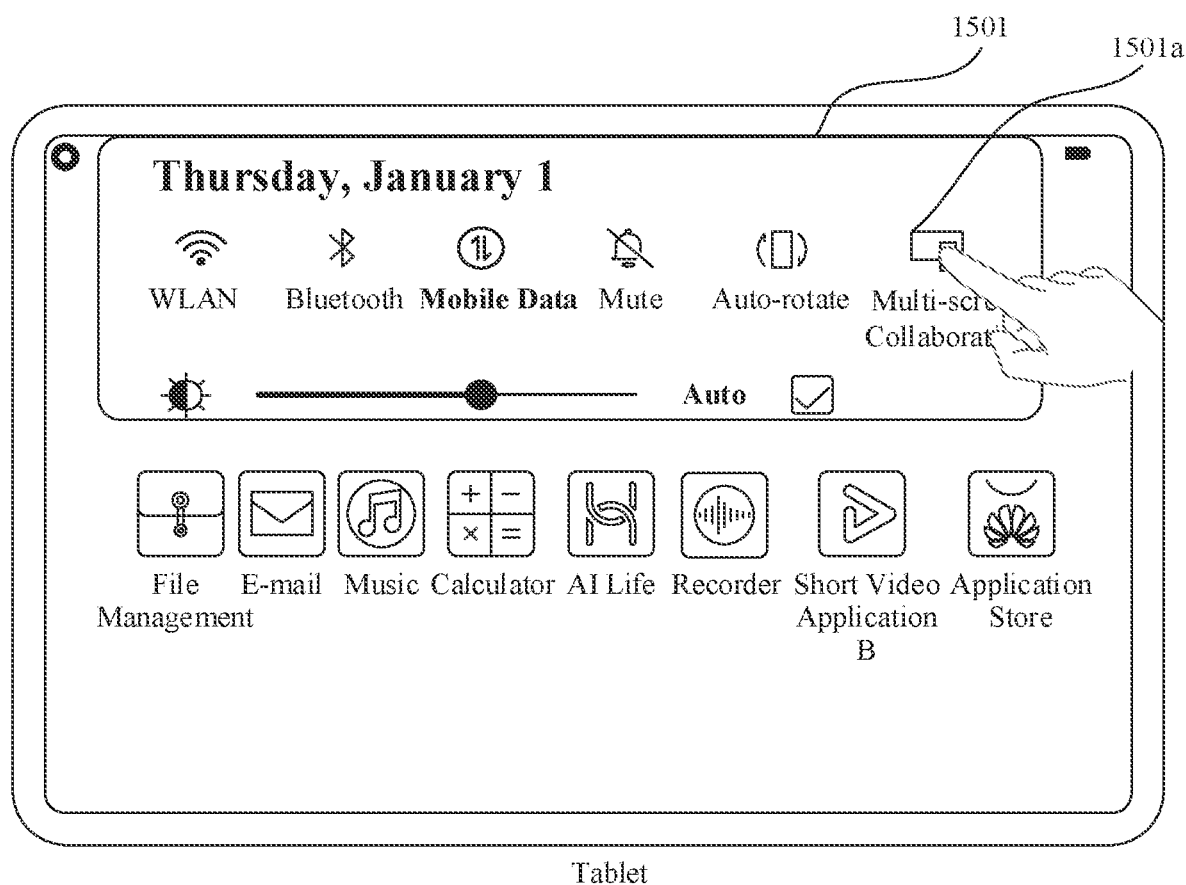
FIG. 15a(2)

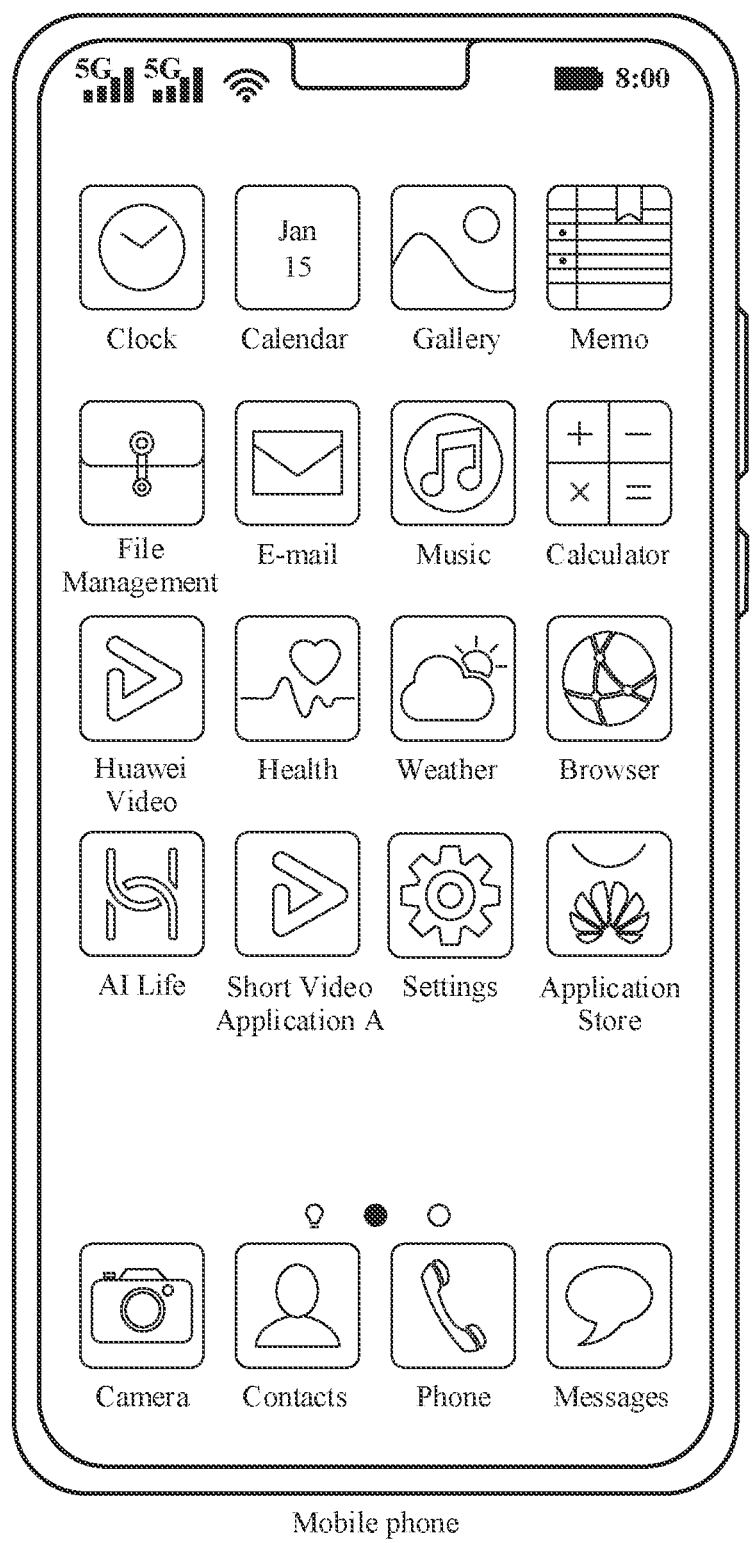
FIG. 15b(1)

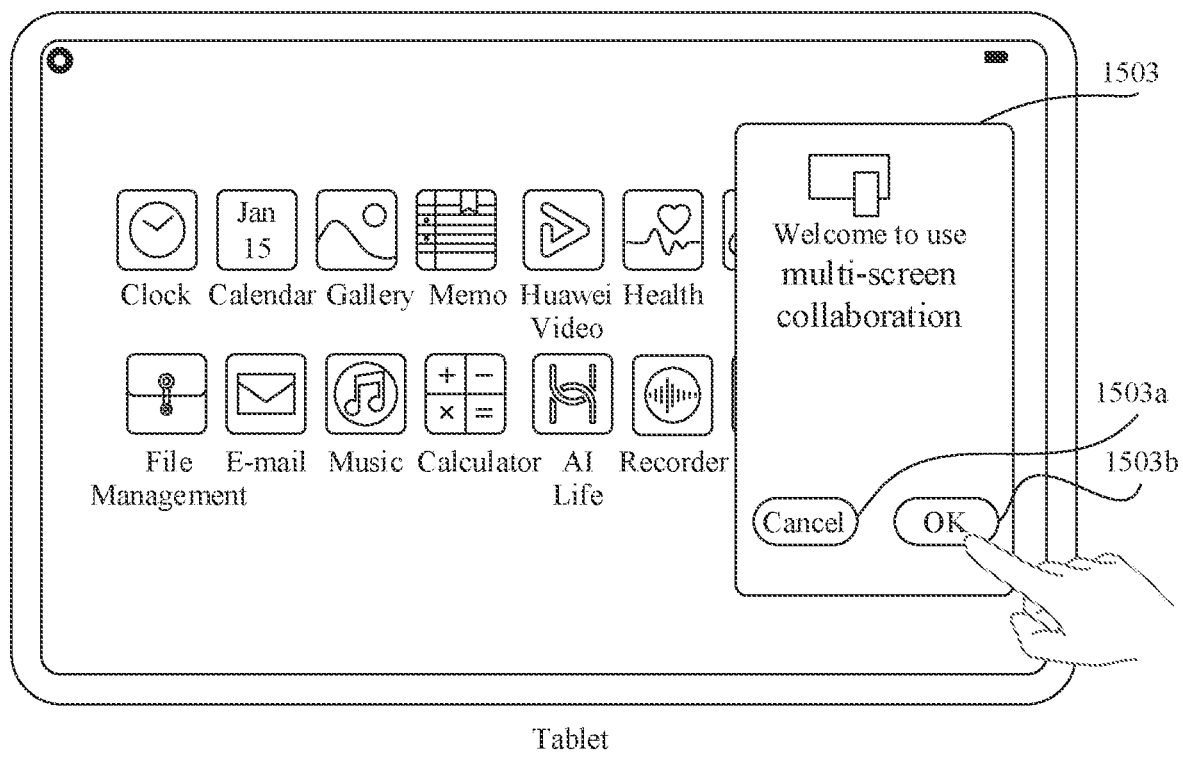
FIG. 15b(2)

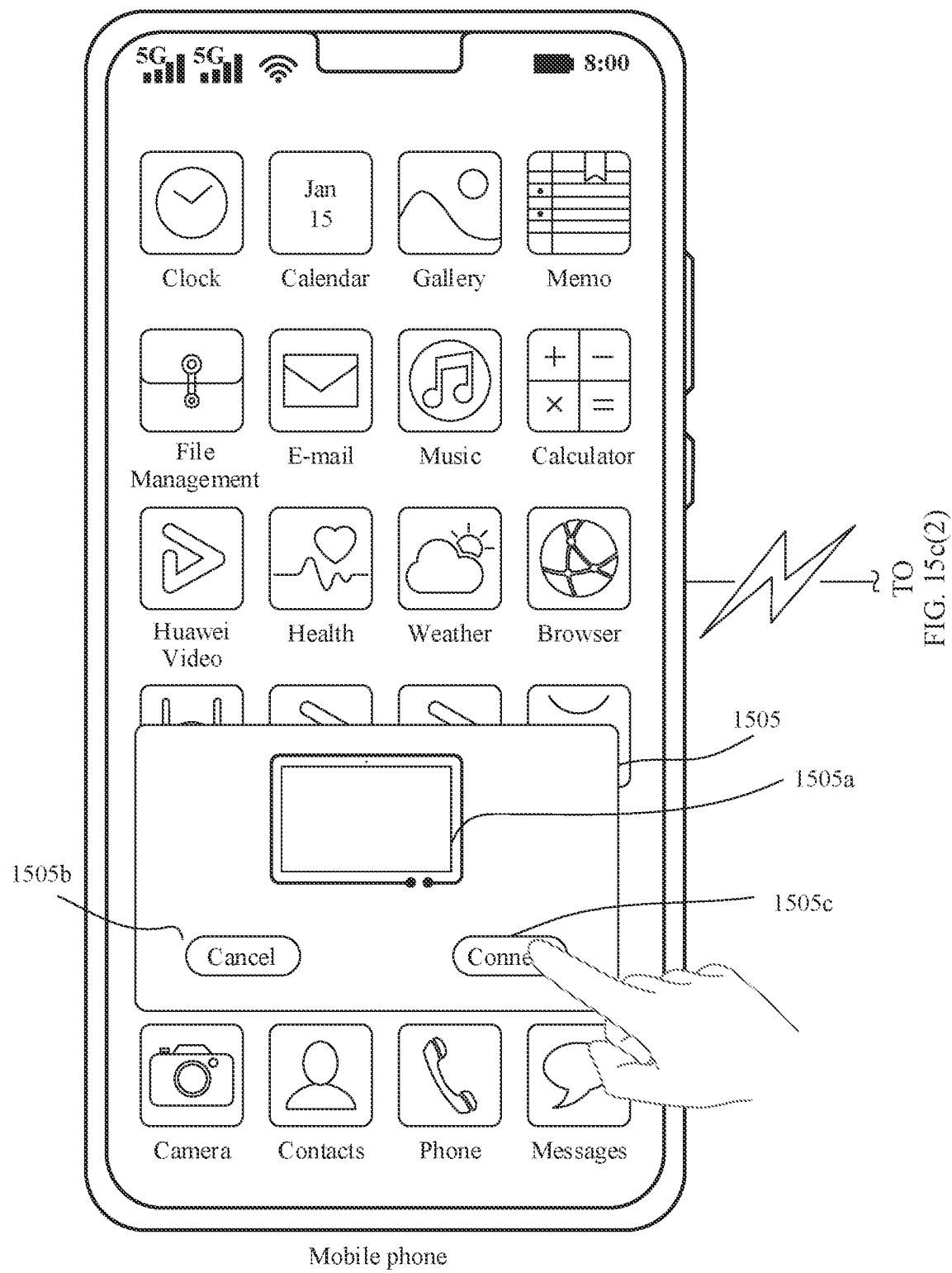
FIG. 15c(1)

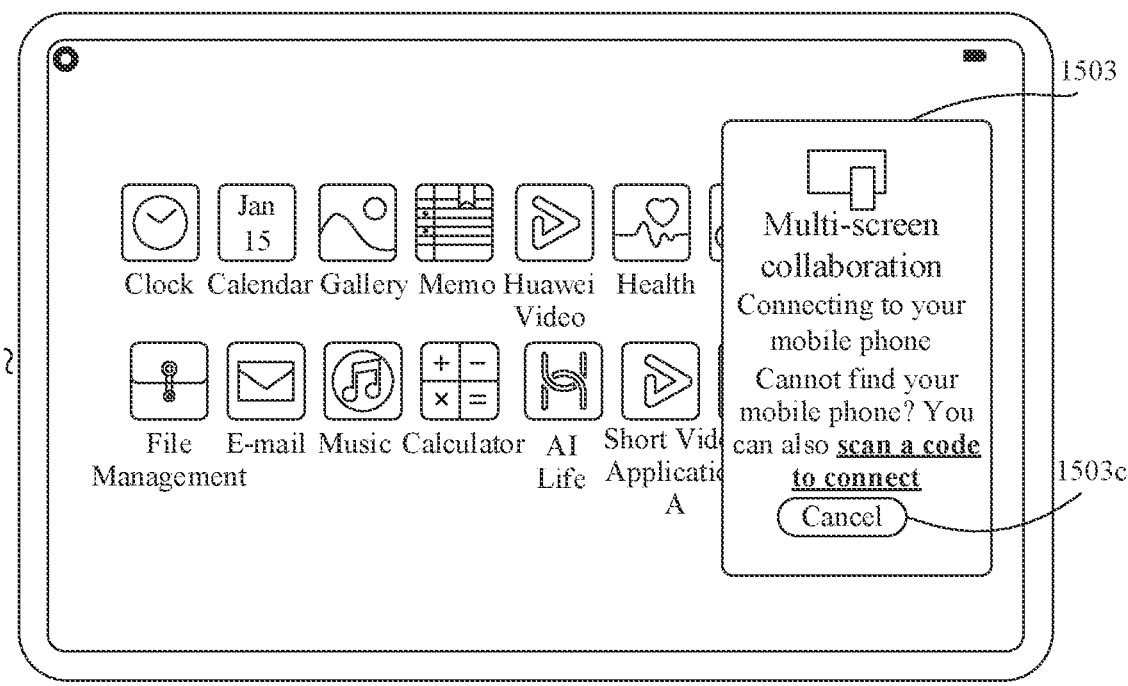
FIG. 15c(2)

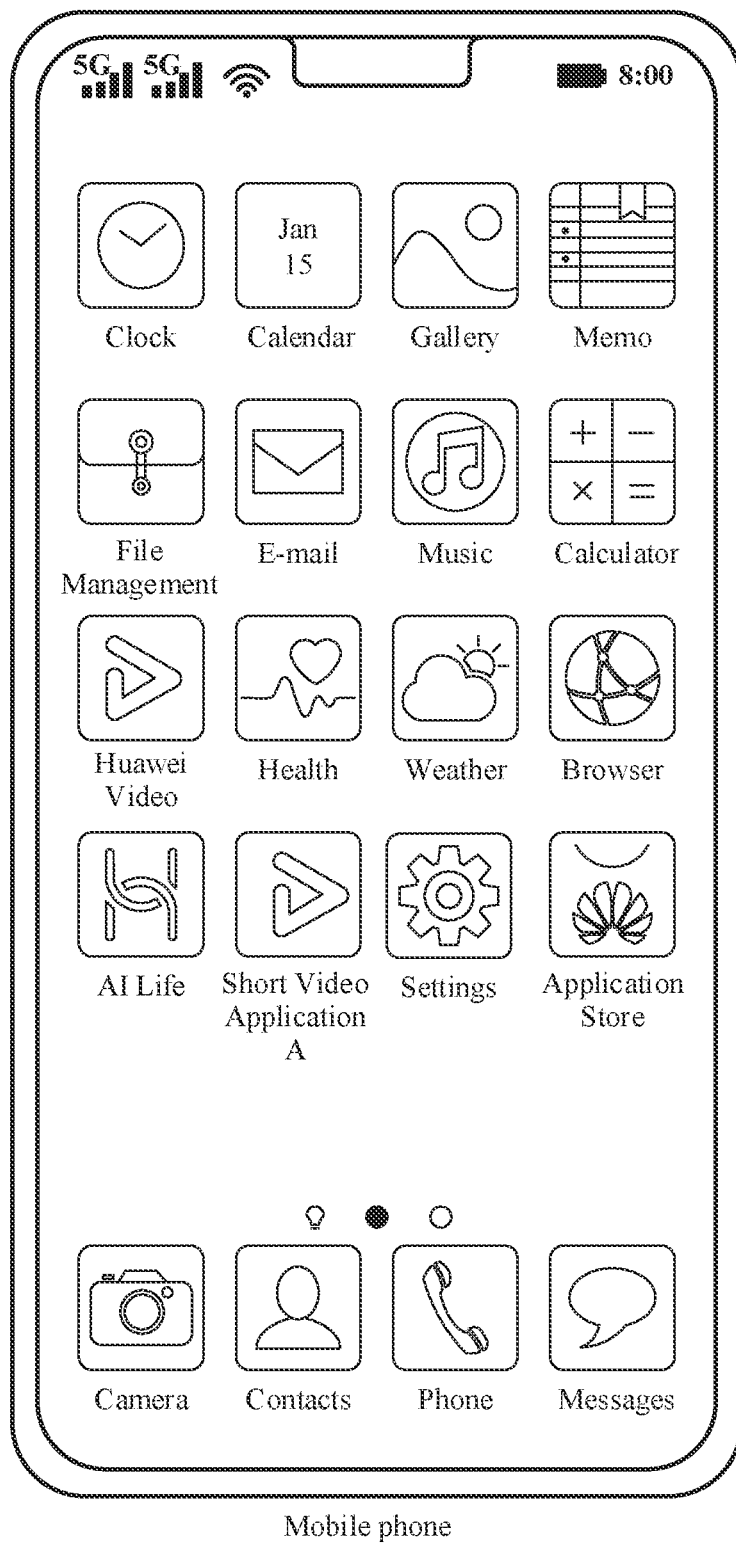
FIG. 15d(1)

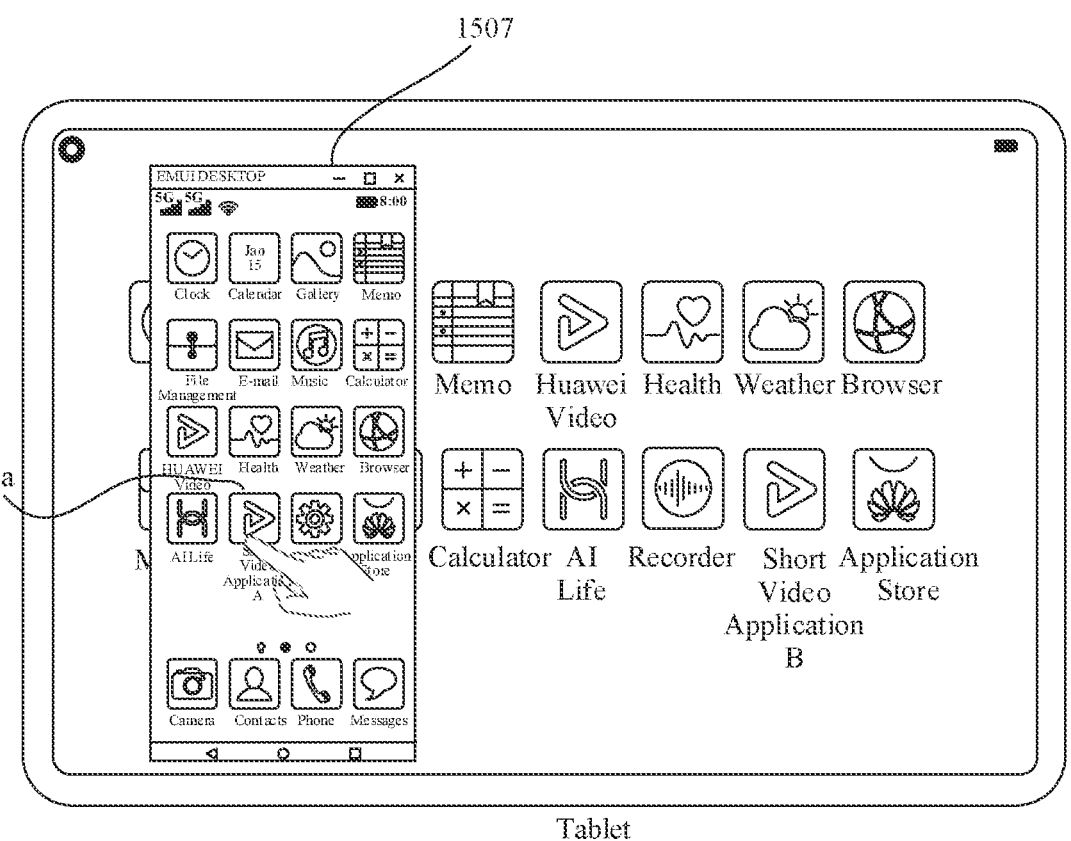
FIG. 15d(2)

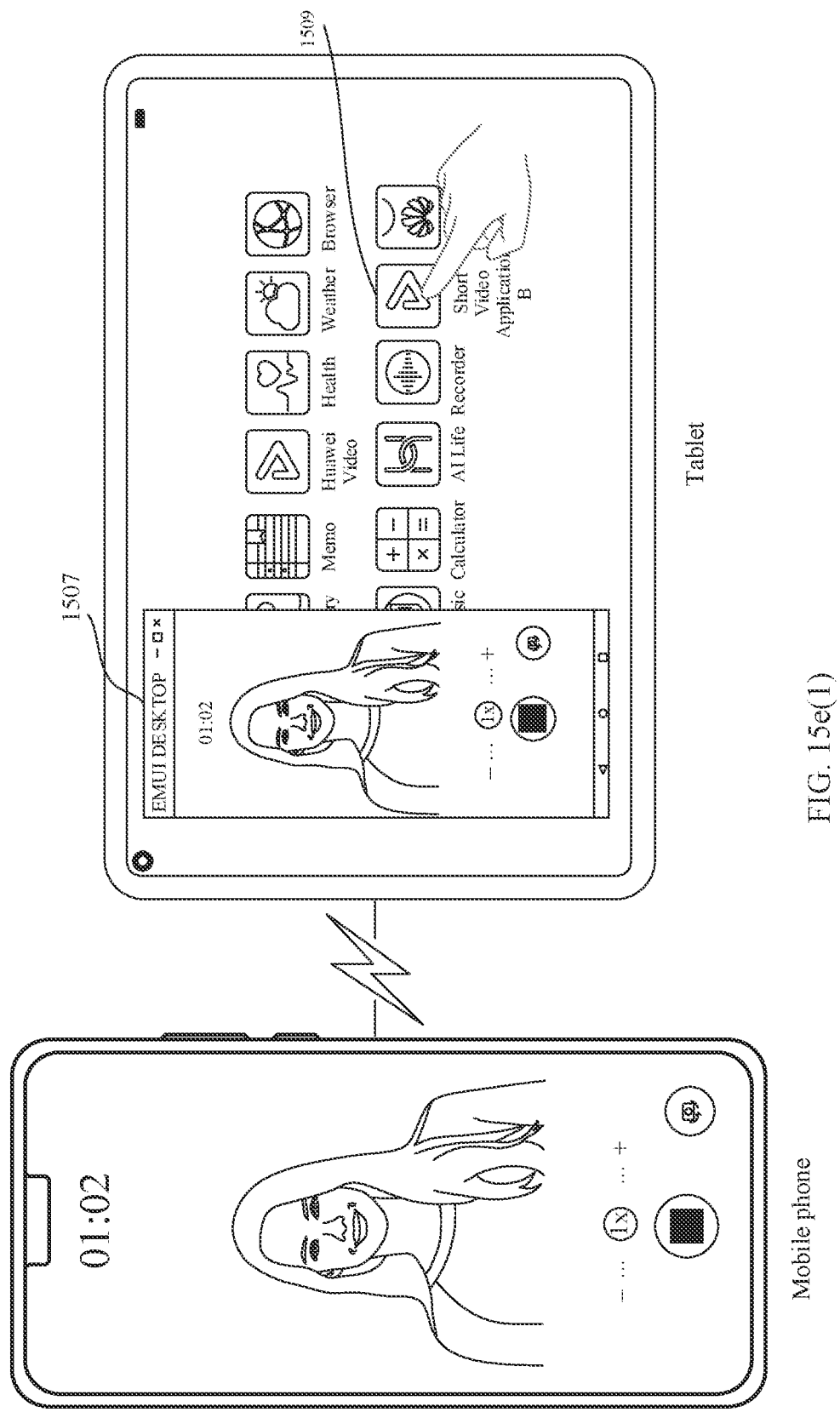
FIG. 15e(1)

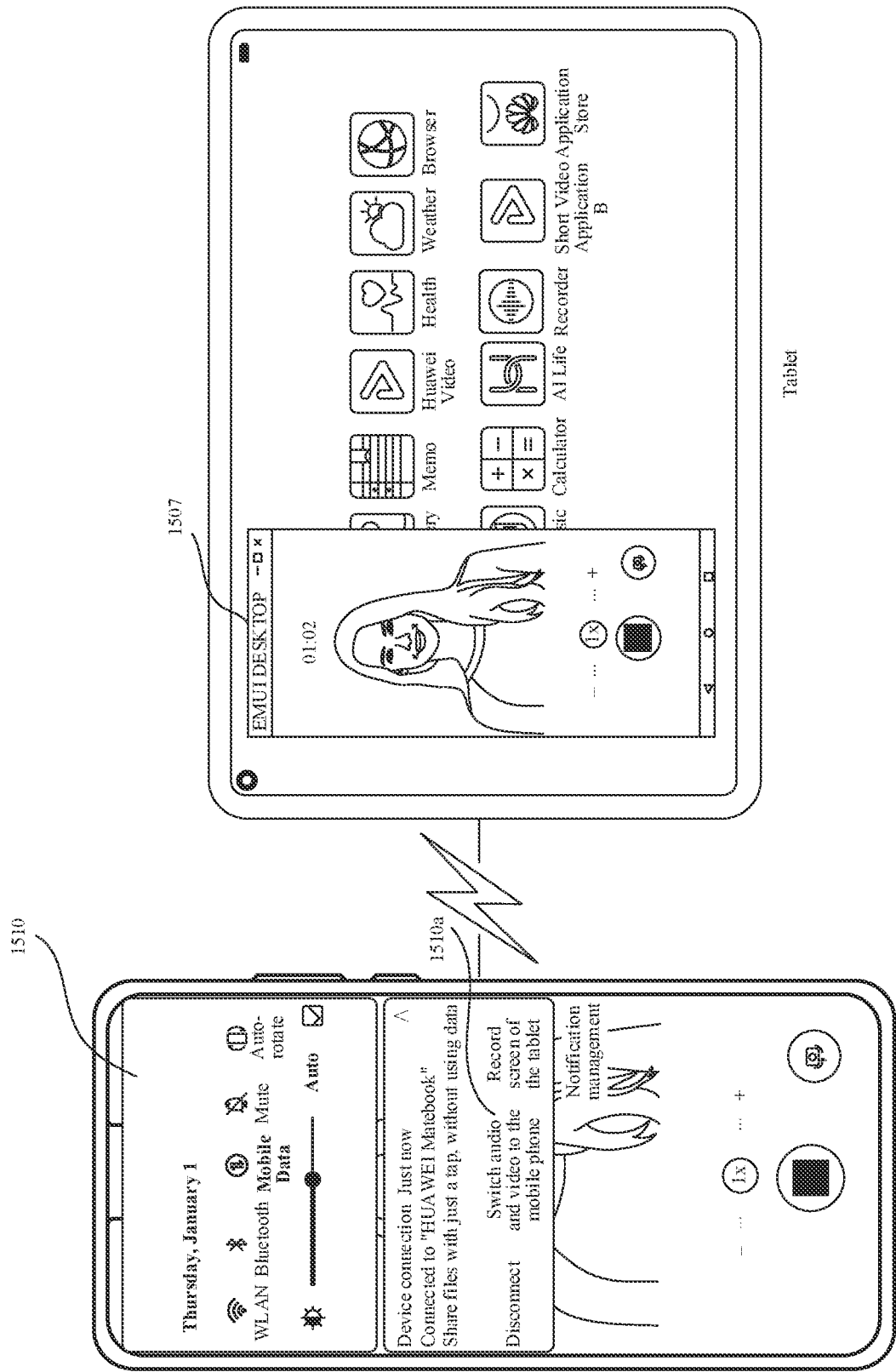
FIG. 15e(2)

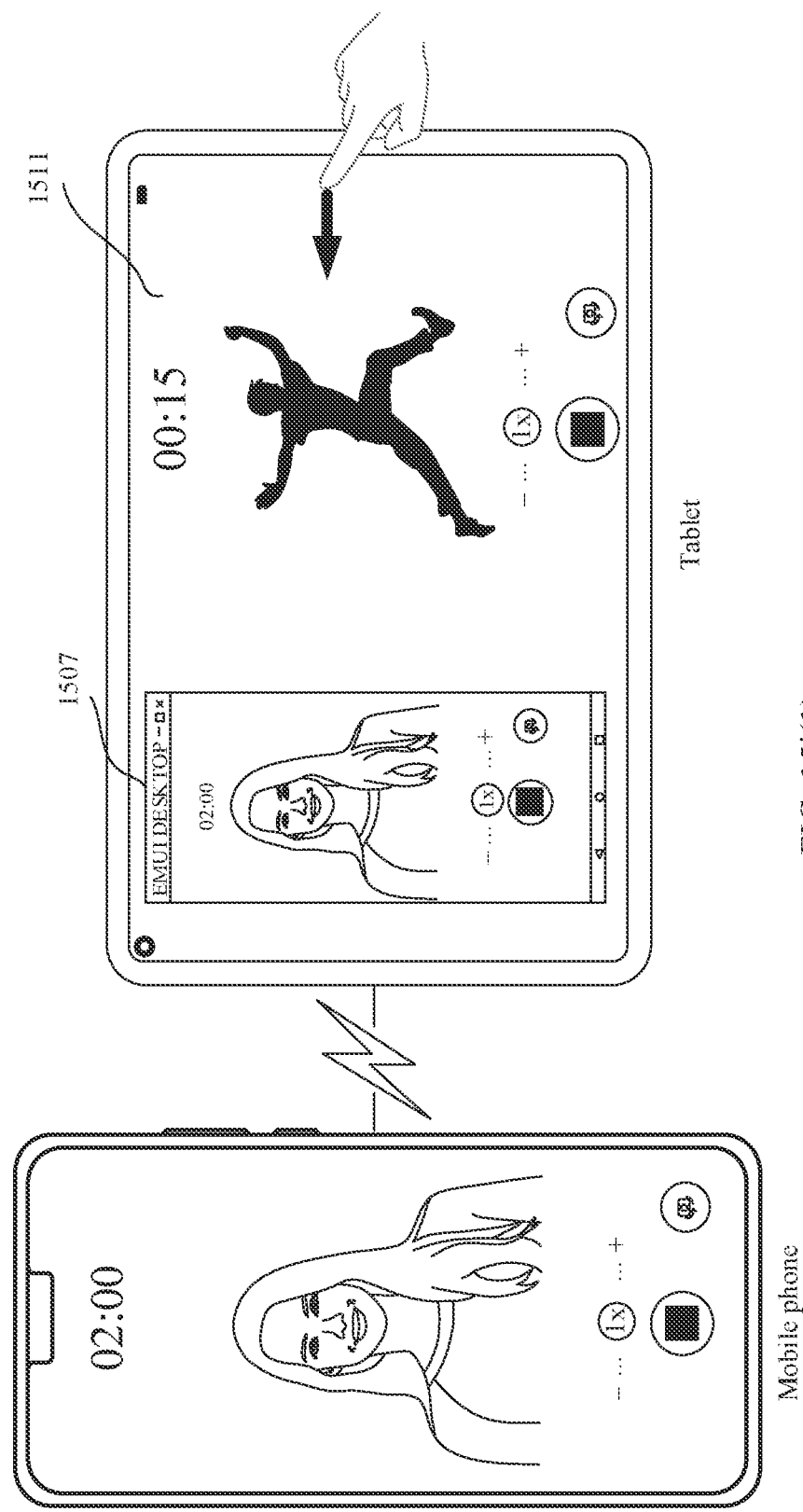
FIG. 15i(1)

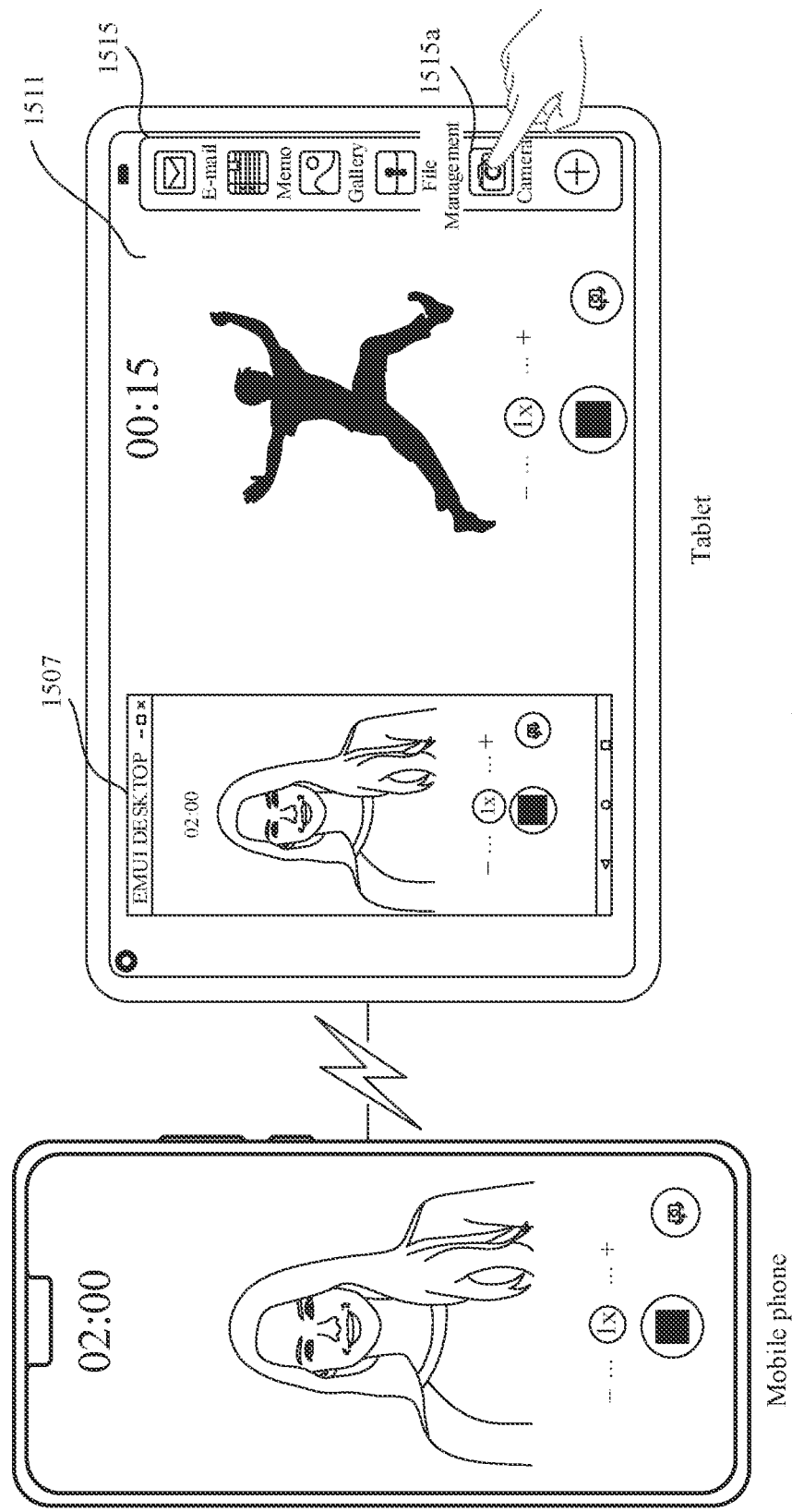
FIG. 15i(2)

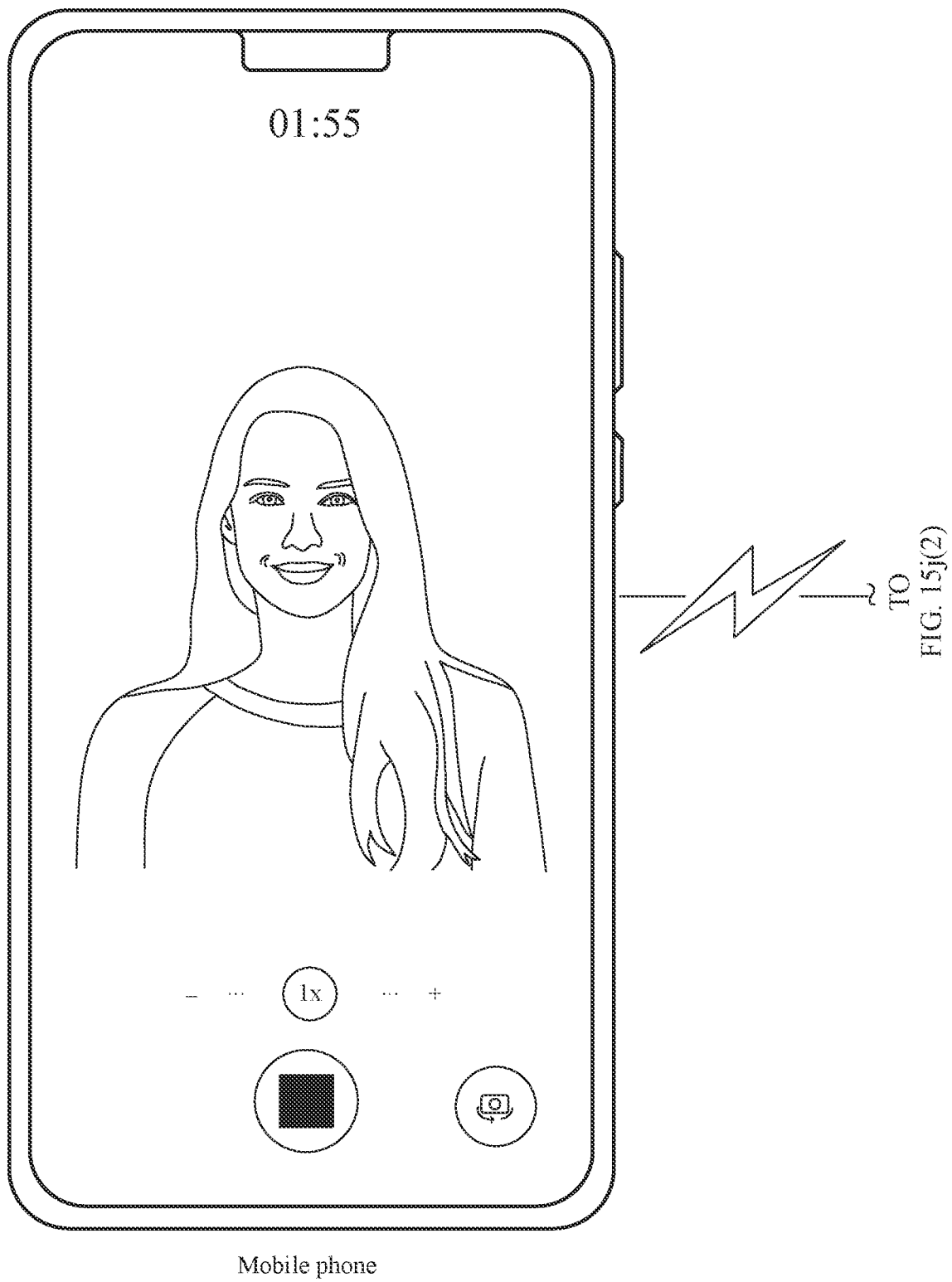
FIG. 15j(1)

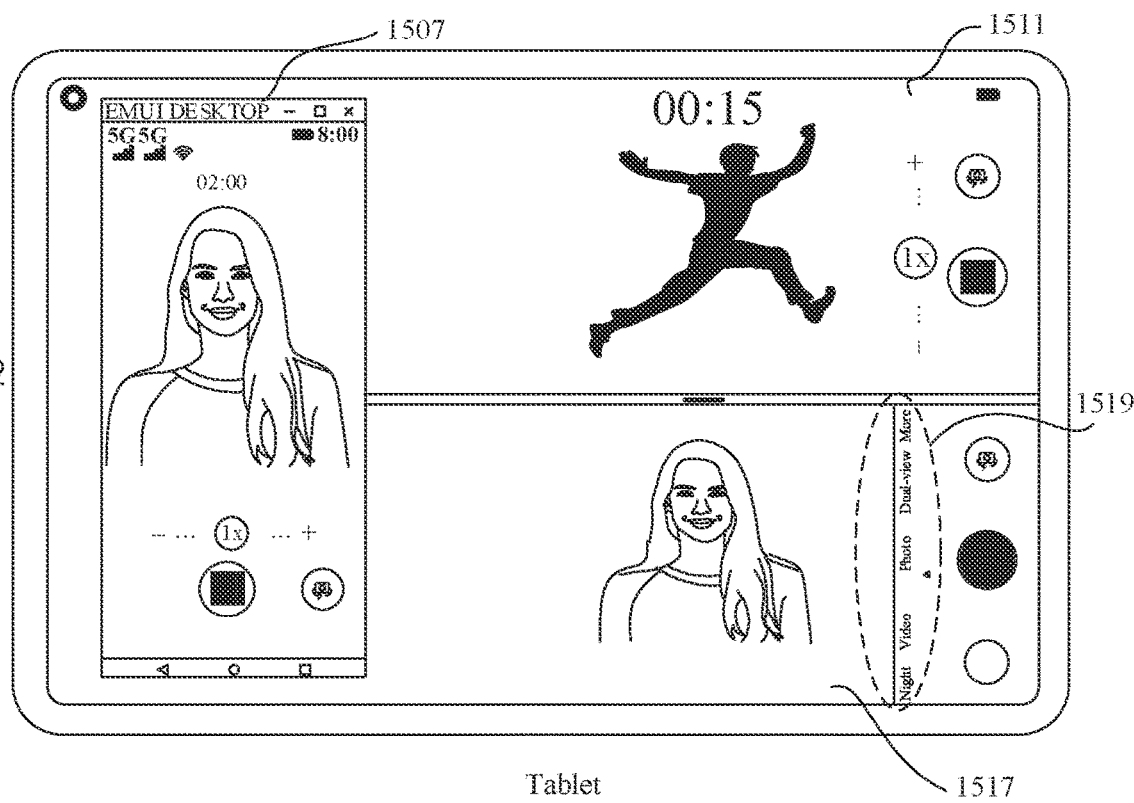
FIG. 15j(2)

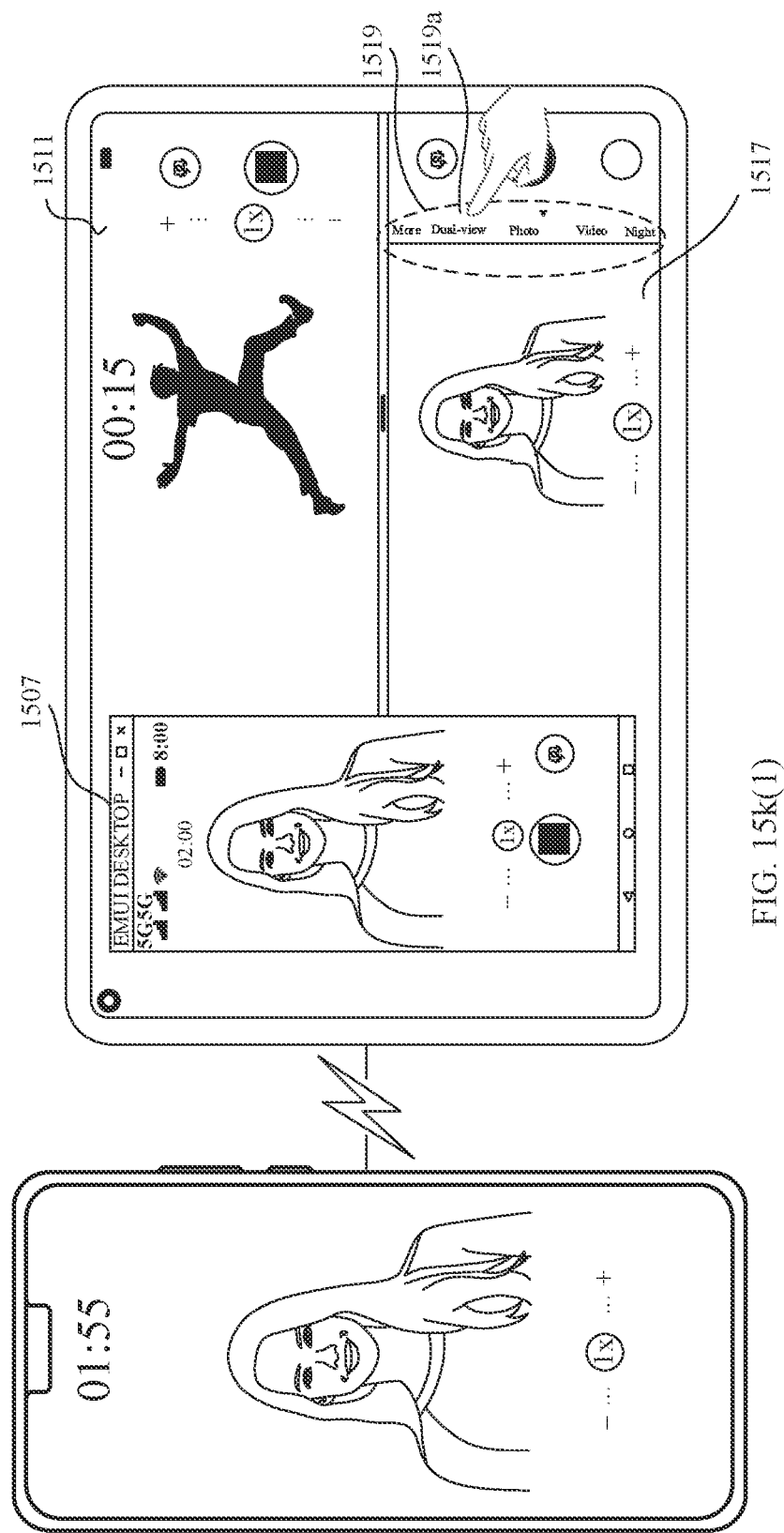

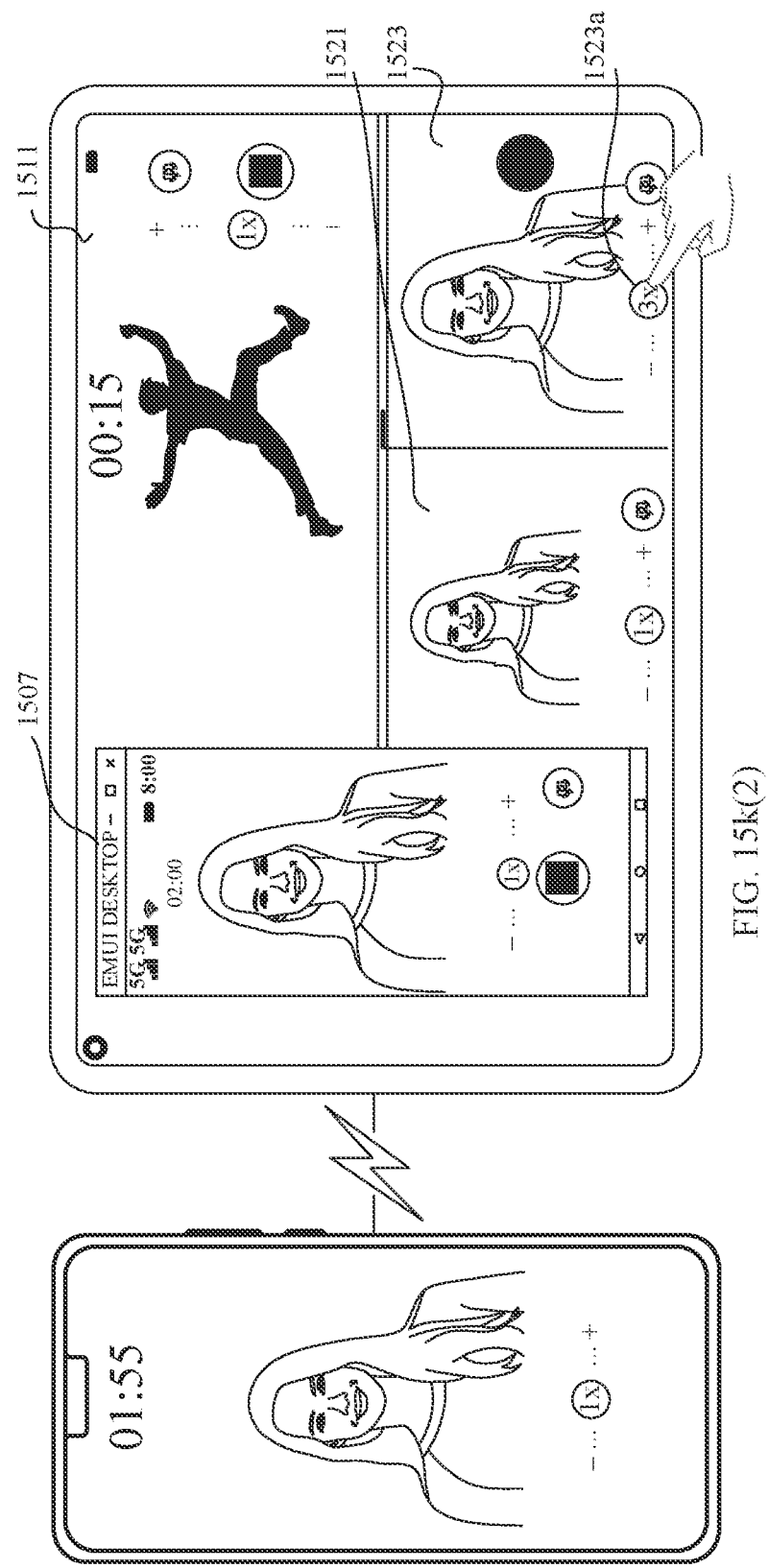
FIG. 15k(2)

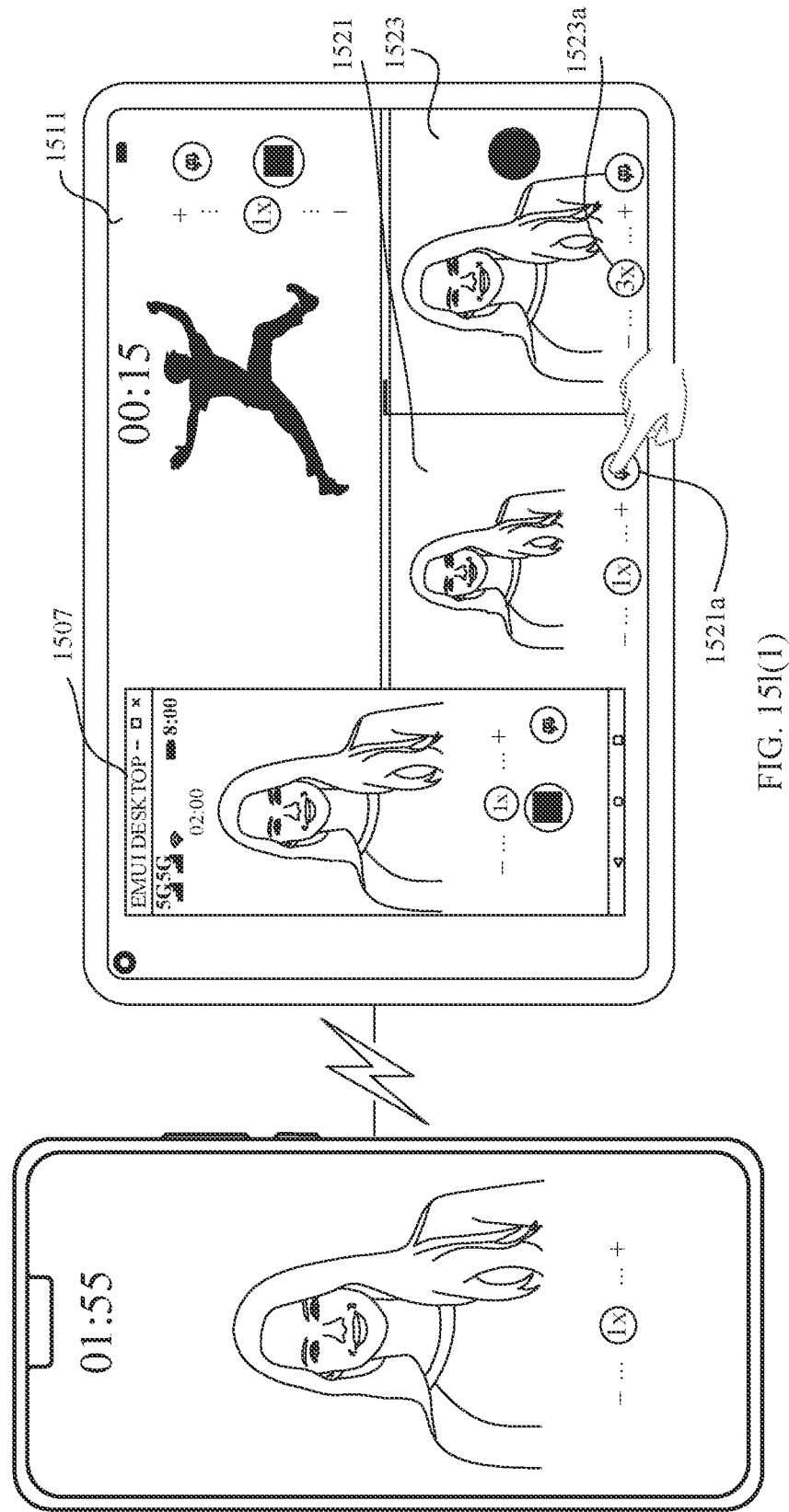
FIG. 15I(1)

CAMERA INVOCATION METHOD AND SYSTEM, AND ELECTRONIC DEVICE

CROSS-REFERENCE TO RELATED APPLICATIONS

This is a U.S. National Stage of International Patent Application No. PCT/CN2021/131243 filed on Nov. 17, 2021, which claims priority to Chinese Patent Application No. 202011315380.X filed on Nov. 20, 2020. Both of the aforementioned applications are hereby incorporated by reference in their entireties.

TECHNICAL FIELD

Embodiments of this application relate to the field of terminal devices, and in particular, to a camera invocation method and system, and an electronic device.

BACKGROUND

With development of communications technologies, a computing capability and a hardware capability of an electronic device are improved, and a video recording function of the electronic device is increasingly powerful. Correspondingly, application scenarios of the electronic device are increasing, for example, photographing/video recording, video call, and live broadcast.

At present, a camera function (including invocation of a front-facing camera and/or a rear-facing camera) of an electronic device is implemented in an exclusive mode, and the camera can be invoked by only a single application.

SUMMARY

To resolve the foregoing technical problem, this application provides a camera invocation method and system, and an electronic device. In this method, a camera of the electronic device may be invoked by a plurality of applications, so that the plurality of applications share the camera, thereby improving diversity of application scenarios of the electronic device and user experience.

According to a first aspect, an embodiment of this application provides a camera invocation method. The method includes: An electronic device displays a first preview interface of a first application, where an image captured by a first camera at a first moment is displayed in the first preview interface. The electronic device displays a first interface at a second moment in response to a received first operation, where the first moment and the second moment are different moments, and the first interface includes a second preview interface of the first application and a third preview interface of a second application. Specifically, an image captured by the first camera at the second moment is displayed in the second preview interface and the third preview interface. In this way, this application provides a camera sharing manner. A plurality of applications in an electronic device may share a camera, that is, simultaneously invoke the camera, and display an image captured by the camera in real time, so as to improve diversity of application scenarios of the electronic device and user experience.

According to the first aspect, the second preview interface includes first recording duration, and the first recording duration is used to indicate recording duration that is of the first application and that starts from a moment at which recording is started. In this way, in a recording process, the first application may display recording duration in real time, to indicate that current shooting is still being performed, and the shooting lasts for a time indicated by the recording duration.

According to the first aspect or any one of the foregoing implementations of the first aspect, before the electronic device displays the first preview interface of the first application, the method further includes: The electronic device obtains first configuration information of the first application; the electronic device configures a first session, and stores an association relationship between the first session, the first application, and the first configuration information. That the electronic device displays the first interface at the second moment further includes: The electronic device obtains second configuration information of the second application; and the electronic device configures a second session, and stores an association relationship between the second session, the second application, and the second configuration information. In this way, the electronic device may establish, based on the first configuration information of the first application and the second configuration information of the second application, an association relationship between the first application and the first configuration information, and an association relationship between the second application and the second configuration information, so as to generate, based on the established association relationships, images corresponding to the first application and the second application in a subsequent processing process.

According to the first aspect or any one of the foregoing implementations of the first aspect, that the electronic device displays the first interface at the second moment includes: The electronic device obtains the image captured by the first camera at the second moment; the electronic device determines, based on the first session, the first application and the first configuration information that are associated with the first session, and determines, based on the second session, the second application and the second configuration information that are associated with the second session; the electronic device obtains a first sub-image based on the image captured by the first camera at the second moment and the first configuration information, and obtains a second sub-image based on the image captured by the first camera at the second moment and the second configuration information; and the electronic device displays the first sub-image in the second preview interface, and displays the second sub-image in the third preview interface. In this way, the electronic device may generate, based on the established association relationships, images that meet different requirements of an application, and display the generated images in a corresponding application interface.

According to the first aspect or any one of the foregoing implementations of the first aspect, the first configuration information is used to indicate a first resolution, the second configuration information is used to indicate a second resolution, and the first resolution is the same as or different from the second resolution. In this way, a plurality of applications that simultaneously invoke the camera may require different resolutions for images, and the electronic device may perform corresponding processing based on different requirements of the applications for the resolution of the images, to obtain images having a same resolution or different resolutions.

According to the first aspect or any one of the foregoing implementations of the first aspect, the first configuration information is used to indicate a first zoom ratio, the second configuration information is used to indicate a second zoom ratio, and the first zoom ratio is the same as or different from the second zoom ratio. In this way, a plurality of applications that simultaneously invoke the camera may require different zoom ratios for images, and the electronic device may perform corresponding processing based on different requirements of the applications for zoom ratios of the images, to obtain images having a same zoom ratio or different zoom ratios.

According to the first aspect or any one of the foregoing implementations of the first aspect, the method further includes: The electronic device obtains third configuration information of the first application in response to a received second operation, where the third configuration information is used to indicate a third zoom ratio, and the third zoom ratio is different from the first zoom ratio; the electronic device stores an association relationship between the first session, the first application, and the third configuration information: the electronic device obtains an image captured by the first camera at a third moment; the electronic device determines, based on the first session, the first application and the third configuration information that are associated with the first session, and determines, based on the second session, the second application and the second configuration information that are associated with the second session; the electronic device obtains a third sub-image based on the image captured by the first camera at the third moment and the third configuration information, and obtains a fourth sub-image based on the image captured by the first camera at the third moment and the second configuration information; and the electronic device displays the third sub-image in the second preview interface, and displays the fourth sub-image in the third preview interface. In this way, at least one of a plurality of applications that simultaneously invoke the camera may dynamically update configuration information in a process of invoking the camera. The electronic device may establish, based on the updated configuration information, an association relationship applied to the updated configuration information, and generate, for the application based on the updated configuration information, an image that satisfies the updated configuration information. In addition, another application that does not update configuration information further performs corresponding processing based on original configuration information.

According to the first aspect or any one of the foregoing implementations of the first aspect, the method further includes: The electronic device displays a second interface at a fourth moment in response to a received third operation, where the second interface includes a fourth preview interface of the first application and a fifth preview interface of the first application, an image captured by the first camera at the fourth moment is displayed in the fourth preview interface, an image captured by the second camera at the fourth moment is displayed in the fifth preview interface, and the first camera is different from the second camera. In this way, in a scenario in which the first application and the second application simultaneously invoke the camera, the first application may further start a twin application, or enable a dual-view shooting function. The first application, the twin application of the first application, and two windows of the dual-view shooting function of the first application may simultaneously invoke the front-facing camera and/or the rear-facing camera.

According to the first aspect or any one of the foregoing implementations of the first aspect, the method further includes: The electronic device displays, in the second preview interface in response to a received fourth operation, an image captured by the first camera at a fifth moment. In addition, an image captured by the second camera at the fifth moment is displayed in the third preview interface. The second camera is different from the first camera. In this way, in a scenario in which a plurality of applications simultaneously invoke a camera, at least one application may switch the camera.

According to the first aspect or any one of the foregoing implementations of the first aspect, the first camera is a first front-facing camera, and the second camera is a first rear-facing camera; or the first camera is a first front-facing camera, the second camera is a second front-facing camera, and the first front-facing camera is different from the second front-facing camera; or the first camera is a first rear-facing camera, the second camera is a second rear-facing camera, and the first rear-facing camera is different from the second rear-facing camera. In this way, this embodiment of this application may be applied to a scenario in which a plurality of applications simultaneously invoke a front-facing camera, or simultaneously invoke different front-facing cameras, or simultaneously invoke different rear-facing cameras, or may be applied to a scenario in which a plurality of applications simultaneously invoke a front-facing camera and a rear-facing camera.

According to the first aspect or any one of the foregoing implementations of the first aspect, the third preview interface further includes a camera switching option, and the fourth operation is used to indicate an operation on the camera switching option. In this way, a user may switch, by tapping the camera switching option, a camera invoked by an application, so as to increase diversity of application scenarios. For example, the user may use a video call application to invoke the front-facing camera to make a video call with a family member, and may further use a live broadcast application to invoke the rear-facing camera to perform live broadcast. In addition, the cameras invoked by the video call application and the live broadcast application may be switched at any time according to an instruction of the user.

According to the first aspect or any one of the foregoing implementations of the first aspect, the first interface is a split screen interface, one interface of the split screen interface includes the second preview interface, and the other interface of the split screen interface includes the third preview interface. In this way, the camera invocation method in this embodiment of this application may be applied to a screen splitting scenario. A plurality of applications may be included in different interfaces of a screen splitting interface, and an image captured by the camera in real time is displayed.

According to the first aspect or any one of the foregoing implementations of the first aspect, the second preview interface and/or the third preview interface each are/is a floating interface. In this way, the camera invocation method in this embodiment of this application may be applied to a scenario of a floating interface of a plurality of applications. The plurality of applications may be included in different floating interfaces, and an image captured by the camera in real time is displayed.

According to the first aspect or any one of the foregoing implementations of the first aspect, that the electronic device displays the first interface at the second moment in response to the received first operation includes: The electronic device receives a first sub-operation, and displays a sidebar in the first interface, where the sidebar includes an application icon of the second application; and the electronic device receives a second sub-operation on the application icon of the second application, and displays the first interface at the second moment. In this way, the electronic device may provide a sidebar, so that a user can start the second application by using the sidebar, so that a plurality of applications simultaneously invoke the camera.

According to the first aspect or any one of the implementations of the first aspect, the first application is a camera application, and the second application is any one of the following: a video call application, a live broadcast application, and an application having a code scanning function.

According to a second aspect, an embodiment of this application provides a camera invocation system. The system includes: a first electronic device and a second electronic device, where the first electronic device exchanges data with the second electronic device by using a first connection, and the first electronic device includes a first camera. The first electronic device is configured to: display a first preview interface of a first application, where a first interface sent by the second electronic device is displayed in the first preview interface, and the first interface includes an image captured by the first camera at a first moment. The first electronic device is further configured to: display a second interface at a second moment in response to a received first operation, where the first moment and the second moment are different moments, the second interface includes a second preview interface of the first application and a third preview interface of the second application, a third interface sent by the second electronic device is displayed in the second preview interface, and the third interface and the third preview interface include an image captured by the first camera at the second moment. In this way, in a scenario in which a plurality of applications in the first electronic device simultaneously invoke a camera, the first application may further send an image corresponding to at least one application to the second electronic device, so as to implement multi-device collaboration. In addition, the second electronic device may also use an image captured by a camera of the first electronic device.

According to the second aspect, the second electronic device is configured to: receive the image that is sent by the first electronic device and that is captured by the first camera at the first moment; display, in the first interface, the image captured by the first camera at the first moment; and send the first interface to the first electronic device by using the first connection. In this way, the second electronic device can use the image captured by the camera of the first electronic device, and display the obtained image in the first interface.

According to the second aspect or any one of the foregoing implementations of the second aspect, the second electronic device is configured to: receive the image that is sent by the first electronic device and that is captured by the first camera at the first moment; generate the first interface including the image captured by the first camera at the first moment, where the second electronic device is in a screen-off state; and send the first interface to the first electronic device by using the first connection. In this way, in the screen-off state, the second electronic device may still use the image captured by the first electronic device, and the first electronic device displays the first interface generated by the second electronic device based on the obtained image.

According to the second aspect or any one of the foregoing implementations of the second aspect, the first application is a multi-screen collaboration application.

According to the second aspect or any one of the foregoing implementations of the second aspect, the first preview interface is a floating window.

According to a third aspect, an embodiment of this application provides an electronic device. The electronic device includes a memory and a processor. The memory is coupled to the processor. The memory stores program instructions. When the program instructions are executed by the processor, the electronic device is enabled to perform the following steps: displaying a first preview interface of a first application, where an image captured by a first camera at a first moment is displayed in the first preview interface; and displaying a first interface at a second moment in response to a received first operation, where the first moment and the second moment are different moments, the first interface includes a second preview interface of the first application and a third preview interface of a second application, and an image captured by the first camera at the second moment is displayed in the second preview interface and the third preview interface.

According to the third aspect, the second preview interface includes first recording duration, and the first recording duration is used to indicate recording duration that is of the first application and that starts from a moment at which recording is started.

According to the third aspect or any one of the foregoing implementations of the third aspect, when the program instructions are executed by the processor, the electronic device is enabled to perform the following steps: obtaining first configuration information of the first application; configuring a first session, and storing an association relationship between the first session, the first application, and the first configuration information; obtaining second configuration information of the second application; and configuring a second session, and storing an association relationship between the second session, the second application, and the second configuration information.

According to the third aspect or any one of the foregoing implementations of the third aspect, when the program instructions are executed by the processor, the electronic device is enabled to perform the following steps: obtaining the image captured by the first camera at the second moment; determining, based on the first session, the first application and the first configuration information that are associated with the first session; determining, based on the second session, the second application and the second configuration information that are associated with the second session; obtaining a first sub-image based on the image captured by the first camera at the second moment and the first configuration information, and obtaining a second sub-image based on the image captured by the first camera at the second moment and the second configuration information; and displaying the first sub-image in the second preview interface, and displaying the second sub-image in the third preview interface.

According to the third aspect or any one of the foregoing implementations of the third aspect, the first configuration information is used to indicate a first resolution, the second configuration information is used to indicate a second resolution, and the first resolution is the same as or different from the second resolution.

According to the third aspect or any one of the foregoing implementations of the third aspect, the first configuration information is used to indicate a first zoom ratio, the second configuration information is used to indicate a second zoom ratio, and the first zoom ratio is the same as or different from the second zoom ratio.

According to the third aspect or any one of the foregoing implementations of the third aspect, when the program instructions are executed by the processor, the electronic device is enabled to perform the following steps: obtaining third configuration information of the first application in response to a received second operation, where the third configuration information is used to indicate a third zoom ratio, and the third zoom ratio is different from the first zoom ratio; storing an association relationship between the first session, the first application, and the third configuration information; obtaining an image captured by the first camera at a third moment; determining, based on the first session, the first application and the third configuration information that are associated with the first session, and determining, based on the second session, the second application and the second configuration information that are associated with the second session; obtaining a third sub-image based on the image captured by the first camera at the third moment and the third configuration information, and obtaining a fourth sub-image based on the image captured by the first camera at the third moment and the second configuration information; and displaying the third sub-image in the second preview interface, and displaying the fourth sub-image in the third preview interface.

According to the third aspect or any one of the foregoing implementations of the third aspect, when the program instructions are executed by the processor, the electronic device is enabled to perform the following steps: displaying a second interface at a fourth moment in response to a received third operation, where the second interface includes a fourth preview interface of the first application and a fifth preview interface of the first application, an image captured by the first camera at the fourth moment is displayed in the fourth preview interface, an image captured by a second camera at the fourth moment is displayed in the fifth preview interface, and the first camera is different from the second camera.

According to the third aspect or any one of the foregoing implementations of the third aspect, when the program instructions are executed by the processor, the electronic device is enabled to perform the following steps: displaying, in the second preview interface in response to a received fourth operation, an image captured by the first camera at a fifth moment. In addition, an image captured by the second camera at the fifth moment is displayed in the third preview interface. The second camera is different from the first camera.

According to the third aspect or any one of the foregoing implementations of the third aspect, the first camera is a first front-facing camera, and the second camera is a first rear-facing camera; or the first camera is a first front-facing camera, the second camera is a second front-facing camera, and the first front-facing camera is different from the second front-facing camera; or the first camera is a first rear-facing camera, the second camera is a second rear-facing camera, and the first rear-facing camera is different from the second rear-facing camera.

According to the third aspect or any one of the foregoing implementations of the third aspect, the third preview interface further includes a camera switching option, and the fourth operation is used to indicate an operation on the camera switching option.

According to the third aspect or any one of the foregoing implementations of the third aspect, the first interface is a split screen interface, one interface of the split screen interface includes the second preview interface, and the other interface of the split screen interface includes the third preview interface.

According to the third aspect or any one of the foregoing implementations of the third aspect, the second preview interface and/or the third preview interface each are/is a floating interface.

According to the third aspect or any one of the foregoing implementations of the third aspect, when the program instructions are executed by the processor, the electronic device is enabled to perform the following steps: receiving a first sub-operation, and displaying a sidebar in the first interface, where the sidebar includes an application icon of the second application; and receiving a second sub-operation on the application icon of the second application, and displaying the first interface at the second moment.

According to the third aspect or any one of the implementations of the third aspect, the first application is a camera application, and the second application is any one of the following: a video call application, a live broadcast application, and an application having a code scanning function.

The third aspect and any implementation of the third aspect respectively correspond to the first aspect and any implementation of the first aspect. For technical effects corresponding to the third aspect and any implementation of the third aspect, refer to the technical effects corresponding to the first aspect and any implementation of the first aspect. Details are not described herein again.

According to a fourth aspect, an embodiment of this application provides a computer-readable medium, configured to store a computer program. The computer program includes instructions used to perform the method according to the first aspect or any possible implementation of the first aspect.

According to a fifth aspect, an embodiment of this application provides a computer-readable medium, configured to store a computer program, where the computer program includes instructions used to perform the method in the second aspect or any possible implementation of the second aspect.

According to a sixth aspect, an embodiment of this application provides a computer program. The computer program includes instructions used to perform the method according to the first aspect or any possible implementation of the first aspect.

According to a seventh aspect, an embodiment of this application provides a computer program. The computer program includes instructions for performing the method according to the second aspect or any possible implementation of the second aspect.

According to an eighth aspect, an embodiment of this application provides a chip. The chip includes a processing circuit and a transceiver pin. The transceiver pin and the processing circuit communicate with each other through an internal connection path. The processing circuit performs the method according to any one of the first aspect or the possible implementations of the first aspect, to control a receive pin to receive a signal and a transmit pin to send a signal.

According to a ninth aspect, an embodiment of this application provides a chip. The chip includes a processing circuit and a transceiver pin. The transceiver pin and the processing circuit communicate with each other through an internal connection path. The processing circuit performs the method according to any one of the second aspect or the possible implementations of the second aspect, to control a receive pin to receive a signal and a transmit pin to send a signal.

DESCRIPTION OF EMBODIMENTS

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first target object, and a second target object are used to distinguish between different target objects, but are not used to describe a particular order of the target objects.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example" or the like is intended to present a relative concept in a specific manner.

In the descriptions of the embodiment of this application, unless otherwise stated, "multiple" means two or more than two. For example, a plurality of processing units are two or more processing units, and a plurality of systems are two or more systems.

Figure 1:
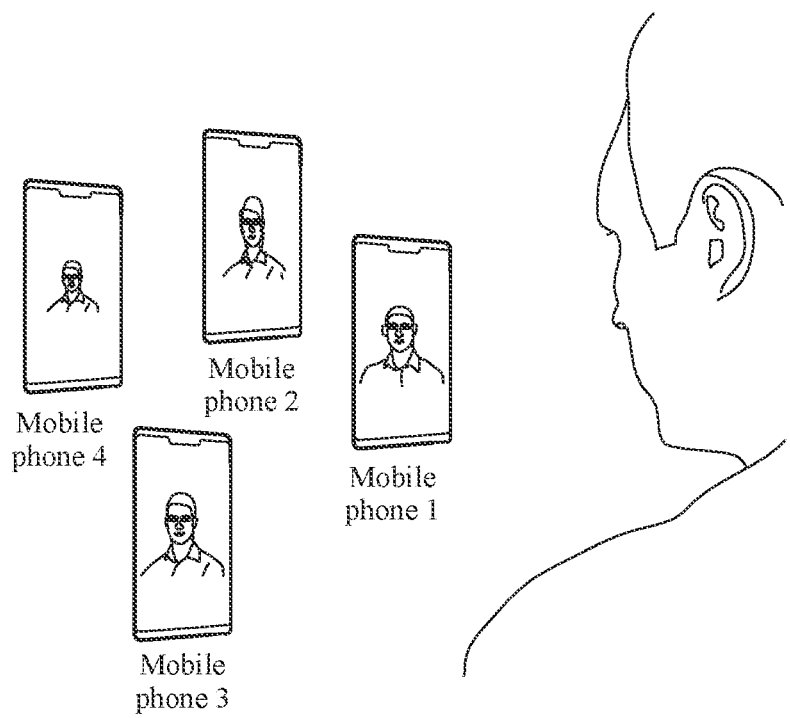
FIG. 1 is one of schematic diagrams of an example of an application scenario.

FIG. 1 is a schematic diagram of an example of an application scenario. Refer to FIG. 1. For example, in a live broadcast scenario, a user uses a plurality of mobile phones (including a mobile phone 1, a mobile phone 2, a mobile phone 3, and a mobile phone 4) to separately log in to different live broadcast platforms (which may also be referred to as a live broadcast application or a short video application) to perform live broadcast. In a live broadcast process, display windows of the live broadcast applications of the mobile phone 1 to the mobile phone 4 display images captured by respective cameras of the mobile phones 1 to 4. For example, based on different distances and angles between the mobile phones and the user, angles and sizes of the user in the images displayed by the mobile phone 1 to the mobile phone 4 are different. Because a camera (including a front-facing camera and a rear-facing camera) in the mobile phone can be invoked by only one application at one time, if the user needs to perform live broadcast on a plurality of live broadcast platforms, only the manner shown in FIG. 1 can be used, that is, a manner in which the user logs in to different live broadcast platforms by using a plurality of mobile phones, to perform live broadcast.

Figure 2:
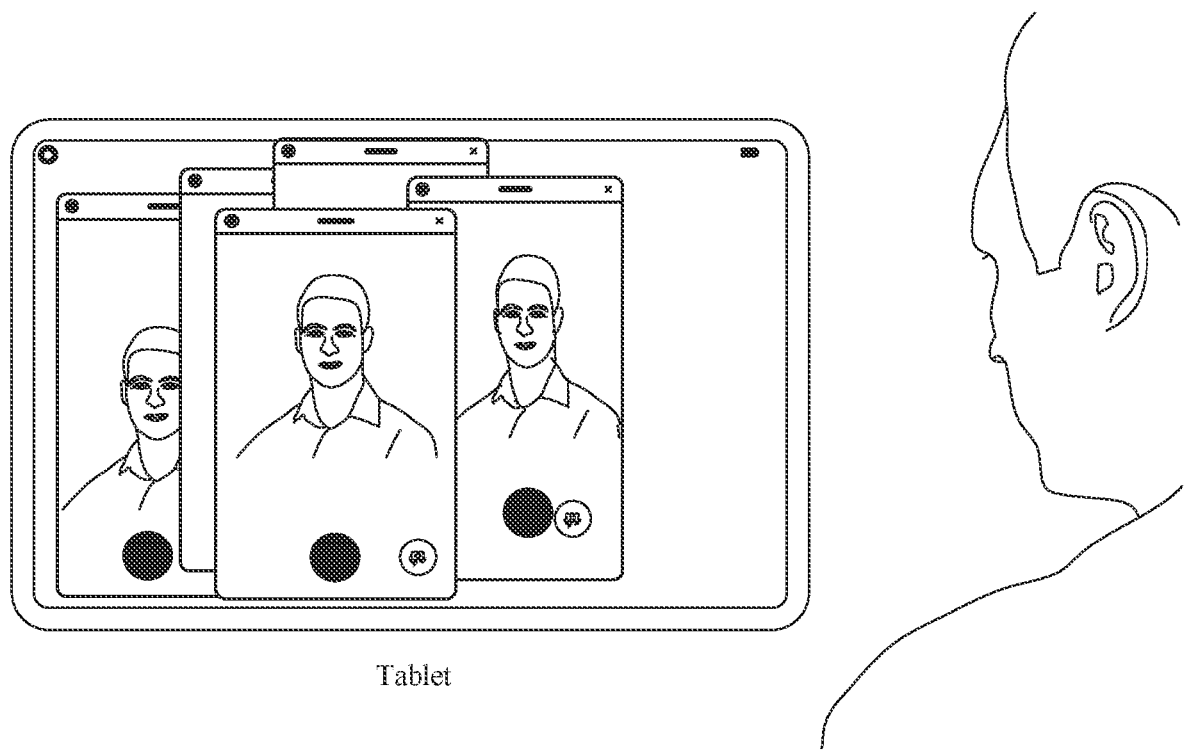
FIG. 2 is one of schematic diagrams of an example of an application scenario.

FIG. 2 is a schematic diagram of an application scenario of applying a camera invocation method according to an embodiment of this application. Refer to FIG. 2. In this embodiment of this application, a user may log in to a plurality of live broadcast platforms by using a tablet. For example, a display window of the tablet includes a plurality of floating windows, each floating window is used to display a display interface of a corresponding live broadcast platform, and an image displayed in the display interface of each live broadcast platform is an image captured by a camera of the tablet. It should be noted that, in this embodiment of this application, an application or an application twin that is invoking a camera is displayed in the foreground. For example, windows of all applications are floating windows, and the floating windows may not overlap at all or may partially overlap. For example, if a floating window of an application completely overlaps a floating window of another application, it may be considered that the application is displayed in the foreground, and an image captured by the camera in real time may be displayed. Optionally, if the floating window of the application completely overlaps a floating window of the another application, the blocked application may suspend invoking the camera, that is, the image is frozen. When a part or all of the floating window of the application is not blocked by the floating window of the another application, the image captured by the camera in real time is displayed again.

Figure 3:
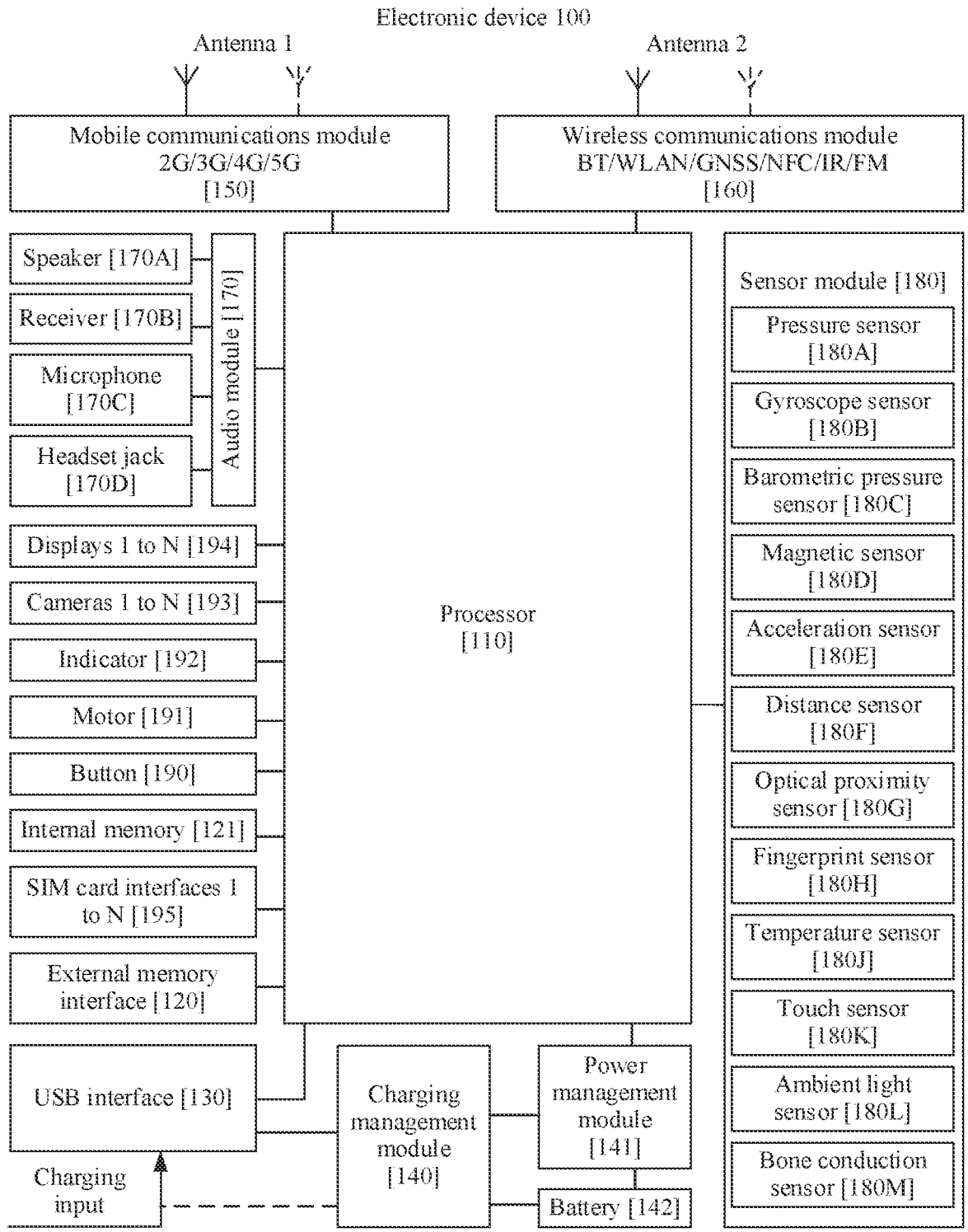
FIG. 3 is one of schematic diagrams of an example of a structure of an electronic device.

FIG. 3 is a schematic diagram of a structure of an electronic device 100. Optionally, the electronic device 100 may be a terminal, or may be referred to as a terminal device. The terminal may be a device having a camera, such as a cellular phone (cellular phone), a tablet computer (pad), a wearable device, or an Internet of Things device. This is not limited in this application. It should be noted that the schematic diagram of the structure of the electronic device 100 is applicable to the mobile phone in FIG. 1 and the tablet in FIG. 2. It should be further noted that the electronic device 100 may have more or fewer components than those shown in the figure, or two or more components may be combined, or a different component configuration may be used. Various parts shown in FIG. 3 may be implemented in hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction executing.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instruction or the data again, the processor may directly invoke the instruction or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communications solution that is applied to the electronic device 100 and that includes 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then the demodulator transfers the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another functional module.

The wireless communications module 160 may provide a solution that is applied to the electronic device 100 and is for wireless communications such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN. NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system(quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode QLED), or the like. In some embodiments, the electronic device 100 may include one or N displays 194, where N is a positive integer greater than 1.

In this embodiment of this application, the display 194 may display a shooting preview interface, a recording preview interface, a live broadcast preview interface, a code scanning preview interface, and the like, and may further display a video playback interface during video playback, and the like. It should be noted that, in this embodiment of this application, the preview interface (for example, a shooting preview interface or a live broadcast preview interface) is an interface in which a user can view, by using the display 194, an image currently captured by the camera in real time. A camera application is used as an example. After the camera application is started, a recording preview interface displayed by the display 194 displays a preview image currently captured by the camera. In response to a user operation, after the camera application starts recording, a recording image currently captured by the camera is displayed in the recording preview interface.

The electronic device 100 may implement a shooting function by using the ISP, the camera 193, the video coder/decoder, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through a lens, and is projected to a photosensitive element. The photosensitive element may be a charge coupled device (charge coupled device, CCD) or a complementary metal oxide semiconductor (complementary metal-oxide-semiconductor, CMOS) optoelectronic transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The camera 193 may be located m an edge area of the electronic device, may be an off-screen camera, or may be a pop-up camera. The cameras 193 may include a rear-facing camera, and may further include a front-facing camera. A specific location and form of the camera 193 are not limited in embodiments of this application. The electronic device 100 may include cameras of one or more focus lengths. For example, cameras of different focus lengths may include a long-focus camera, a wide-angle camera, an ultra-wide-angle camera, a panoramic camera, or the like.

Figure 4:
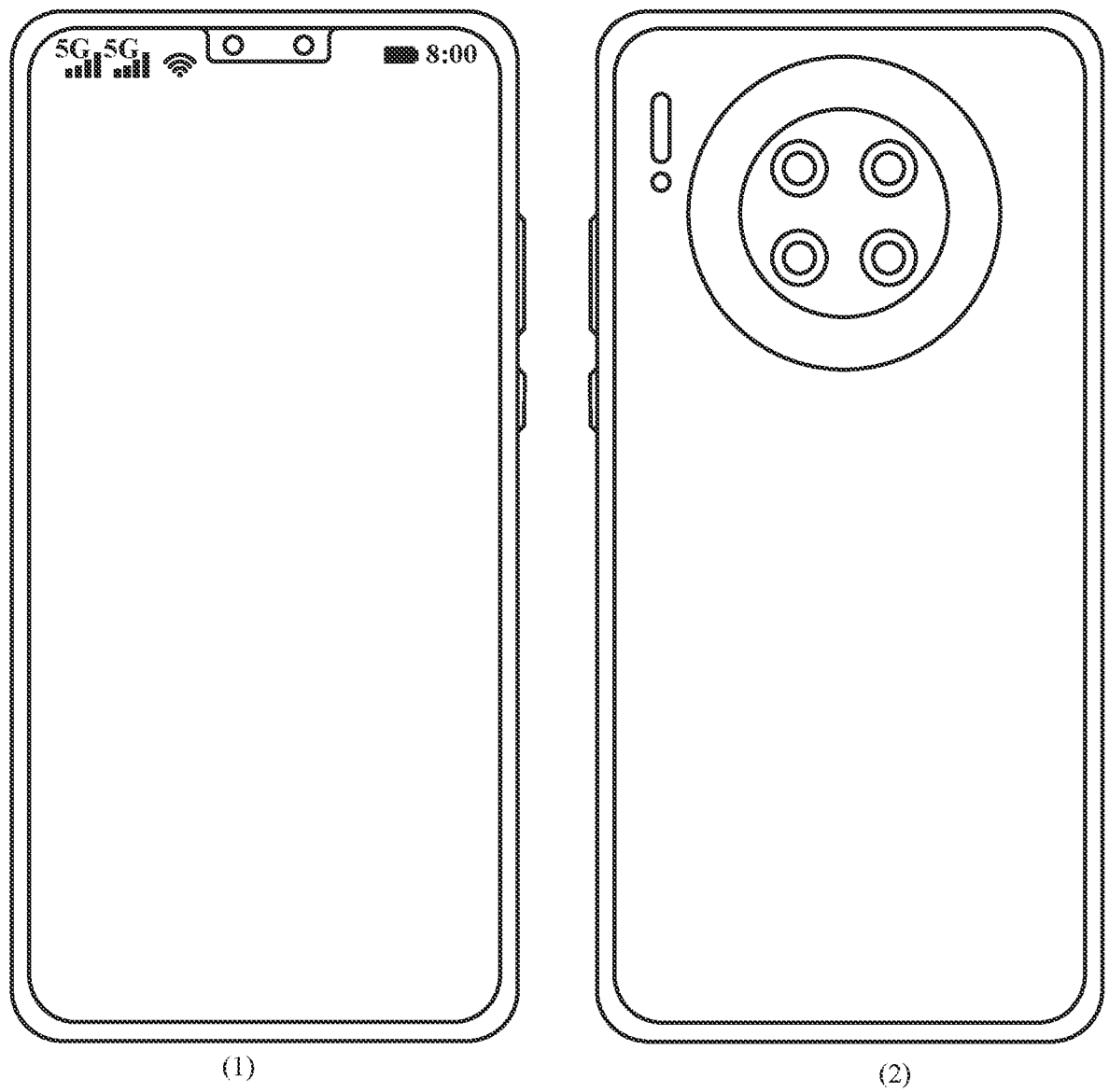
FIG. 4 is one of schematic diagrams of an example of a structure of an electronic device.

When the electronic device 100 is a mobile phone, FIG. 4 is a schematic diagram of a location of the camera 193 in the mobile phone. Refer to FIG. 4(1). For example, a front-facing camera is disposed on an upper part (near a top edge area) of a display of the mobile phone, and there may be one or more front-facing cameras. In this embodiment of this application, the mobile phone includes two front-facing cameras. It should be noted that a layout manner (for example, horizontal arrangement and spacing) of the cameras shown in FIG. 4(1) is merely an example. This is not limited in this application. Refer to FIG. 4(2). For example, one or more rear-facing cameras are disposed on the back (that is, a side opposite to the display) of the mobile phone. For example, the rear-facing cameras of the mobile phone in FIG. 4(2) include four cameras, and the four cameras may be considered as a rear-facing camera module, or may be considered as four separate cameras. The four cameras may include but are not limited to a wide-angle camera, an ultra-wide-angle camera, a panoramic camera, and the like. This is not limited in this application.

The digital signal processor is configured to process a digital signal, and may process another digital signal in addition to a digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The external memory interface 120 may be used to connect to an external storage card, for example, a micro SD card, to extend a storage capability of the electronic device 100. The external memory card communicates with the processor 110 by using the external memory interface 120, to implement a data storage function. For example, a music file or a video file is stored in the external storage card.

The internal memory 121 may be configured to store computer-executable program code. The executable program code includes instructions. The processor 110 runs the instructions stored in the internal memory 121, to perform the camera invocation method in this embodiment of this application. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function by using the audio module 170, the speaker 170A, the receiver 170B, the microphone 170C, the headset jack 170D, and the application processor, for example, music playing, recording, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise cancellation function. In some other embodiments, three, four, or more microphones 170C may alternatively be disposed in the electronic device 100, to collect a sound signal, implement noise cancellation, and identify a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

A software system of the electronic device 100 may use a layered architecture, an event-driven architecture, a microkernel architecture, a micro service architecture, or a cloud architecture. In this embodiment of the present invention, an Android system with a layered architecture is used as an example to illustrate the software structure of the electronic device 100.

Figure 5:
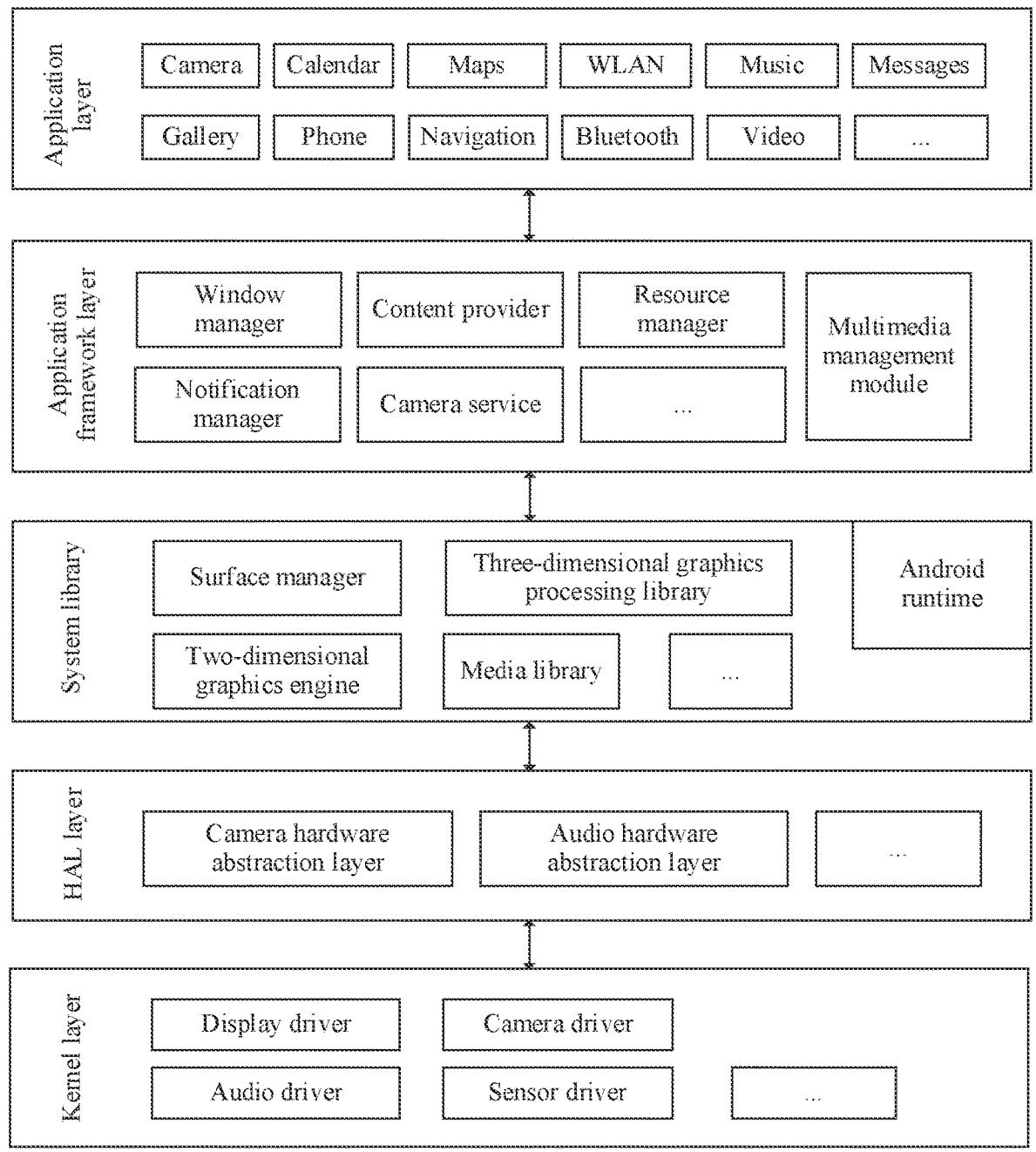
FIG. 5 is a schematic diagram of an example of a software structure of an electronic device.

FIG. 5 is a block diagram of a software structure of the electronic device 100 according to an embodiment of this application.

In a layered architecture of the electronic device 100, software is divided into several layers, and each layer has a clear role and task. The layers communicate with each other through a software interface. In some embodiments, an Android system is divided into five layers; an application layer, an application framework layer, Android runtime (Android runtime) and a system library, a hardware abstraction layer (hardware abstraction layer, HAL), and a kernel layer from top to bottom.

The application layer may include a series of application packages.

As shown in FIG. 5, the application packages may include applications such as Camera, Gallery, Calendar, Phone, Map, Navigation, WLAN, Bluetooth, Music, Videos, and Messages.

The application framework layer provides an application programming interface (Application Programming Interface, API) and a programming framework for an application at the application layer, and includes various components and services to support Android development by a developer. The application framework layer includes some predefined functions. As shown in FIG. 5, the application framework layer may include a view system, a window manager, a resource manager, a content provider, a notification manager, a camera service, a multimedia management module, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a bookmark, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or the indicator light blinks.

The camera service is used to invoke a camera (including a front-facing camera and/or a rear-facing camera) in response to a request of an application.

The multimedia management module is used to process an image based on configuration of the camera service. A specific processing process is described in detail in the following embodiment.

The system library and runtime layer includes a system library and Android runtime (Android Runtime). The system library may include a plurality of functional modules, such as a browser kernel, 3D graphics library (such as OpenGL ES), and font library. The browser kernel is responsible for interpreting web page syntax (for example, an application HTML or JavaScript in a standard general markup language) and rendering (displaying) a web page. The 3D graphics library is configured to implement three-dimensional graphics drawing, image rendering, composition, layer processing, and the like. The font library is used to implement inputs of different fonts. The Android runtime includes a kernel library and a virtual machine. The Android runtime is responsible for scheduling and management of the Android system. The kernel library includes two parts: a function that needs to be called in Java language and a kernel library of Android. The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

It may be understood that components included in the system framework layer and the system library and runtime layer shown in FIG. 5 do not constitute a specific limitation on the electronic device 100. In some other embodiments of this application, the electronic device 100 may include more or fewer components than those shown in the figure, or some components may be combined, or some components may be split, or different component arrangements may be used.

The HAL layer is an interface layer located between an operating system kernel and a hardware circuit. The HAL layer includes but is not limited to an audio hardware abstraction layer (Audio HAL) and a camera hardware abstraction layer (Camera HAL). The Audio HAL is configured to process an audio stream, for example, perform processing such as noise cancellation and directional enhancement on the audio stream. The Camera HAL is configured to process an image stream.

The kernel layer is a layer between hardware and the foregoing software layer. The kernel layer includes at least a display driver, a camera driver, an audio driver, and a sensor driver. The hardware may include components such as a camera, a display, a microphone, a processor, and a memory.

In this embodiment of this application, the display in the hardware may display a shooting preview interface, a video recording preview interface, and a shooting interface during video recording. The camera in the hardware may be configured to capture an image. The microphone in the hardware may be configured to collect a sound signal, and generate an analog audio electrical signal.

Figure 6:
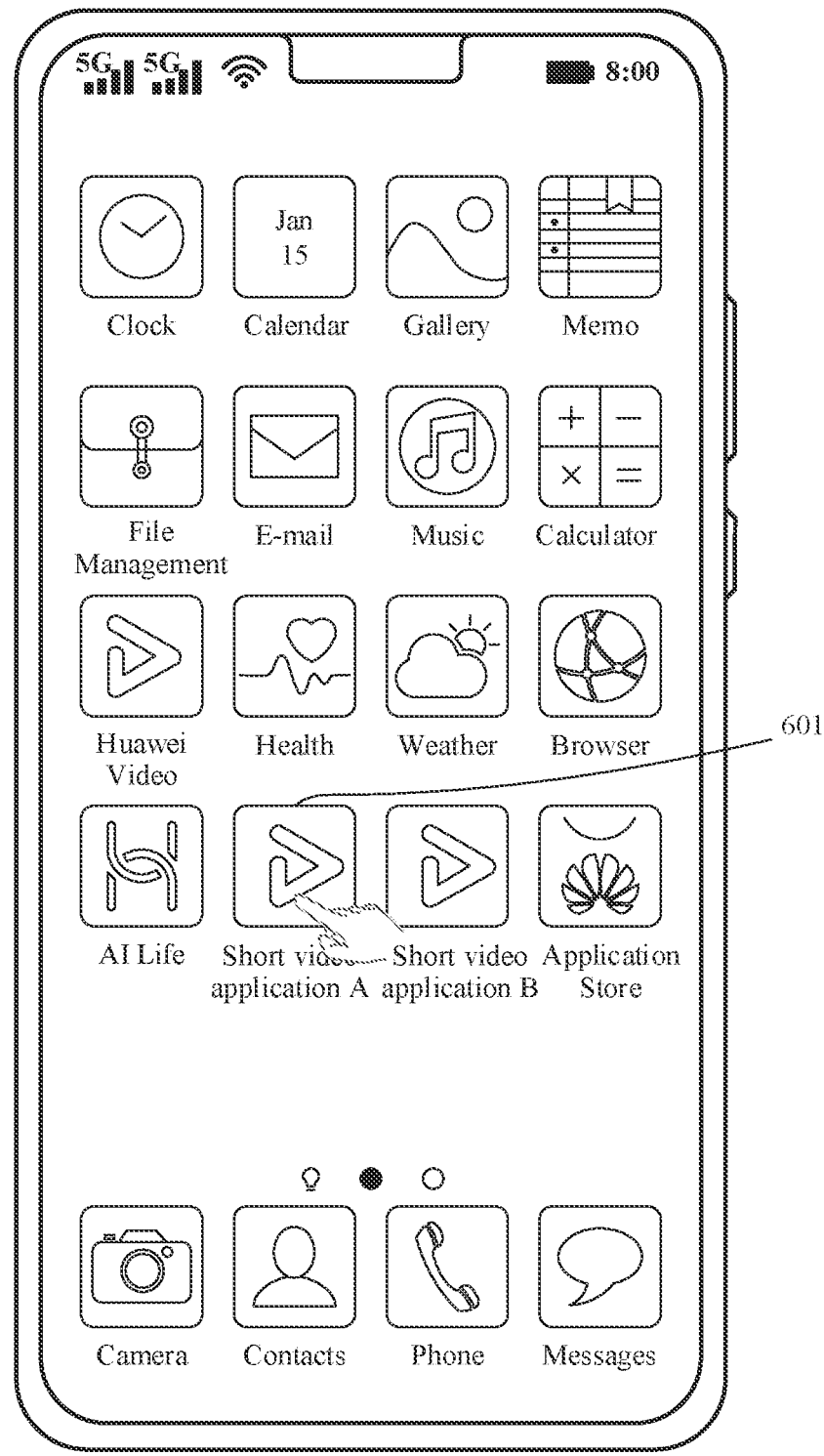
FIG. 6(1), FIG. 6(2), FIG. 6(3), and FIG. 6(4) are a schematic diagram of an example structure of an electronic device.
Figure 6:
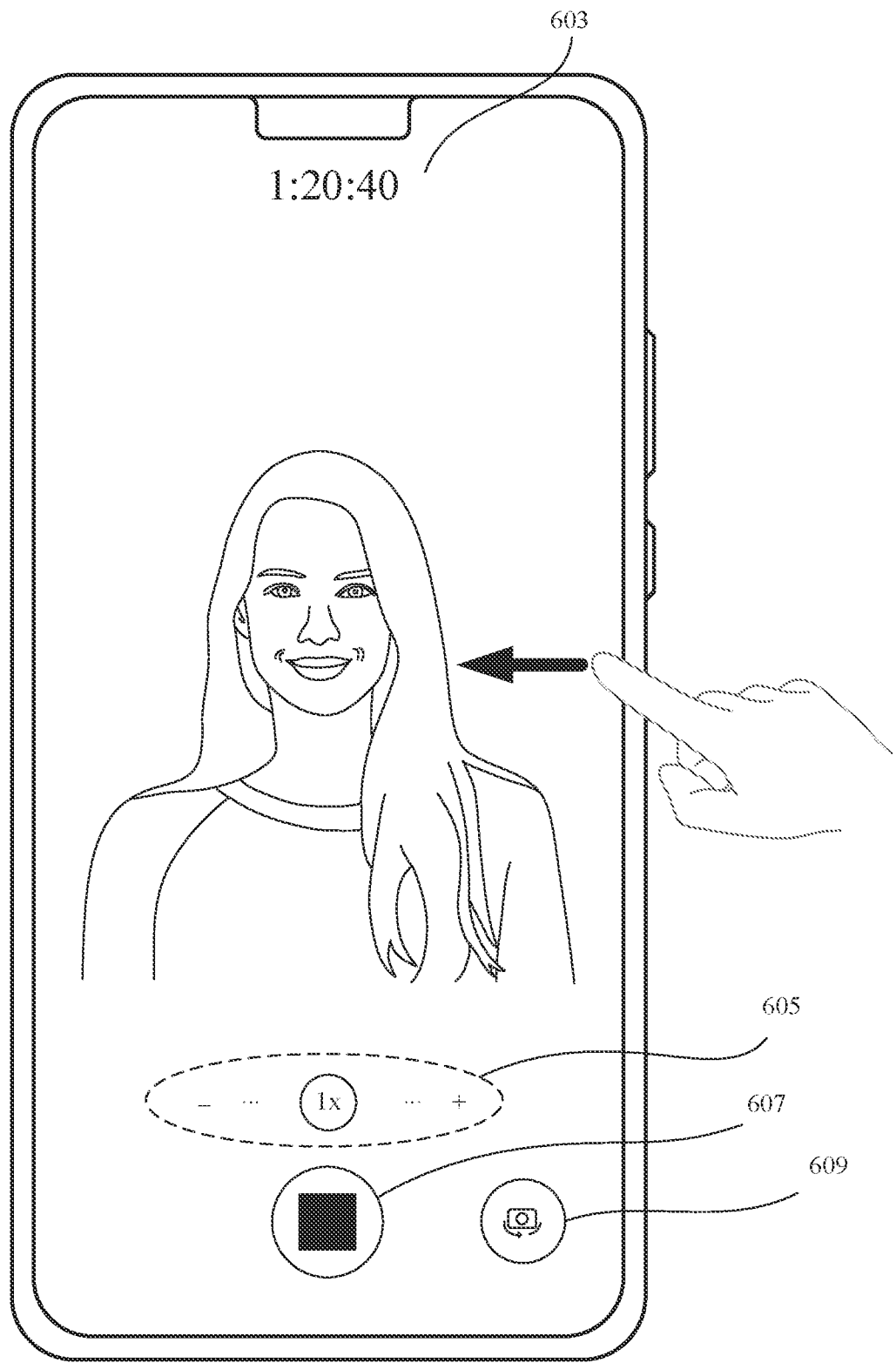
Figure 6:
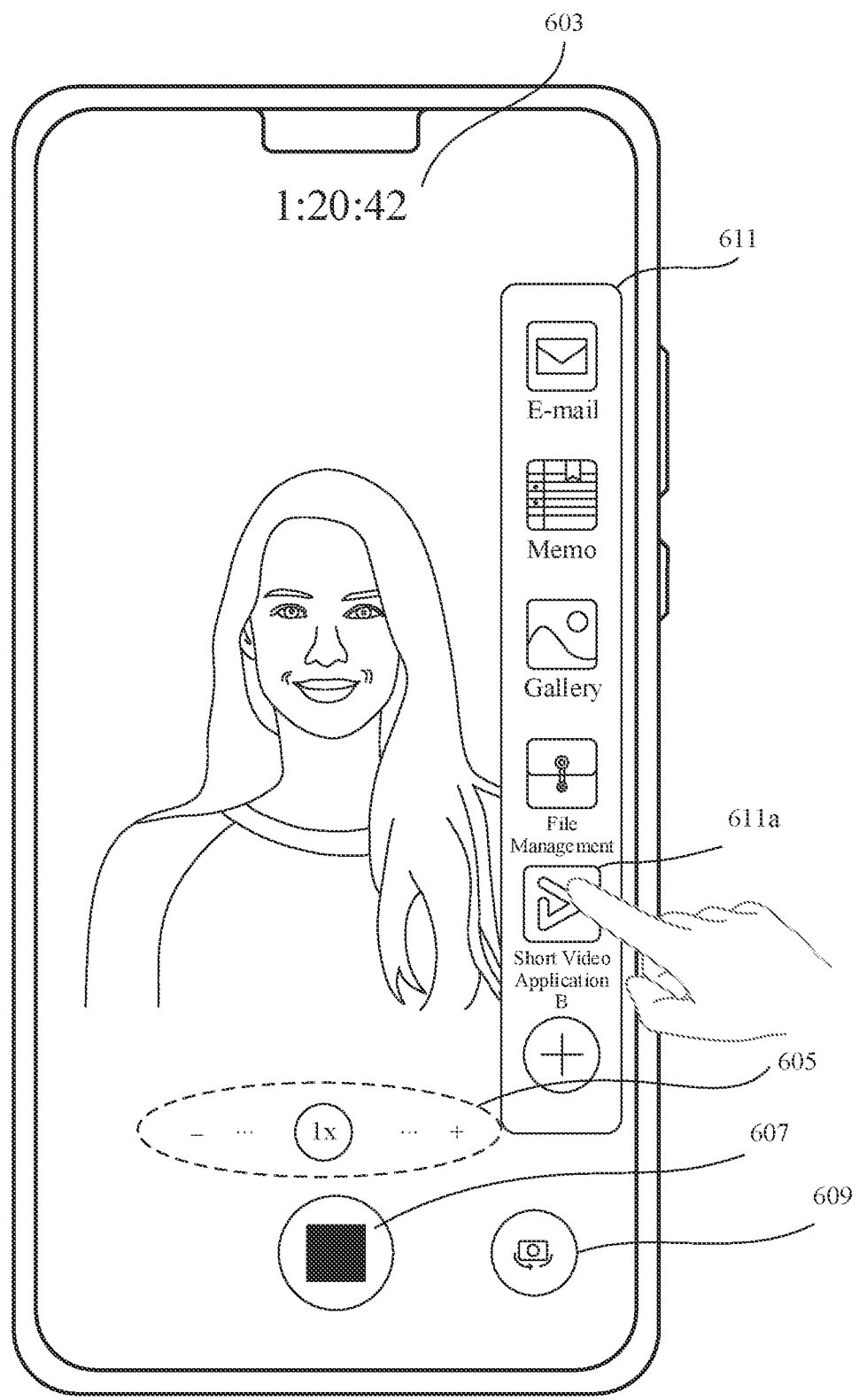
Figure 6:
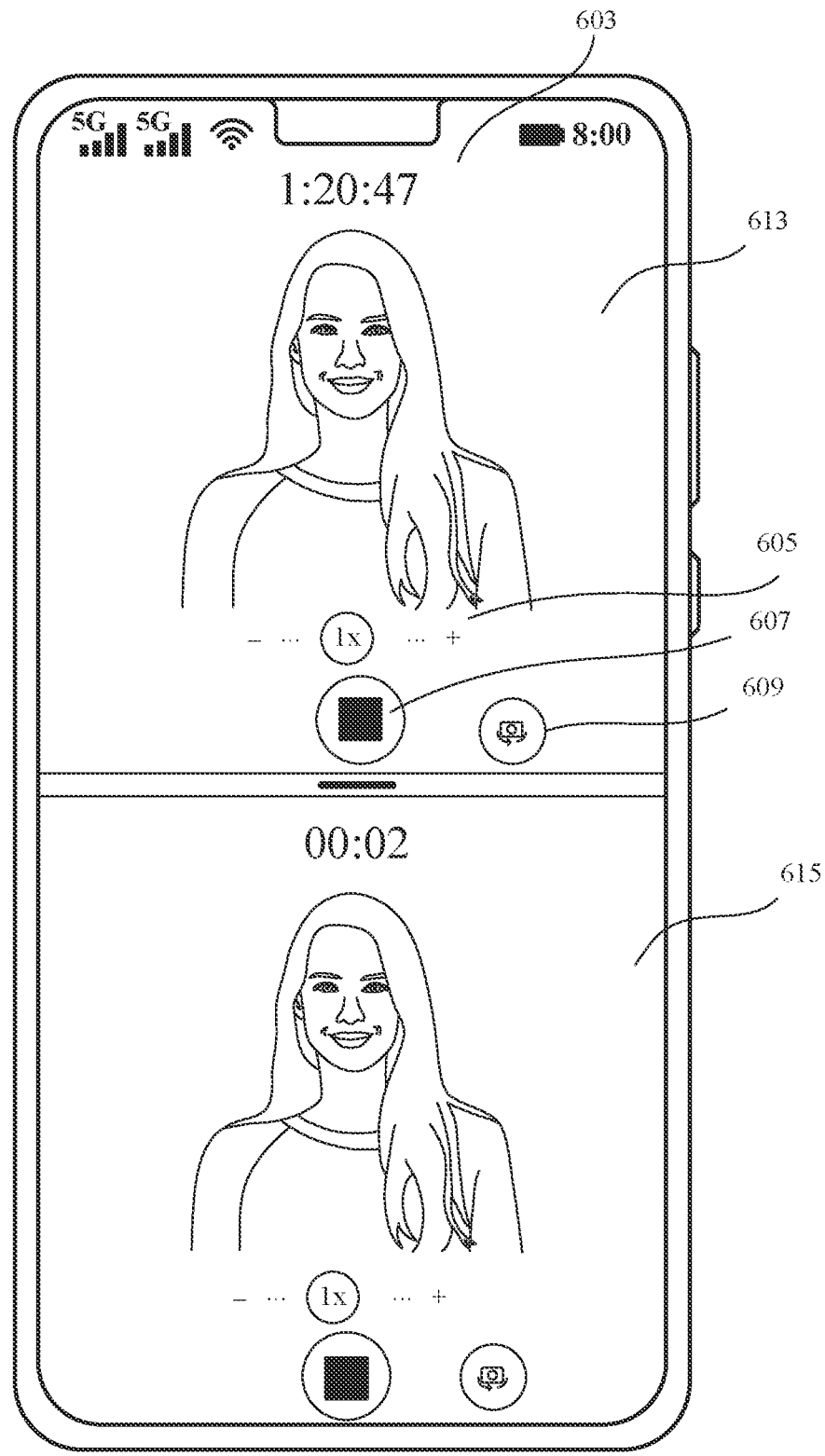

FIG. 6(1), FIG. 6(2), FIG. 6(3), and FIG. 6(4) are a schematic diagram of an example application scenario. Refer to FIG. 6(1). An example in which the electronic device is a mobile phone is used. For example, a display interface of the mobile phone includes one or more controls, and the controls include but are not limited to a power icon, a network icon, an application icon, and the like. A user may tap an icon 601 of a short video application A in the display interface, to start the short video application A. In response to the tapping operation of the user, the mobile phone starts the short video application A and displays an application interface of the short video application A. Refer to FIG. 6(2). As shown in FIG. 6(2), the application interface of the short video application A includes one or more controls, for example, may include a video recording option 607, a camera switching option 609, and a zoom option 605. For example, after the short video application A is started, the application interface includes a preview interface, and an image (which may be referred to as a preview image) captured by a camera (for example, a front-facing camera) is displayed in the preview interface. After the user taps the recording option 607, the short video application A starts recording (or live broadcast), and the preview interface continues to display an image (which may also be referred to as a recording image) captured by the camera. In addition, the short video application A may upload the image captured by the camera to a live broadcast platform server, and/or store the image locally. Optionally, in a recording process, the preview interface further includes recording duration 603. The recording duration is duration from a recording start moment (that is, after the user taps the recording option 607) to a current moment. The recording duration displayed in the accompanying drawings of this application is merely an example. This is not limited in this application, and details are not described in the following. It should be noted that, to avoid repeated description, for descriptions of the zoom option, the recording option, the camera switching option, the recording duration, and the like in the following electronic devices, refer to the descriptions in FIG. 6(1), FIG. 6(2), FIG. 6(3), and FIG. 6(4). Details are not described again in the following.

For example, the camera switching option 609 is used to switch the camera. For example, after the short video application A is started, a front-facing camera is enabled by default, that is, an image captured by the front-facing camera is displayed in the preview interface. If the user taps the camera switching option 609, the short video application A invokes a rear-facing camera, and the image captured by the rear-facing camera is displayed in the preview interface. In this embodiment of this application, only a recording function of a short video application is used as an example for description. In another embodiment, this application is also applicable to a function or an application such as a video call or live broadcast.

For example, the zoom option 605 is used to adjust a shooting focal length, so that an image in a zoom range corresponding to a zoom ratio is displayed in the preview interface. Optionally, in this embodiment of this application, an initial zoom ratio is 1× by default.

Still refer to FIG. 6(2). In this embodiment of this application, in a process in which a user performs recording by using the short video application A, the user may slide from a right edge (or a left edge) to a center of a display window and stay, and a sidebar 611 is displayed in a right edge (or a left edge) of the application interface of the short video application A. Refer to FIG. 6(3). As shown in FIG. 6(3), the sidebar includes one or more controls, for example, includes an icon of an email application, an icon of a memo application, an icon of a gallery application, an icon of a file management application, and an icon 611a of a short video application B. and may further include an add option, where the option is used to add an icon of a specified application to the sidebar. It should be noted that names, quantities, and locations of applications in FIG. 6(3) are merely examples, and this is not limited in this application.

Still refer to FIG. 6(3). For example, the user may tap or drag the icon 611a of the short video application B in the side bar, to start the short video application B. For example, the user may drag the icon of the short video application B to a lower half area of the display window of the mobile phone and release the icon. The mobile phone splits the display window of the mobile phone in response to the operation of the user, and a display window 613 and a display window 615 are obtained. As shown in FIG. 6(4), for example, the display window 613 of the mobile phone is used to display the application interface of the short video application A. and the display window 615 is used to display an application interface of the short video application B.

Still refer to FIG. 6(4). For example, for one or more controls included in the application interface of the short video application A, refer to the foregoing description. Details are not described herein again. The application interface (which may also be referred to as a preview interface) of the short video application B includes one or more controls, such as a recording option, a camera switching option, and a zoom option. For specific descriptions, refer to descriptions of the application interface of the short video application A. Details are not described herein again. An image captured by a camera (the camera may be a front-facing camera or a rear-facing camera, and in this embodiment of this application, an example in which a camera opened by default is a front-facing camera is used for description) is displayed on the preview interface of the short video application B. For example, the user may tap the recording option in the application interface of the short video application B. The short video application B starts video recording in response to the tap operation of the user, that is, displays, in the preview interface, an image captured by the front-facing camera. In addition, the short video application B saves the image, and/or transmits the image to a server.

For example, the camera in the electronic device can be invoked by only one application. If the operation in FIG. 6(3) occurs, an image displayed by a previous application that invokes the camera is frozen. FIG. 6(4) is used as an example. After the user starts the short video application B, the short video application B invokes the camera, that is, obtains and displays an image captured by the camera, but the short video application A cannot invoke the camera. Therefore, an image of the short video application A is frozen. In other words, the display window 613 displays only the last image obtained by the short video application A before the short video application B is started (that is, the short video application B invokes the camera), and does not display an image subsequently obtained by the camera Optionally, after the user starts the short video application B, the short video application B invokes the camera by default after the short video application B is started, and prompt information indicating that the camera cannot be invoked may also appear in the screen of the mobile phone. Correspondingly, if the user needs to use both the short video application A and the short video application B for recording, the user can only use the manner in FIG. 1, that is, use a plurality of electronic devices to log in to different applications to perform recording.

This embodiment of this application provides a camera invocation method. Specifically, the camera in the electronic device in this embodiment of this application may be simultaneously invoked by one or more applications, and the one or more applications may obtain and display an image captured by the camera. In other words, according to the camera invocation method in this embodiment of this application, the short video application A and the short video application B in FIG. 6(4) may simultaneously invoke the camera, and display, in the preview interface, an image captured by the camera in real time.

It should be noted that in this embodiment of this application, only the short video application A, the short video application B, and the camera application are used as an example for description. In another embodiment, a specific implementation of this application may also be applied to another scenario in which a camera needs to be invoked, for example, a scenario in which one camera is shared by a plurality of applications, such as a short video application, a code scanning payment function in a payment application, a video call, a video call function in a chat application, and the like. Details are not described in this application again.

In a possible application scenario, the short video application A invokes the front-facing camera of the mobile phone, and the short video application B invokes the rear-facing camera of the mobile phone. In another possible application scenario, a video call application invokes the front-facing camera of the mobile phone to make a video call with another contact. In addition, while the video call is not interrupted, a payment application invokes the rear-facing camera of the mobile phone, and completes a shopping and payment operation by using a code scanning payment function.

Scenario 1

The following describes specific implementations of this embodiment of this application in detail with reference to FIG. 7 to FIG. 14. Specifically, a process in which an application (for example, the short video application A or the short video application B) invokes a camera may be divided into two parts. A first part is a creation process, which may be understood as a preparation process. The creation process is mainly a process in which each module creates a corresponding instance and exchanges control information. A second part is a recording process, that is, a process in which each module or an instance in each module processes an image captured by the camera. It should be noted that the "instance" in this embodiment of this application may also be understood as program code or process code that is run in a process.

Figure 7:
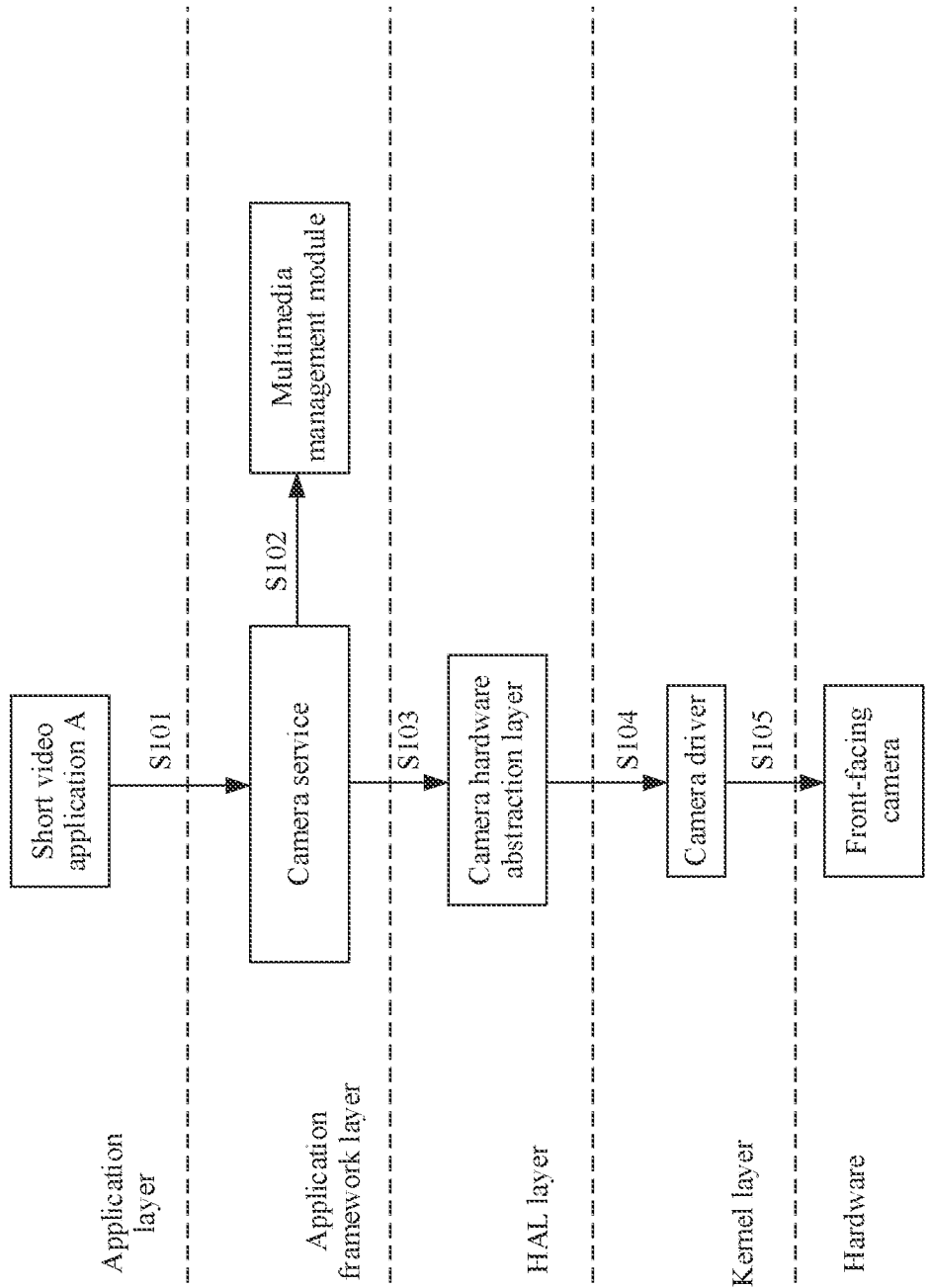
FIG. 7 is one of schematic diagrams of module interaction according to an embodiment of this application.

With reference to a schematic flowchart of interaction between modules shown in FIG. 7, the following describes in detail a creation process in a process of invoking a camera by the short video application A. Referring to FIG. 7, the process specifically includes the following steps.

S101: The short video application A invokes a camera service, and the camera service performs corresponding processing.

For example, after the short video application A is started (for example, the processes shown in FIG. 6(1) and FIG. 6(2)), the short video application A invokes the camera service. For example, the short video application A sends a request message to the camera service. The request message may include but is not limited to: an application ID (for example, an application package name) of the short video application A, a PID (Process Identification, process identification) of the short video application A, configuration information (which may also be referred to as requirement information, where to distinguish the configuration information of the short application A from the following configuration information of a short video application B, the configuration information of the short video application A is referred to as configuration 1 for short below) of the short video application A, and the like. For example, the configuration may include a resolution (for example, 1080*720) corresponding to an image displayed by the short video application A.

Optionally, the request message may alternatively not include the application ID. For example, the request message includes configuration information. For example, the camera service may obtain, by using an application layer interface, an application ID and a PID of an application corresponding to a received request message.

Figure 8:
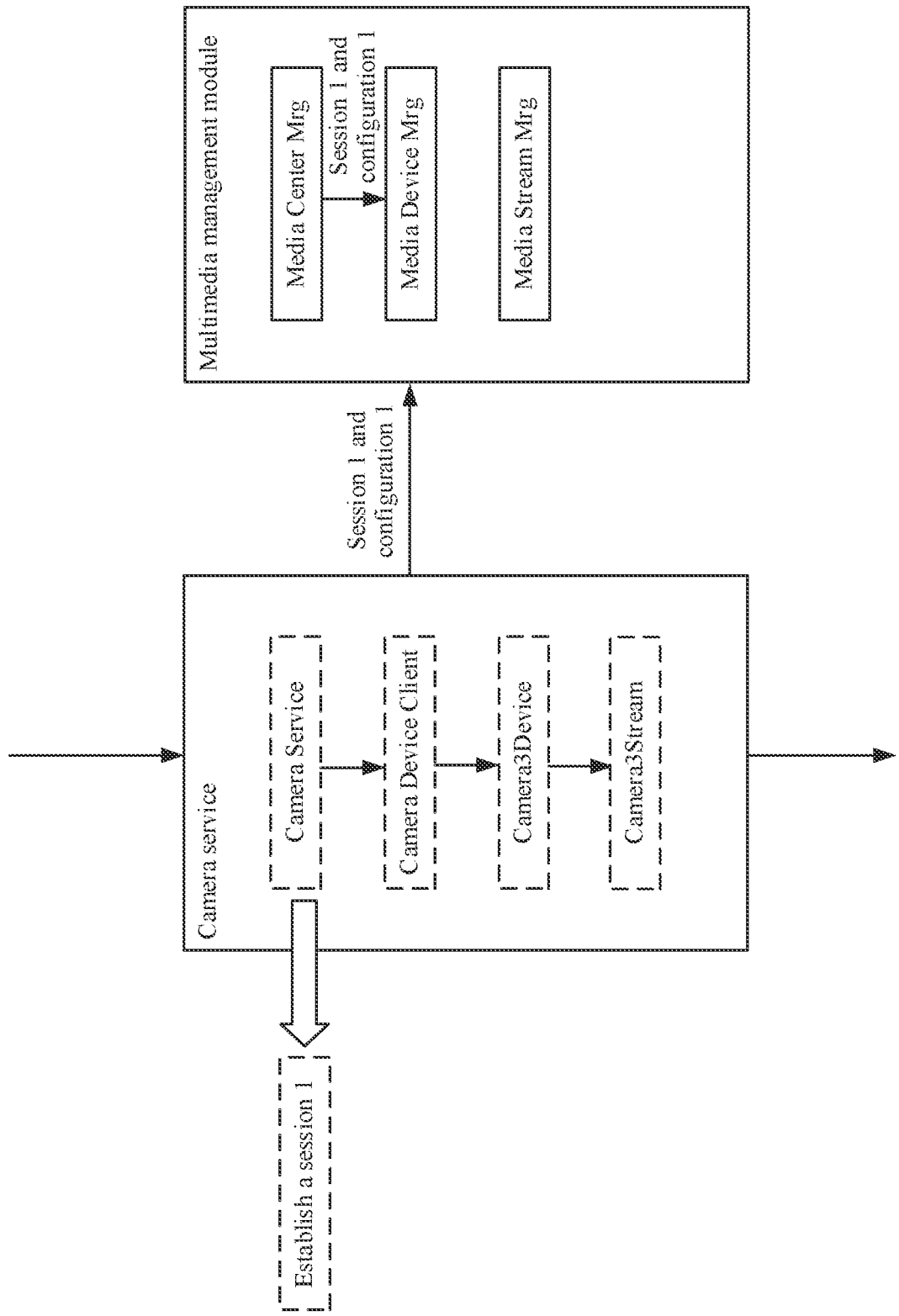
FIG. 8 is one of schematic diagrams of module interaction according to an embodiment of this application.

FIG. 8 is a schematic diagram of interaction between the camera service and a multimedia management module. Referring to FIG. 8, for example, steps of performing the corresponding processing by the camera service include:

creating a Camera Service (camera service) instance, a Camera Device Client (camera device client) instance, a Camera3Device (camera device, where the number 3 indicates a version number of the camera service, and can be updated when a version is updated) instance, and a Camera3Stream (camera data stream) instance. Specifically, the camera service creates the foregoing instances in response to a request of the short video application A. The following describes a function of each instance in detail.

The Camera Service instance is used to provide an API for an application at the application layer and create a corresponding session (Session) based on a request of the application (such as the short video application A). The short video application A is used as an example. The Camera Service instance may receive, based on the API, the request (including the application ID, the configuration 1, and the like) input by the short video application A. The Camera Service instance may create a corresponding session (for example, identification information of the session is session 1) based on the request of the short video application A, and output the application ID of the short video application A, the configuration 1, and the identification information (that is, the session 1) of the session to the Camera Device Client instance.

The Camera Device Client instance can be considered as a client of the camera service. It provides an E interface for the camera service to exchange data with other modules. The Camera Device Client instance stores a correspondence between the application ID and the session 1, and outputs the application ID of the short video application A, the configuration 1, and the session 1 to the Camera3Device instance.

The Camera3Device instance is used to provide an interface for an HAL layer and transparent transmission of data (such as an image). Specifically, the Camera3Device instance records a correspondence between information based on the application ID of the short video application A, the configuration 1, and the session 1 that are input by the Camera Device Client instance, outputs the configuration 1 and the session 1 to the multimedia management module, and outputs the application ID and the session 1 to the Camera3Stream instance.

The Camera3Stream instance is used to perform corresponding processing on an image. Specifically, the Camera3Stream instance correspondingly stores the application ID of the short video application A input by the Camera3Device instance and the session 1.

S102: The camera service outputs the session 1 and the configuration 1 to the multimedia management module, and the multimedia management module performs corresponding processing.

For example, as described above, the Camera3Device instance outputs the configuration 1 and the session 1 to the multimedia management module.

Still refer to FIG. 8. For example, the multimedia management module includes: a Media Center Mrg (multimedia management center) module (which may also be referred to as a sub-module or unit) responsible for providing an interface and performing logic interaction with an external module; a Media Device Mrg (multimedia device management center) module responsible for operations such as saving, adding, and deleting information such as configuration information and a session; and a Media Stream Mrg (multimedia data management center) module responsible for data conversion, resolution adaptation, and data distribution. For example, the Media Center Mrg module receives the configuration 1 and the session 1 that are input by the Camera3Device instance, and the Media Center Mrg module outputs the session 1 and the configuration 1 to the Media Device Mrg module. For example, the Media Device Mrg module records a correspondence between the session 1 and the configuration 1. The Media Stream Mrg module is mainly configured to process an image. A specific processing process is described in detail in the following recording process.

S103: The camera service invokes a Camera HAL.

S104: The Camera HAL invokes a camera driver at a kernel layer.

S105: The camera driver invokes a front-facing camera.

For example, the camera service invokes the Camera HAL, and the Camera HAL performs corresponding processing, for example, establishes a corresponding instance. For example, the Camera HAL invokes the camera driver, and the camera driver performs corresponding processing, for example, establishes a corresponding instance.

For example, the front-facing camera starts to capture an image in response to invoking of the camera driver. It should be noted that, in a creation process, instances or modules in the Camera HAL and the camera driver perform corresponding processing on data (for example, an image). For a specific processing process, refer to a technical solution in an embodiment of the conventional technology. Details are not described again in this application.

Figure 9:
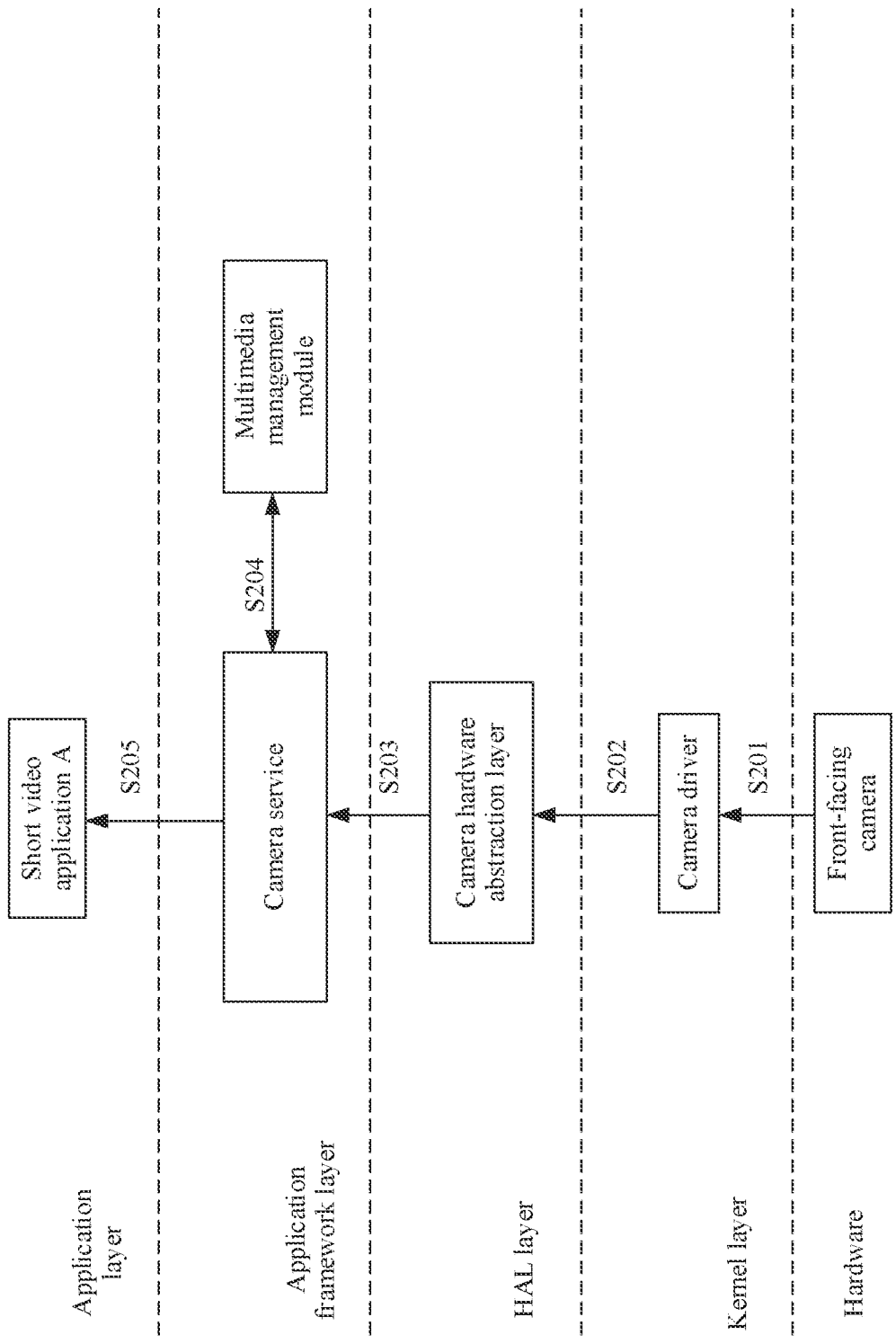
FIG. 9 is one of schematic diagrams of module interaction according to an embodiment of this application.

With reference to a schematic flowchart of interaction between modules shown in FIG. 9, the following describes in detail a recording process in the process in which the short video application A invokes the camera. Refer to FIG. 9. The process specifically includes the following steps.

S201: The camera outputs a captured image to the camera driver.

S202: The camera driver outputs the image to the Camera HAL.

S203: The Camera HAL outputs the image to the camera service.

For example, the camera driver obtains the image captured by the front-facing camera, and outputs the image of the front-facing camera to the Camera HAL. The Camera HAL outputs the image captured by the front-facing camera to the camera service.

S204: The camera service outputs the image and the session 1 to the multimedia management module, and the multimedia management module performs corresponding processing, and outputs a processed image and the session 1 to the camera service.

Figure 10:
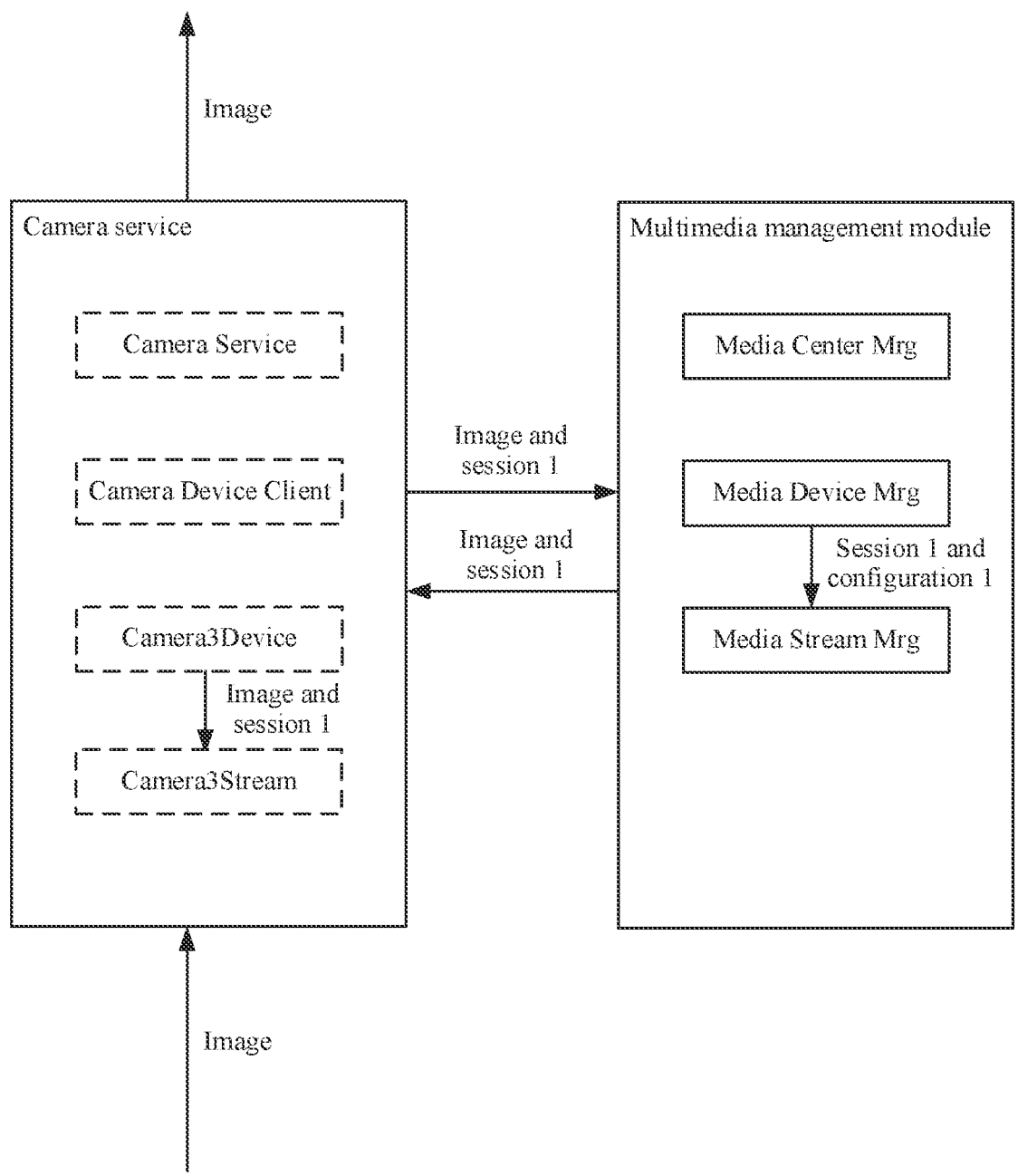
FIG. 10 is one of schematic diagrams of module interaction according to an embodiment of this application.

FIG. 10 is a schematic diagram of interaction between the camera service and the multimedia management module. Refer to FIG. 10. For example, the Camera3Device instance receives the image input by the Camera HAL, the Camera3Device instance detects a currently stored session, that is, the session 1 and other information (including the application ID and the configuration 1) that are currently stored, and the Camera3Device instance outputs the image and the session 1 to the multimedia management module.

Still refer to FIG. 10. For example, the Media Stream Mrg module in the multimedia management module obtains, from the Media Device Mrg module based on the received image and the session 1, the configuration 1 corresponding to the session 1. The Media Device Mrg module may process the image based on the configuration 1, for example, adjust a resolution. The Media Device Mrg module outputs the processed image and the session 1 to the camera service.

In a possible implementation, when detecting that only the session 1 and corresponding information currently exist, the camera service may not interact with the multimedia management module, but directly performs S205, that is, outputs the image to the short video application A.

In another possible implementation, the multimedia management module may alternatively determine a corresponding configuration by using the application ID as retrieval information. For example, in a control flow transmission phase (for example, S102), the camera service may output the application ID and the configuration 1 to the multimedia management module. Correspondingly, in S204, the multimedia management module may determine the corresponding configuration 1 based on the application ID, and process the image based on the configuration 1. Optionally, the camera service may output the session 1, the application ID, and the configuration 1 to the multimedia management module. The multimedia management module may determine the corresponding configuration 1 based on at least one piece of retrieval information in the session 1 and the application ID. In this embodiment of this application, only an association relationship between a session and a configuration is used as an example for description. Specifically, an association relationship between the configuration and retrieval information (including information such as a session, an ID, and a PID that can be used to uniquely determine a correspondence between the configuration and an application) may be set based on an actual requirement. This is not limited in this application, and details are not described below again.

S205: The camera service outputs the image to the short video application A.

Still refer to FIG. 10. For example, the Camera3Device instance receives the image (that is, the processed image) and the session 1 that are input by the multimedia management module, and the Camera3Device instance outputs the image and the session 1 to the Camera3Stream instance. For example, the Camera3Stream instance outputs the image to the short video application A based on the recorded correspondence between the session 1 and the application ID of the short video application A.

Figure 11:
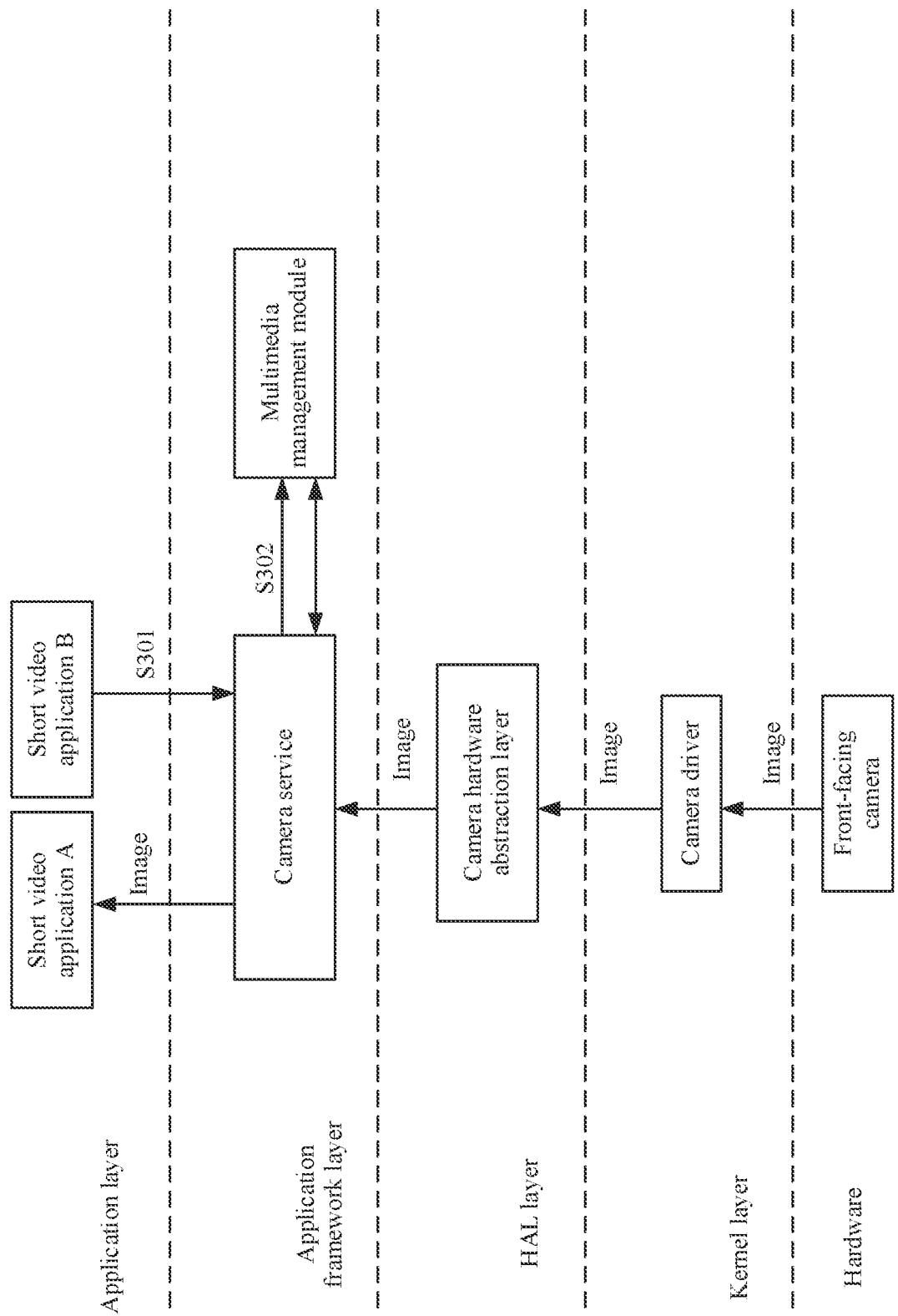
FIG. 11 is one of schematic diagrams of module interaction according to an embodiment of this application.

With reference to a schematic flowchart of interaction between modules shown in FIG. 11, the following describes in detail a creation process corresponding to the short video application B in a process in which the short video application A and the short video application B invoke the camera. Refer to FIG. 11. The process specifically includes the following steps.

S301: The short video application B invokes the camera service, and the camera service performs corresponding processing.

For example, after the short video application B is started (for example, the processes shown in FIG. 6(3) and FIG. 6(4)), the short video application B invokes the camera service. For example, the short video application B sends a request message to the camera service, where the request message may include but is not limited to an application ID of the short video application B, configuration information of the short video application B (configuration 2 for short below), and the like. For example, the configuration 2 may include that a resolution corresponding to an image displayed by the short video application B is 1280*720.

Figure 12:
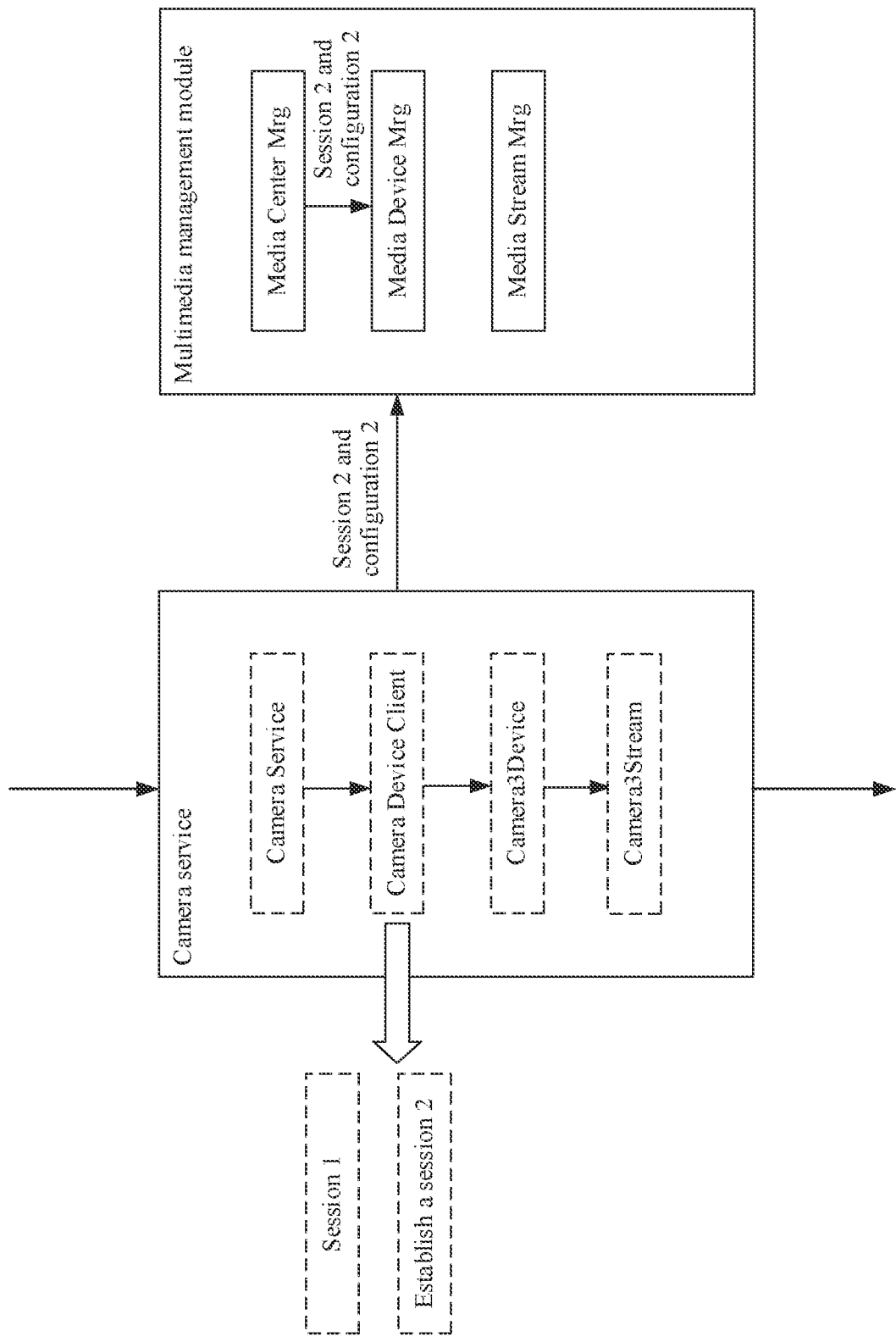
FIG. 12 is one of schematic diagrams of module interaction according to an embodiment of this application.

FIG. 12 is a schematic diagram of interaction between the camera service and the multimedia management module. Refer to FIG. 12. For example, corresponding processing by the camera service includes the following steps.

After receiving the request from the short video application B, the Camera Service instance outputs the application ID of the short video application B and the configuration 2 to the Camera Device Client instance. The Camera Device Client instance creates a corresponding session (identification information of the session is session 2) in response to the application ID of the short video application B and the configuration 2 that are input by the Camera Service instance. For example, the Camera Device Client instance outputs the application ID of the short video application B, the configuration 2, and the session 2 to the Camera3Device instance. For example, the Camera3Device instance stores a correspondence between the application ID of the short video application B, the configuration 2, and the session 2, outputs the application ID of the short video application B and the session 2 to the Camera3Stream instance, and outputs the session 2 and the configuration 2 to the multimedia management module.

It should be noted that descriptions of a part that is not described in FIG. 12 are the same as or similar to the descriptions in FIG. 8, and details are not described herein again.

S302: The camera service outputs the session 2 and the configuration 2 to the multimedia management module, and the multimedia management module performs corresponding processing.

For example, as described above, the Camera3Device instance outputs the configuration 2 and the session 2 to the multimedia management module.

Still refer to FIG. 11. For example, the Media Center Mrg module receives the configuration 2 and the session 2 that are input by the Camera3Device instance, and the Media Center Mrg module outputs the session 2 and the configuration 2 to the Media Device Mrg module. For example, the Media Device Mrg module records a correspondence between the session 2 and the configuration 2.

For example, because the camera service detects that the camera has been invoked, the camera service does not perform steps S103 to S105 in this creation process. For example, the camera service detects an established session (for example, a session list may be generated, and a correspondence between a session and information such as an application ID and a configuration is recorded in the list), and determines that a session 1 already exists. Therefore, the camera may determine that an application corresponding to the session 1 is currently invoking the camera. In this case, the camera service does not repeatedly invoke a lower-layer module (for example, a Camera HAL module).

It should be noted that, as shown in FIG. 11, in a process of executing the creation process corresponding to the short video application B, the short video application A is still performing the recording process, that is, the short video application A obtains, by using the camera driver, the Camera HAL, the camera service, and the multimedia management module, the image captured by the front-facing camera, and displays the image.

Figure 13:
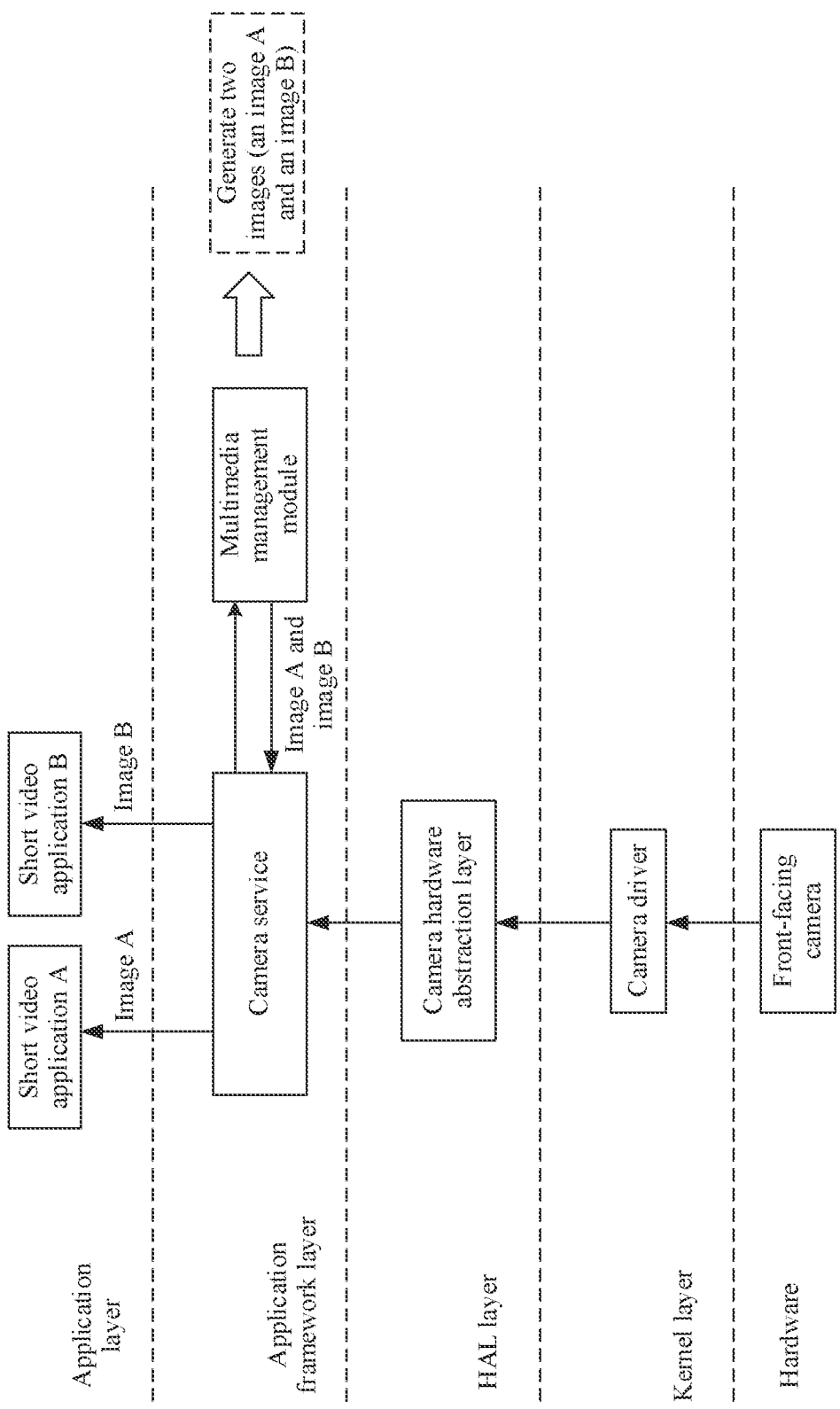
FIG. 13 is one of schematic diagrams of module interaction according to an embodiment of this application.

With reference to a schematic flowchart of interaction between modules shown in FIG. 13, the following describes in detail a recording process of the short video application A and the short video application B in a process of invoking the camera by the short video application A and the short video application B. Refer to FIG. 13. The process specifically includes the following steps.

The camera service obtains the image captured by the front-facing camera. For a specific process, refer to S301 to S303. Details are not described herein again.

Still refer to FIG. 13. For example, the camera service interacts with the multimedia management module, to obtain two images (including an image A and an image B) generated by the multimedia management module, outputs the image A to the short video application A. and outputs the image B to the short video application B. The short video application A may display the image A in a recording interface, and the short video application B may display the image B in a recording interface.

Figure 14:
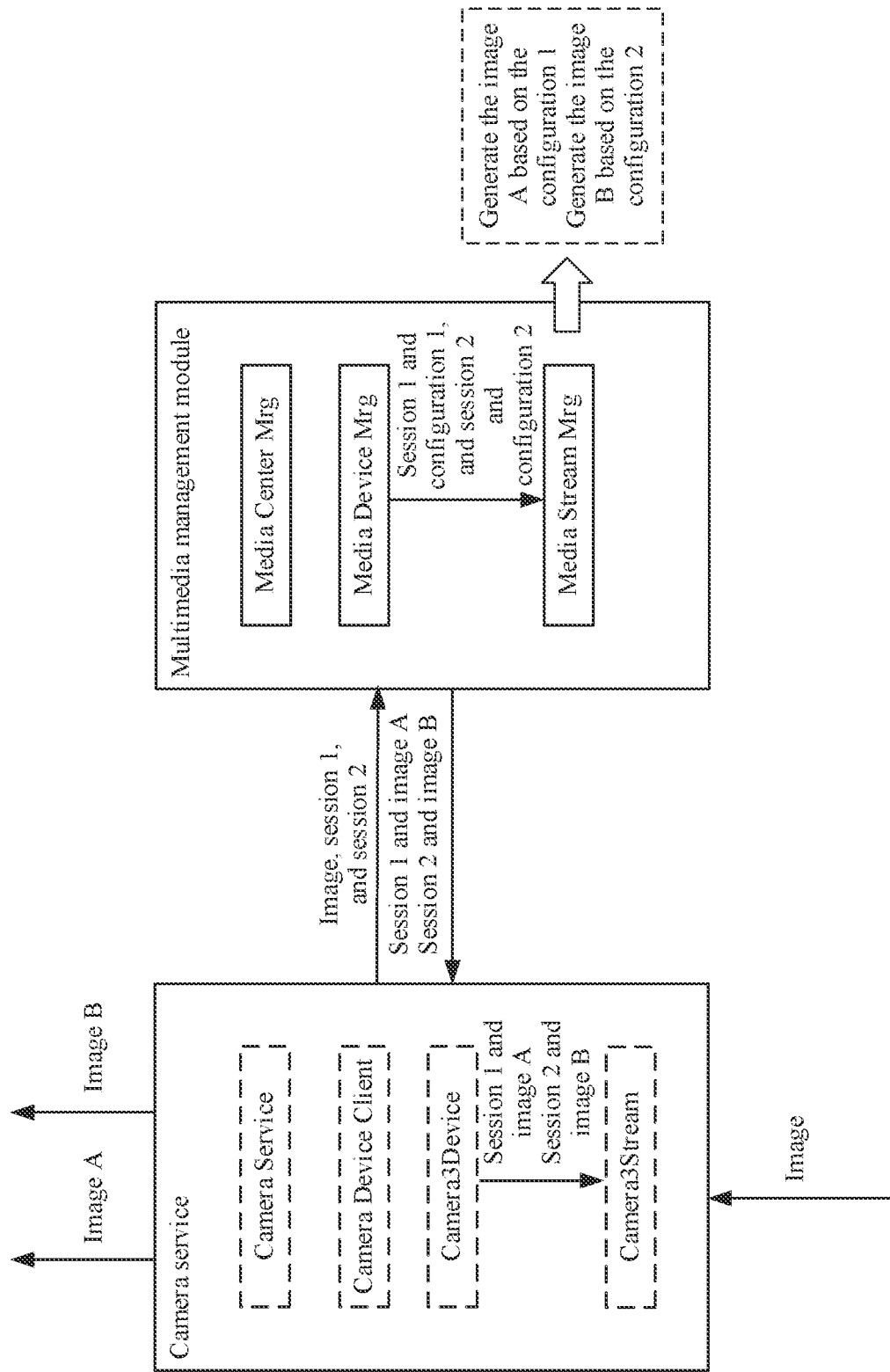
FIG. 14 is one of schematic diagrams of module interaction according to an embodiment of this application.

With reference to a schematic diagram of interaction between the camera service and the multimedia management module shown in FIG. 14, the following describes in detail the foregoing interaction process between the camera service and the multimedia management module. Refer to FIG. 14. For example, the Camera3Device instance receives an image input by the Camera HAL, and the Camera3Device instance detects currently stored sessions, to be specific, currently the session 1 and other information (including the application ID of the short video application A and the configuration 1), and the session 2 and other information (including the application ID of the short video application B and the configuration 2) are stored. The Camera3Device instance outputs the image, the session 1, and the session 2 to the multimedia management module.

Still refer to FIG. 14. For example, the Media Stream Mrg module in the multimedia management module obtains, the configuration 1 corresponding to the session 1 and the configuration 2 corresponding to the session 2 from the Media Device Mrg module based on the received image, the session 1, and the session 2. The Media Device Mrg module copies the image to obtain two images. The Media Device Mrg module processes one of the images based on the configuration 1, for example, adjusts a resolution of the image to 1080*720, to obtain the image A. In addition, the Media Device Mrg module processes the other image based on the configuration 2, for example, adjusts a resolution of the image to 1280*720, to obtain the image B. The Media Device Mrg module correspondingly outputs the session 1 and the image A, and the session 2 and the image B to the camera service.

Still refer to FIG. 14. For example, the Camera3Device instance receives the session 1 and the image A, and the session 2 and the image B that are input by the multimedia management module. The Camera3Device instance correspondingly outputs the session 1 and the image A, and the session 2 and the image B to the Camera3Stream instance. For example, the Camera3Stream instance outputs the image A to the short video application A based on the recorded correspondence between the session 1 and the application ID of the short video application A.

It should be noted that in this embodiment of this application, when modules or instances interact with each other, ACK information may be fed back, to notify the peer end that information or data has been successfully received. For example, after the short video application A sends an invocation request to the camera service, when receiving the request, the camera service feeds back ACK information to the short video application A, to indicate that the camera service has successfully received the request. In the schematic diagram of interaction between modules in this embodiment of this application, only a flow direction of data or information (mainly request or control information) is shown, and a flow direction of the ACK information is not shown. Details are not described below again.

It should be further noted that in this embodiment of this application, only an example in which configuration information includes a resolution is used for description. In another embodiment, the configuration information may further include other information, for example, a zoom ratio. For example, the configuration 1 indicates that a zoom ratio is 3×, and the configuration 2 indicates that a zoom ratio is 5×. The multimedia module may perform zoom processing on an image based on the zoom ratio indicated by the configuration information, and correspondingly output the image on which zoom processing is performed and a session to the camera service. Certainly, the configuration information may alternatively be other information such as beautifying information and image hue. This is not limited in this application.

In a possible implementation, the configuration information in this embodiment of this application may be preset, or may be dynamically changed. Refer to FIG. 6(4). For example, when both the short video application A and the short video application B invoke the front-facing camera, initial configuration information of the short video application A and initial configuration information of the short video application B both indicate that a zoom ratio is 1×. Optionally, a user may tap (or drag) a zoom option 605 in the short video application A to select 3× zoom. The short video application A may deliver, based on a user operation, updated configuration information to the camera service, where the updated configuration information indicates that the zoom ratio is 3×. The camera service may output the updated configuration information to the multimedia management module. Correspondingly, the multimedia management module updates stored configuration information, and performs corresponding processing on an image based on the updated configuration information, that is, performs 3× zoom processing on an image captured by the camera in a zoom range corresponding to a 1× zoom ratio, and outputs the image to the short video application A by using the camera service. For example, the configuration information of the short video application B remains unchanged, that is, the indicated zoom ratio is still 1×, and an image displayed in a preview interface of the short video application B is the image captured by the camera in the zoom range corresponding to the 1× zoom ratio.

Still refer to FIG. 6(4). In another possible implementation, if the user taps the zoom option 605 in the short video application A, the short video application A may deliver an updated zoom ratio (for example, 3× zoom) to the camera service based on a user operation. In an example, the camera application may change configuration information of both the short video application A and the short video application B to a 3× zoom ratio, and output the changed configuration information to the multimedia management module. The multimedia management module may update the configuration information corresponding to the two applications. In another example, the camera application delivers, by using the Camera HAL, the zoom ratio indicated by the short video application A to the camera driver. The camera driver may control the camera (for example, the front-facing camera) to zoom, and capture an image in a zoom range (a zoom range corresponding to a 3× zoom ratio). Correspondingly, the multimedia management module may perform corresponding processing on the image captured by the camera in the zoom range. In other words, in this embodiment, if a plurality of applications simultaneously invoke the camera, when configuration information corresponding to one application changes, configuration information of another application also changes accordingly. For example, the images displayed by the short video application B and the short video application A change from images corresponding to 1× zoom to images corresponding to 3× zoom.

Scenario 2

The embodiment described in scenario 1 is a process in which a plurality of applications (for example, a short video application A and a short video application B) in an electronic device (for example, a mobile phone) simultaneously invoke a camera. With reference to FIG. 15a(1) to FIG. 15l(2), the following describes in detail a camera invoking process in a scenario in which a plurality of electronic devices collaborate.

Refer to FIG. 15a(1) and FIG. 15a(2). For example, a display interface of a mobile phone displays a home screen of the mobile phone, and the home screen includes one or more controls. For details, refer to the foregoing description. Details are not described herein again. A display interface of a tablet includes one or more controls, for example, an application icon and a power icon. For example, a user may slide down from an upper edge of the tablet, and the tablet displays a drop-down notification bar 1501 in an upper edge area in a display interface in response to the operation of the user. The drop-down notification bar 1501 includes one or more controls, for example, may include a time bar, a Wi-Fi setting option, a Bluetooth setting option, a mobile data setting option, a mute setting option, an auto-rotation setting option, and a multi-screen collaboration option 1501a. It should be noted that names and quantities of the controls displayed in the display interface of the tablet in FIG. 15a(2) and the following accompanying drawings, and names and quantities of controls in the drop-down notification bar are merely examples, and are not limited in this application.

Still refer to FIG. 15a(1) and FIG. 15a(2). For example, the user may tap the multi-screen collaboration option 1501a in the drop-down notification bar 1501, and the tablet displays a prompt box in the display interface in response to the operation of the user, as shown in FIG. 15b(1) and FIG. 15b(2). Refer to FIG. 15b(1) and FIG. 15b(2). For example, a prompt box 1503 is displayed in a right edge area of the display interface of the tablet, where the prompt box includes prompt information, and the prompt information is used to indicate that the tablet is currently enabling a multi-screen collaboration function. The prompt box further includes a "Cancel" option 1503a and an "OK" option 1503b. If the user taps the "Cancel" option 1503a, the prompt box 1503 disappears. For example, the user taps the "OK" option 1503b. In response to the operation of the user, the tablet scans a nearby electronic device (for example, a mobile phone) that can establish a multi-screen collaboration connection, and initiates a multi-screen collaboration connection request to the electronic device that is found through scanning, as shown in FIG. 15c(1) and FIG. 15c(2). Refer to FIG. 15c(1) and FIG. 15c(2). For example, after the tablet finds the mobile phone through scanning, prompt information is displayed in the prompt box 1503 in the display interface of the tablet. The prompt information is used to indicate that a mobile phone that can be used for multi-screen collaboration is found. For example, a sentence "Connecting to your mobile phone" is displayed, to indicate that the tablet currently expects to establish multi-screen collaboration with the mobile phone. For example, the prompt box may further include other prompt information or an option. For example, if the found mobile phone is not an electronic device that the user wants to perform multi-screen collaboration with, the user may tap a "Scan to connect" option in the prompt box, to establish multi-screen collaboration with a specified electronic device by scanning a code. For example, the prompt box may further include the "Cancel" option 1503a used to cancel the multi-screen collaboration function.

Still refer to FIG. 15c(1) and FIG. 15c(2). For example, after the tablet sends the multi-screen collaboration request to the mobile phone, a prompt box 1505 is displayed in a display interface (for example, a lower half area of the display interface) on a mobile phone side. The prompt box 1505 may include, but is not limited to, an icon 1505a of a device with which a multi-screen collaboration connection is to be established, a "Cancel" option 1505b, and a "Connect" option 1505c. The "Cancel" option 1505b is used to cancel a current connection establishment process and cancel displaying of the prompt box. For example, the user taps the "Connect" option 1505c, and the mobile phone establishes a multi-screen collaboration connection with the tablet in response to the operation of the user. For a specific connection establishment process, refer to a specific embodiment of a multi-screen collaboration technology. Details are not described in this application again.

Refer to FIG. 15d(1) and FIG. 15d(2). For example, after the mobile phone establishes the multi-screen collaboration connection to the tablet, a multi-screen collaboration window 1507 is displayed in the display interface (which may be any area on the tablet) of the tablet, and the display interface of the mobile phone is displayed in the multi-screen collaboration window 1507. In other words, all controls and images included in the display interface of the mobile phone are displayed in real time in the multi-screen collaboration window. For example, the mobile phone may send a part or all of the display interface of the mobile phone to the tablet, and the tablet displays the part or all of the display interface sent by the mobile phone in the multi-screen collaboration window 1507.

For example, the user taps an icon 1507a of a short video application A that is in the multi-screen collaboration window of the tablet and that is displayed in the display interface of the mobile phone. The tablet receives the user operation, and sends the user operation (including a pressure value, location coordinates, and the like that correspond to the user operation) to the mobile phone. The mobile phone may obtain the operation of the user on the multi-screen collaboration window of the tablet. The mobile phone displays an application interface of the short video application A in the display interface of the mobile phone in response to the operation of the user. For example, the mobile phone sends, to the tablet, a currently displayed interface, that is, an interface including the application interface of the short video application A. Correspondingly, the tablet also displays, in the multi-screen collaboration window 1507 based on the interface sent by the mobile phone, the current interface of the mobile phone, that is, the application interface of the short video application A, as shown in FIG. 15e(1). Optionally, in this embodiment of this application, in a multi-screen collaboration scenario, the application interface (including the interface on the mobile phone side and the interface in the multi-screen collaboration window 1507 on the tablet side) of the short video application A invokes a camera of the tablet by default (for example, the camera may be a front-facing camera or a rear-facing camera of the tablet, and in this embodiment of this application, the front-facing camera of the tablet is invoked by default). In other words, the application interface (including the interface on the mobile phone side and the interface in the multi-screen collaboration window 1507 on the tablet side) of the short video application A displays an image captured by the front-facing camera of the tablet. For example, the tablet sends an image captured by the front-facing camera in real time to the mobile phone. After performing corresponding processing on the image, the mobile phone sends, to the tablet, an application interface of the short video application A that includes the image captured by the front-facing camera. The tablet may display the received interface in the multi-screen collaboration window 1507 in response to the received application interface of the short video application A that includes the image captured by the front-facing camera.

Refer to FIG. 15e(2). Optionally, the user may slide down from an upper edge of the mobile phone to display a drop-down notification bar 1510 in an upper part of the display interface of the mobile phone. For example, the drop-down notification bar 1510 includes a menu bar and a notification bar, and the notification bar includes prompt information "A "Huawei tablet" is connected", to prompt a currently connected multi-screen collaboration peer device. For example, the notification bar may include a "Disconnect" option used to indicate to disconnect a multi-screen collaboration connection to the peer device; and the notification bar may further include a "Record a tablet screen" option used to indicate to record an operation and a display interface in the window 1507 on the tablet. Optionally, the notification bar further includes an option 1510a of "Switch audio and a video to the mobile phone" used to indicate to invoke the camera of the mobile phone. In other words, if the user taps the option, the mobile phone invokes the camera of the mobile phone in response to the user operation. To be specific, both a preview interface of the short video application A of the mobile phone and a preview interface of the short video application A in the multi-screen collaboration window 1507 of the tablet display an image captured by the camera of the mobile phone. It should be noted that, after the user taps the option 1510a of "Switch audio and a video to the mobile phone", content of the option changes to an option of "Switch audio and a video to the tablet". That is, after the user taps the option again, the camera is switched to the camera of the tablet.

Refer to FIG. 15d(1), FIG. 15d(2), FIG. 15e(1), and FIG. 15e(2). For example, a multi-screen collaboration application invokes the front-facing camera. For a specific creation process and a recording process, refer to related descriptions in scenario 1. Details are not described herein again. For example, the multi-screen collaboration application transmits, to the mobile phone by using the multi-screen collaboration connection, an obtained image captured by the front-facing camera. The application interface of the short video application A of the mobile phone displays the image sent by the tablet side. For example, the display interface of the mobile phone displayed in the multi-screen collaboration window of the tablet is synchronized with that of the mobile phone, as shown in FIG. 15e(1) and FIG. 15e(2). Optionally, in the multi-screen collaboration process, the mobile phone may turn off a screen, to reduce power consumption of the mobile phone.

Figure 15F:
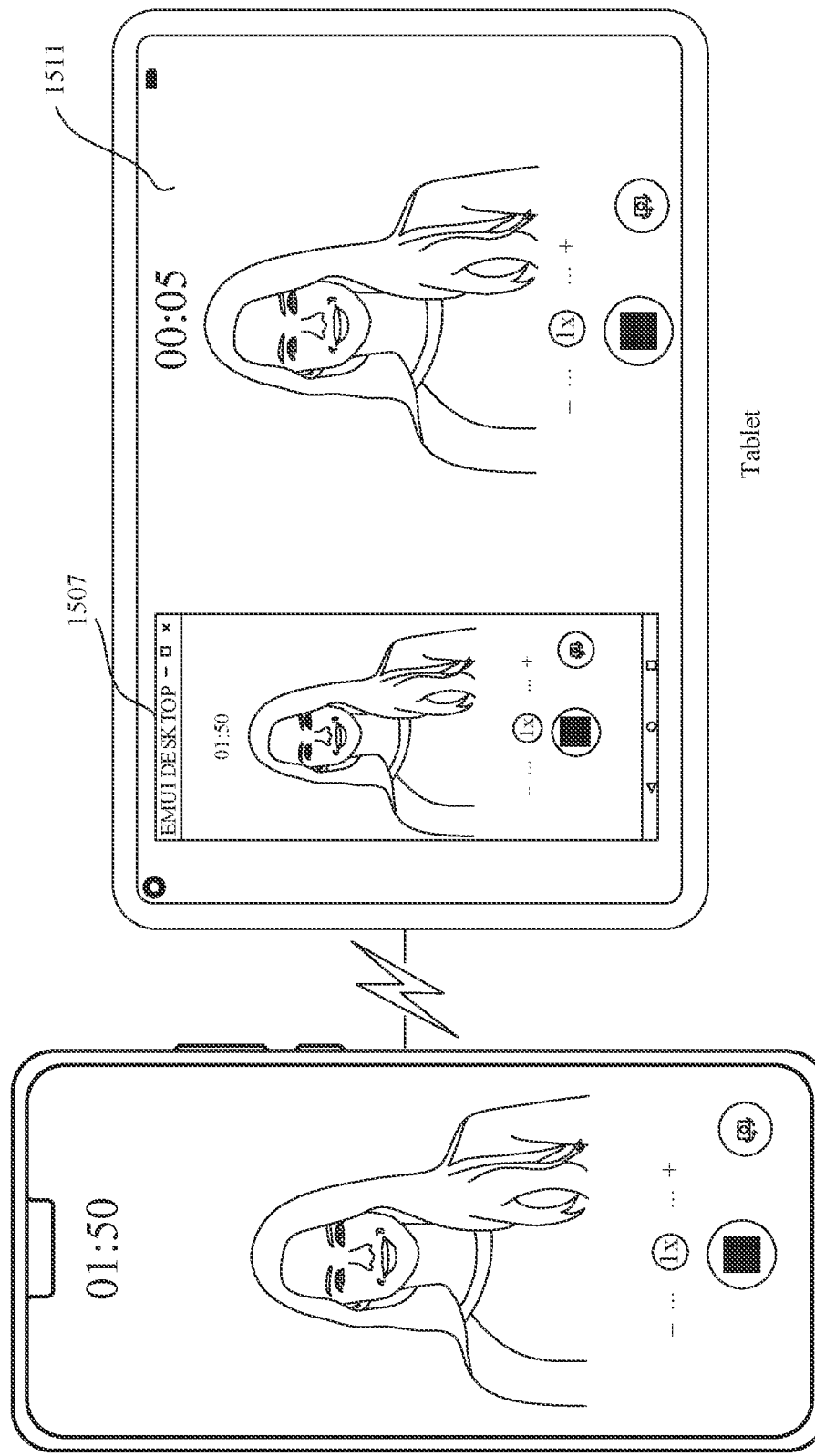
FIG. 15a(1) to FIG. 15l(2) are schematic diagrams of an example of an application scenario.

Still refer to FIG. 15e(1) and FIG. 15e(2). For example, the user may tap an icon that is of a short video application B and that is displayed in the display interface of the tablet. The tablet starts the short video application B in response to the operation of the user, and displays an application interface of the short video application B in the display interface, as shown in FIG. 15f. Optionally, the multi-screen collaboration window and the application interface of the short video application B may overlap, or the multi-screen collaboration window and the application interface of the short video application B do not coincide. This is not limited in this application.

Refer to FIG. 15f For example, the multi-screen collaboration window 1507 is displayed in a left area of the tablet, and an application interface 1511 of the short video application B is displayed in a right area of the tablet, where the multi-screen collaboration window 1507 and the application interface 1511 of the short video application B do not coincide, or the multi-screen collaboration window 1507 and the application interface 1511 of the short video application B overlap. The application interface 1511 of the short video application B includes one or more controls. For specific descriptions, refer to the foregoing descriptions. Details are not described herein again.

Refer FIG. 15e(1), FIG. 15e(2), and FIG. 15f. For example, both the multi-screen collaboration application and the short video application B invoke the front-facing camera. For a specific creation process and a recording process, refer to related descriptions in scenario 1. Details are not described herein again. For example, the short video application B displays an obtained image in the application interface of the short video application B of the tablet, and the multi-screen collaboration application transmits the obtained image to the mobile phone through the multi-screen collaboration connection.

Figure 15G:
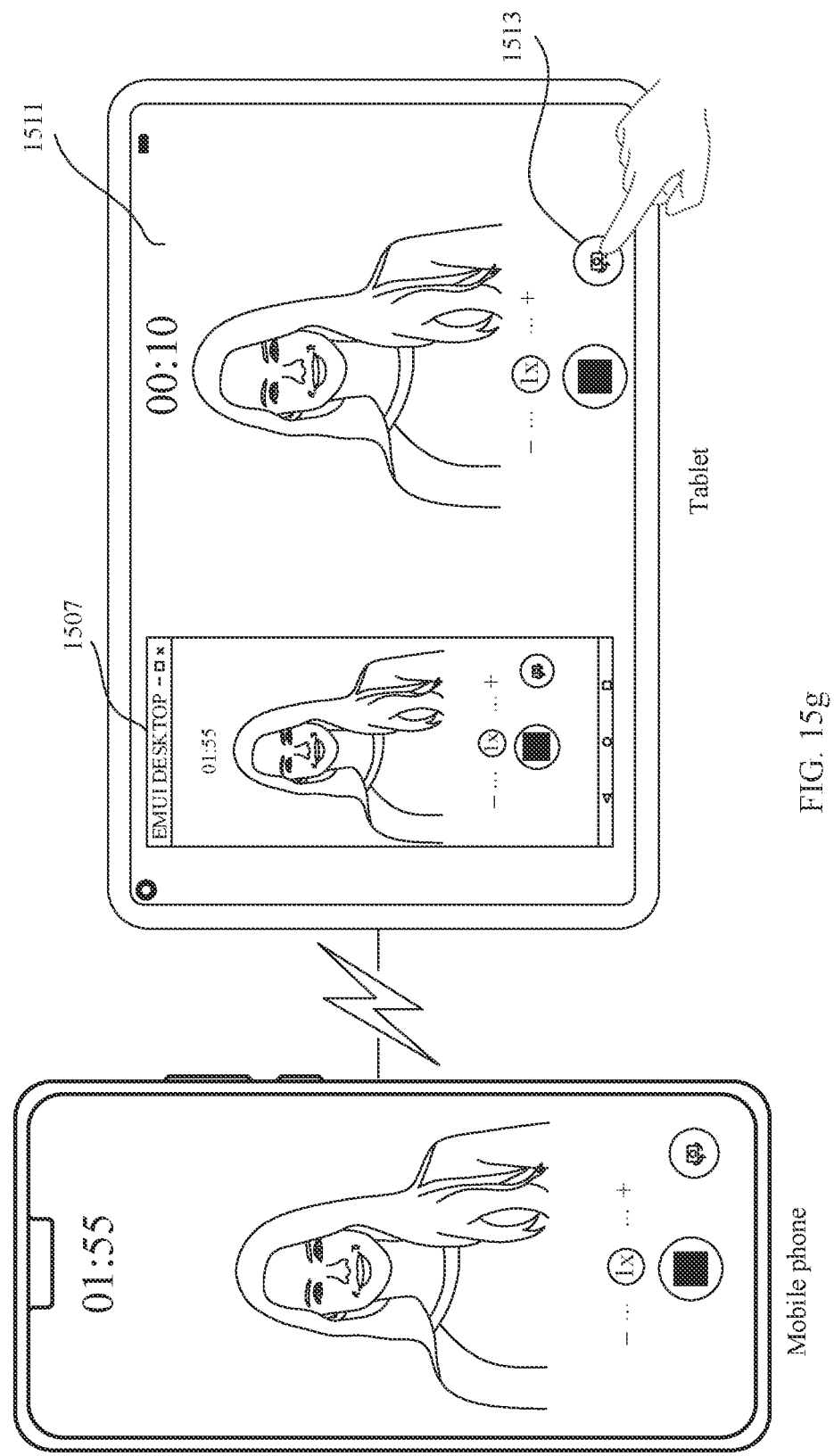
Figure 15H:
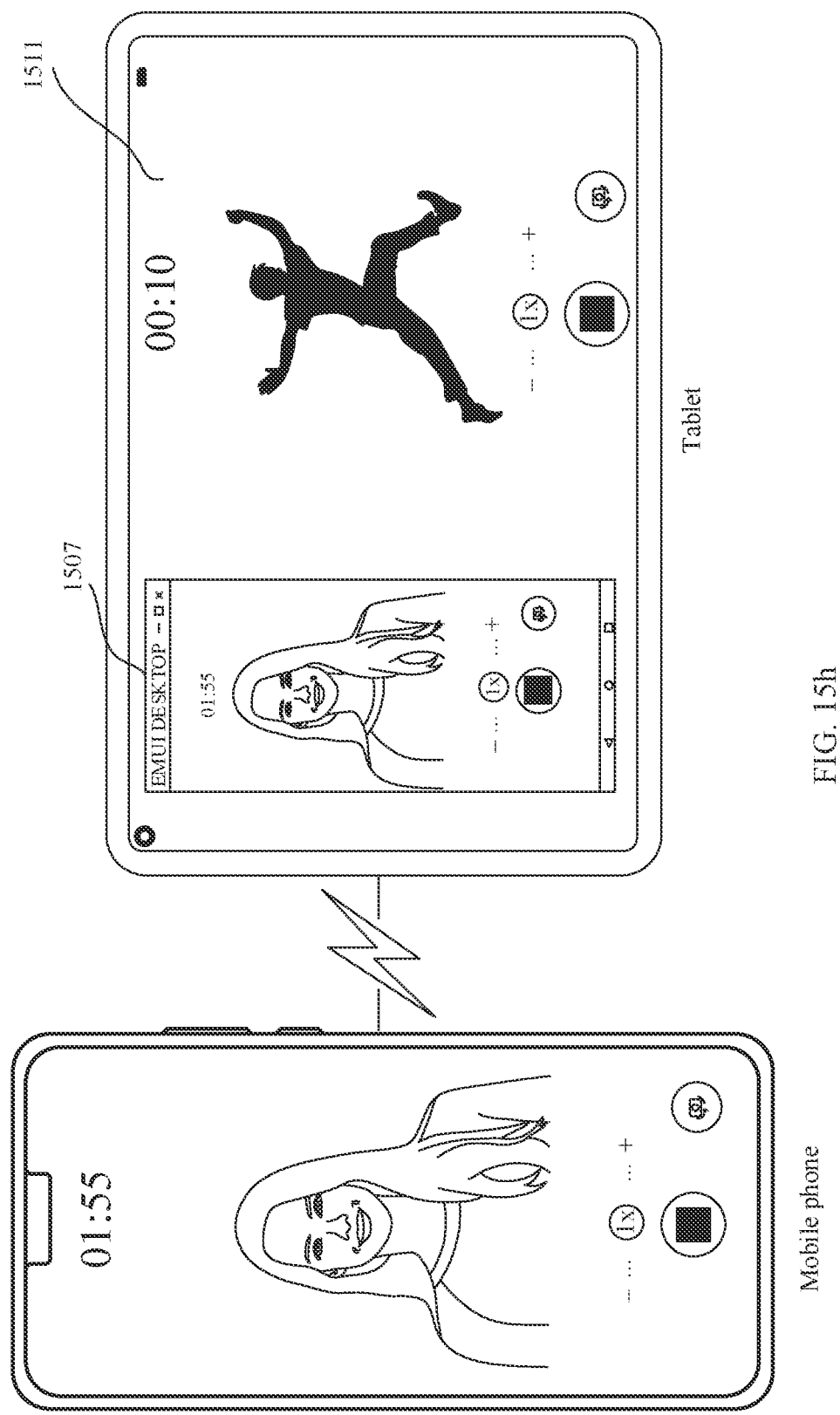
Figure 151:
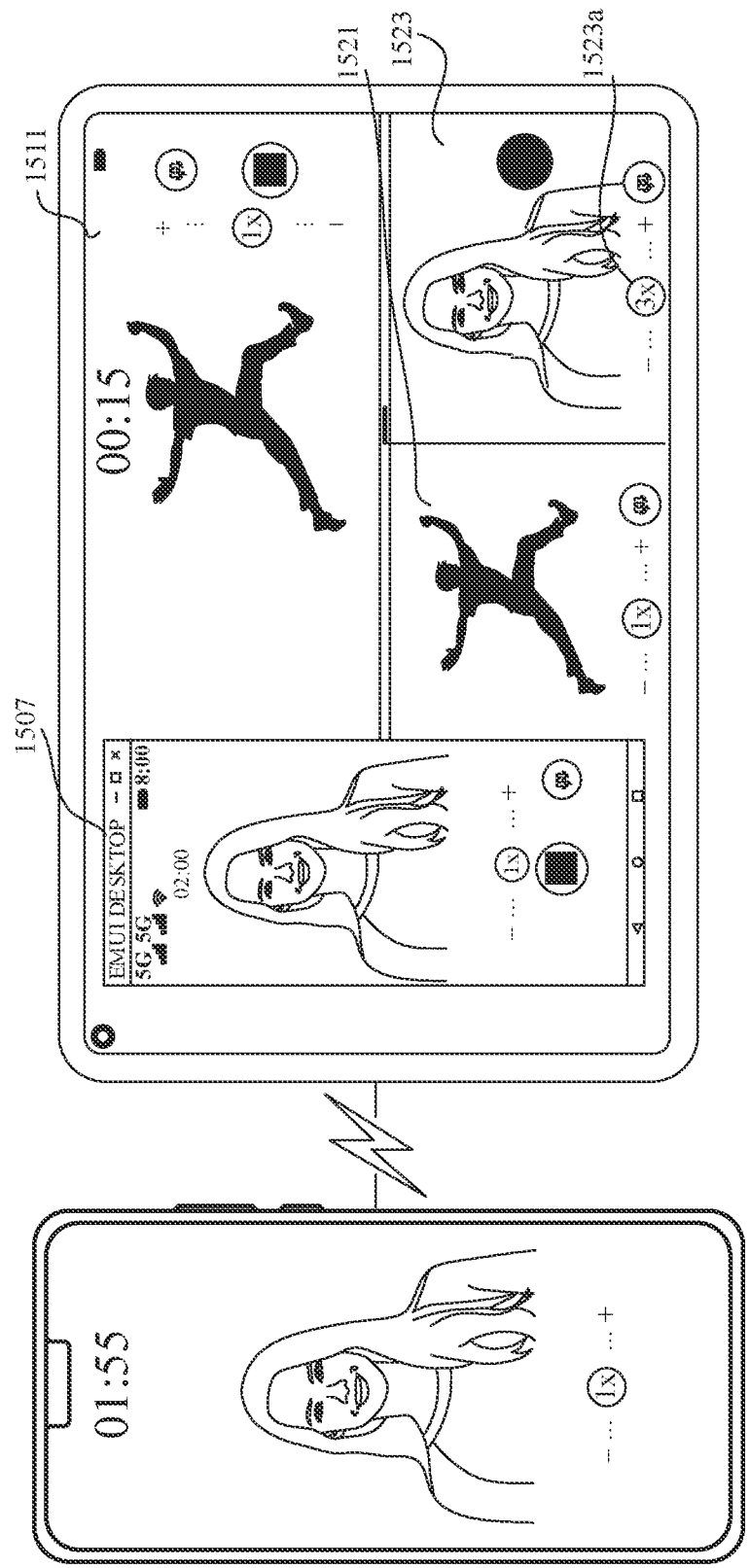

In a possible implementation, different applications in a same electronic device may further invoke both the front-facing camera and the rear-facing camera. Refer to FIG. 15g. For example, in a process in which the mobile phone and the tablet perform multi-screen collaboration, the user may tap a "Camera switching" option 1513 in the application interface of the short video application B of the tablet, to switch a camera, that is, to use the rear-facing camera of the tablet. Refer to FIG. 15h. For example, the tablet invokes the rear-facing camera in response to an operation of the user, and the application interface (that is, a preview interface) 1511 of the short video application B displays an image captured by the rear-facing camera of the tablet. In addition, the preview interface of the short video application A in the multi-screen collaboration window 1507 still displays an image captured by the front-facing camera of the tablet.

Figure 16A:
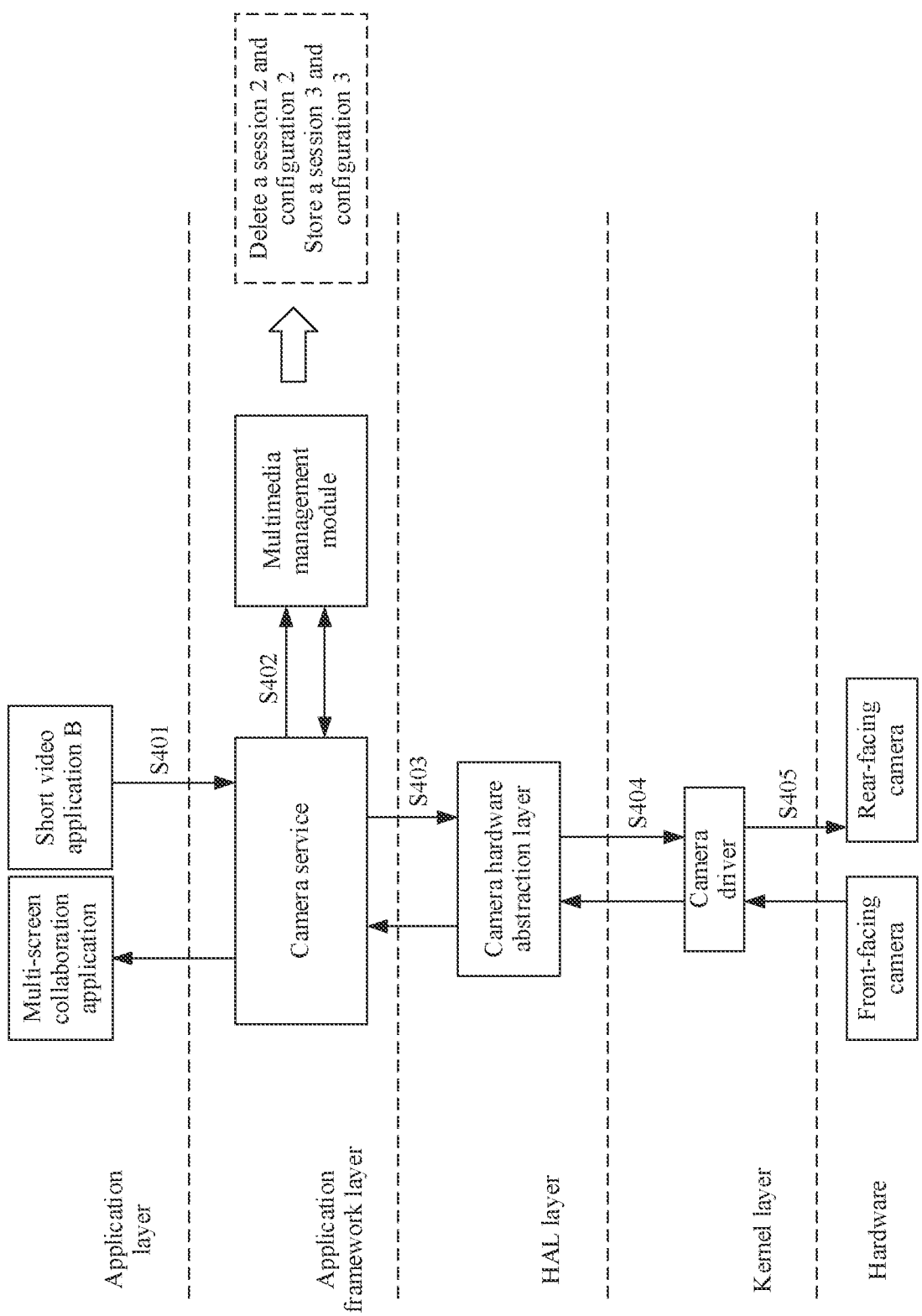
FIG. 16a to FIG. 16d are schematic diagrams of examples of module interaction.

With reference to FIG. 15g and FIG. 15h, FIG. 16a is a schematic diagram of interaction between modules. Refer to FIG. 16a. The following specific steps are included.

S401. A short video application B invokes a camera service, and the camera service performs corresponding processing.

For example, the short video application B sends a request message to the camera service. The request message includes but is not limited to an application ID of the short video application B and configuration 3 corresponding to the short video application B (the configuration 3 may be the same as or different from configuration 2, and this is not limited in this application).

Related content that is not described in this step is the same as or similar to that in S301, and details are not described herein again.

S402: The camera service outputs a session 3 and the configuration 3 to a multimedia management module, and indicates the multimedia management module to delete a session 2 and the configuration 2, and the multimedia management module performs corresponding processing.

For example, information stored in the camera service and the multimedia management module includes a session 1 and configuration 1, the session 2 and the configuration 2. The session 1 corresponds to a multi-screen collaboration application, that is, the session 1 is generated by the multi-screen collaboration application in a creation process. The session 2 corresponds to the short video application B, that is, the session 2 is generated by the short video application B in the creation process.

For example, the camera service outputs the session 3 and the configuration 3 to the multimedia management module, and indicates the multimedia management module to delete the stored session 2 and other information associated with the session 2, that is, the configuration 2. Based on the indication of the camera service, the multimedia management module stores a correspondence between the session 3 and the configuration 3, and deletes the session 2 and the configuration 2.

Related content that is not described in this step is the same as or similar to that in S302, and details are not described herein again.

S403: The camera service invokes a Camera HAL.
S404: The Camera HAL invokes a camera driver.
S405: The camera driver invokes a rear-facing camera.

It should be noted that, in a process in which the short video application B invokes the rear-facing camera, the multi-screen collaboration application is still performing a recording process, that is, obtaining an image captured by a front-facing camera.

It should be further noted that, in the recording process of the multi-screen collaboration application and the short video application B, the camera driver correspondingly outputs, to the Camera HAL, the session 1 and the image captured by the front-facing camera, and transmits, to the camera service by using the Camera HAL, the session 1 and the image captured by the front-facing camera. Correspondingly, the camera driver correspondingly outputs the session 3 and the image captured by the rear-facing camera to the Camera HAL, and transmits, to the camera service by using the Camera HAL, the session 3 and the image captured by the rear-facing camera Other parts that are in the recording process and that are not described are the same as or similar to the recording process in which the short video application A invokes the front-facing camera in scenario 1, and details are not described herein again.

It should be further noted that, in a process in which the multi-screen collaboration application invokes the front-facing camera and the short video application B invokes the rear-facing camera, the multimedia management module performs, based on the configuration 1 corresponding to the session 1, corresponding processing on the image captured by the front-facing camera, and performs, based on the configuration 3 corresponding to the session 3, corresponding processing on the image captured by the rear-facing camera.

Refer to FIG. 15i(1). For example, the user may slide from a right edge to a center in the display interface of the tablet, and the tablet displays a sidebar 1515 in the right edge area in response to the operation of the user (for specific details, refer to the foregoing descriptions, and the details are not described herein). As shown in FIG. 15i(2), for example, the user taps (or drags) an icon 1515a of a camera application in the sidebar, and the tablet performs screen splitting on the right area in response to the operation of the user. A display window 1511 and a display window 1517 are obtained. The display window 1511 is used to display the application interface of the short video application B. and the display window 1517 is used to display an application interface of the camera application. Refer to FIG. 15j(1) and FIG. 15j(2). As shown in FIG. 15j(I) and FIG. 15j(2), for example, the application interface of the camera application includes one or more controls, for example, may include a shooting mode option 1519, where the shooting mode option 1519 further includes a plurality of submodes, for example, may include a night scene mode option, a video recording mode option, a shooting mode option, a dual-view shooting mode option, and more options. For example, in this embodiment of this application, an example in which the camera application enters a shooting mode by default after being started and the front-facing camera is invoked is used for description.

Figure 16B:
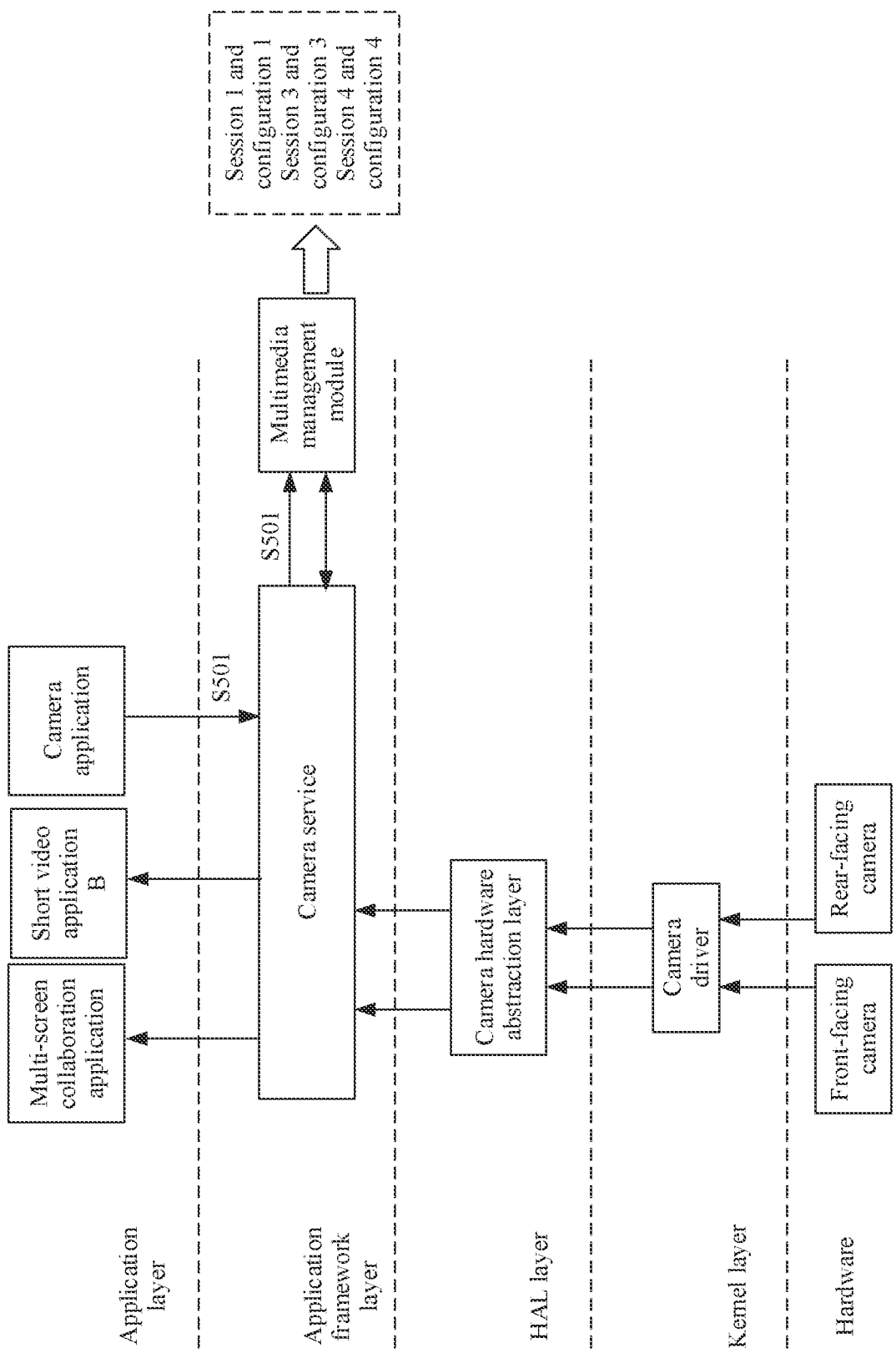

With reference to FIG. 15i(1). FIG. 15i(2), FIG. 15j(1), and FIG. 15j(2), FIG. 16b is a schematic diagram of interaction between modules. Refer to FIG. 16b. The following steps are specifically included.

S501: The camera application invokes the camera service, and the camera service performs corresponding processing.

For example, the camera application sends a request message to the camera service, and the request message includes but is not limited to: an application ID of the camera application, and configuration 4 corresponding to the camera application (the configuration 4 may be the same as or different from the configuration 1 and the configuration 3, and this is not limited in this application).

Related content that is not described in this step is the same as or similar to that in S301, and details are not described herein again.

S502: The camera service outputs a session 4 and the configuration 4 to the multimedia management module, and the multimedia management module performs corresponding processing.

For example, information currently stored in the multimedia management module includes: the session 1 and the configuration 1, the session 3 and the configuration 3, the session 4 and the configuration 4, and a correspondence between each session and configuration.

For a part not described in this step, refer to related descriptions in S302. Details are not described herein again.

For example, in a recording process, the multimedia management module copies an image captured by a front-facing camera, performs corresponding processing on one of copied images based on the configuration 1, to generate an image A, and performs corresponding processing on another image based on the configuration 4, to generate an image B. The camera service may output the image A to the multi-screen collaboration application, and output the image B to the camera application. In addition, the multimedia management module performs, based on the configuration 3, corresponding processing on an image captured by the rear-facing camera, to generate an image C, and the camera service outputs the image C to the short video application B. For specific details, refer to the foregoing descriptions. Details are not described herein again.

Refer to FIG. 15k(1). For example, the user may tap the dual-view shooting mode option 1519a in the application interface of the camera application. In response to the operation of the user, the tablet further performs display splitting on the display window 1517, and a display window 1521 and a display window 1523 are obtained. As shown in FIG. 15k(2), for example, the display window 1521 and the display window 1523 include a preview interface of the camera application, both a preview interface of the display window 1521 and a preview interface of the display window 1523 display the image captured by the front-facing camera. For example, the display window 1521 and the display window 1523 further include one or more controls, for example, may include a "Camera switching" option and a "Zoom" option 1523a. For example, the user may tap the "Zoom" option 1523a in the display window 1523. For example, if a 3× zoom mode is selected, the display window 1523a currently displays an image captured by the front-facing camera in the 3× zoom mode.

With reference to FIG. 15k(I) and FIG. 15k(2), for example, in a process of implementing dual-view shooting by using the front-facing camera, the camera application needs to separately invoke a front-facing camera 1 and a front-facing camera 2 in the front-facing camera (for descriptions of the front-facing camera 1 and the front-facing camera 2, refer to FIG. 4). For example, it is assumed that the front-facing camera 1 is used in a shooting process in FIG. 15j(1) and FIG. 15j(2), and the multi-screen collaboration application also uses the front-facing camera 1. After the camera application is switched to the dual-view shooting mode, the camera application needs to invoke the front-facing camera 2. For example, the camera application sends an invocation request to the camera service. In response to the received invocation request, the camera service generates a session 5, and stores a correspondence between the session 5, configuration 5, and an application ID, and the camera service outputs the session 5 and the configuration 5 to the multimedia management module. A part that is not described is similar to the foregoing creations processes, and details are not described herein again.

Figure 16C:
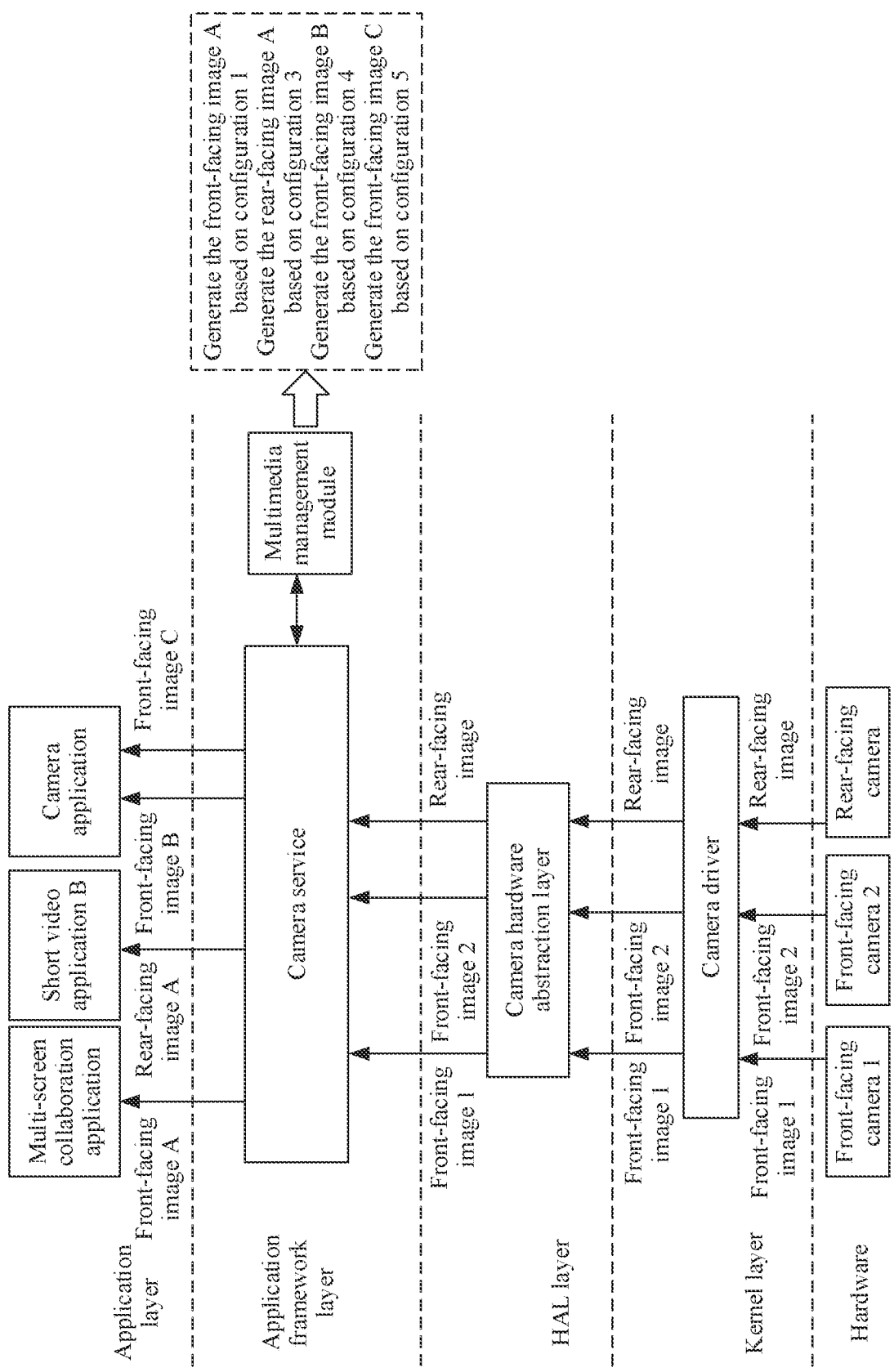

The following describes a recording process with reference to a schematic diagram of interaction between modules shown in FIG. 16c. Refer to FIG. 16c. To distinguish between images obtained by the front-facing camera 1 and the front-facing camera 2, an example in which an image captured by the front-facing camera 1 is a front-facing image 1 and an image captured by the front-facing camera 2 is a front-value image 2 is used for description. For example, the front-facing camera 1 outputs the captured front-facing image 1 to the camera service by using the camera driver and the Camera HAL, the front-facing camera 2 outputs the captured front-facing image 2 to the camera service by using the camera driver and the Camera HAL, and the rear-facing camera outputs a captured rear-facing image to the camera service by using the camera driver and the Camera HAL.

Still refer to FIG. 16c. The camera service interacts with the multimedia module. For example, the camera service correspondingly outputs the front-facing image 1, the session 1, and the session 4 to the multimedia management module. Correspondingly, the multimedia management module copies the front-facing image 1, processes one of copied images based on the configuration 1 corresponding to the session 1, to generate a front-facing image A, and processes another image to generate a front-facing image B. For example, the camera service correspondingly outputs the front-facing image 2 and the session 5 to the multimedia management module. Correspondingly, the multimedia management module processes the front-facing image 2 based on the configuration 5 corresponding to the session 5, to generate a front-facing image C. For example, the camera server correspondingly outputs the rear-facing image and the session 4 to the multimedia management module. Correspondingly, the multimedia management module processes the rear-facing image based on the configuration 4 corresponding to the session 4, to generate a rear-facing image A. It should be noted that the steps of outputting the foregoing information to the multimedia management module by the camera service are not limited to a specific order.

Still refer to FIG. 16c. For example, the multimedia management module correspondingly outputs the front-facing image A and the session 1, the front-facing image B and the session 4, the front-facing image C and the session 5, and the rear-facing image A and the session 3 to the camera service. Based on a correspondence between each session and application ID, the camera service may output the front-facing image A to the multi-screen collaboration application, output the rear-facing image A to the short video application B, and output the front-facing image B and the front-facing image C to the camera application. Correspondingly, the camera application may display the front-facing image B in a display window 1, and display the front-facing image C in a display window 2.

Refer to FIG. 15l(1). For example, the user may tap a "Camera switching" option 1521a in the display window 1521 in the application interface of the camera application, and the tablet performs corresponding processing in response to the operation of the user. Refer to FIG. 15l(2). A current display manner of the tablet includes the following manner. The multi-screen collaboration window 1507 displays the application interface (that is, the preview interface) of the short video application A in the mobile phone, and an image captured by the front-facing camera of the tablet is displayed in the application interface. The display window 1511 displays the application interface of the short video application B of the tablet, and an image captured by the rear-facing camera of the tablet is displayed in the application interface. The application interface (that is, a preview interface) of the camera application of the tablet is displayed in the display window 1521, and an image captured by the rear-facing camera of the tablet is displayed in the application interface (before shooting or recording is performed, a preview image captured by the camera is displayed). The display window 1523 displays the application interface of the camera application of the tablet, and an image captured by the front-facing camera is displayed in the application interface of the tablet in a 3× zoom mode.

Figure 16D:
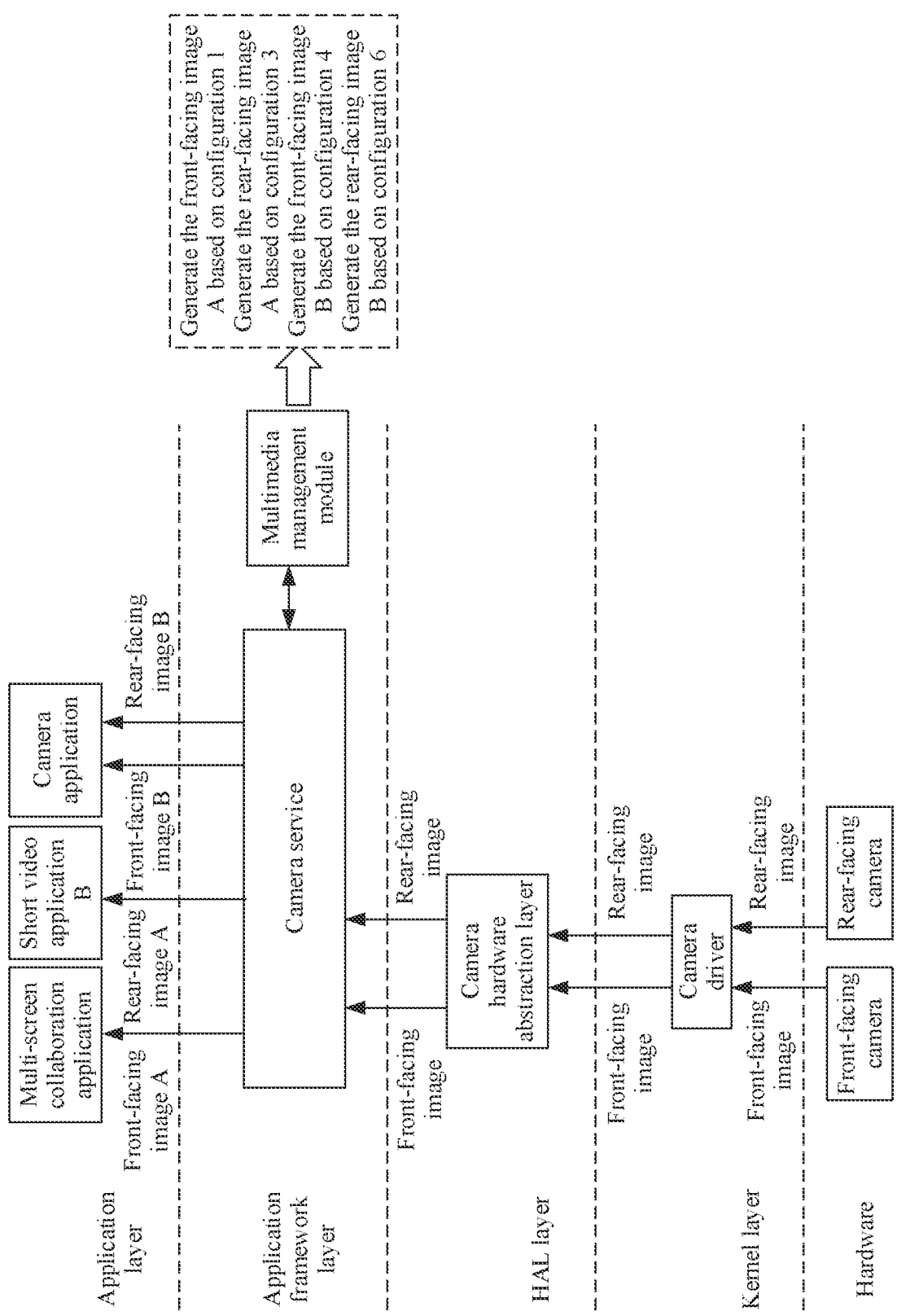

With reference to FIG. 15l(1) and FIG. 15l(2), FIG. 16d is an example of a schematic diagram of interaction between modules. For example, FIG. 16d specifically shows a schematic diagram of interaction between modules in the recording process. It should be noted that, in a creation process, because the camera application no longer invokes the front-facing camera 2 but instead invokes the rear-facing camera, the camera service and the multimedia management module delete the stored session 5 and corresponding information (for example, the configuration 5), and establish a correspondence between a session 6 and corresponding information (for example, configuration 6), where the session 6 is created when the camera application invokes the rear-facing camera. For a specific creation process, refer to the creation process in the foregoing instances. Details are not described herein again.

Refer to FIG. 16*d*. To distinguish between an image captured by the front-facing camera (which may be understood as the front-facing camera 1) and an image captured by the rear-facing camera, the image captured by the front-facing camera is referred to as a front-facing image, and the image captured by the rear-facing camera is referred to as a rear-facing image. For example, the front-facing image captured by the front-facing camera and the rear-facing image captured by the rear-facing camera are output to the camera service by using the camera driver and the Camera HAL The camera service outputs the front-facing image, the session 1, and the session 4, and the rear-facing image, the session 3, and the session 5 to the multimedia management module. The session 1 is created based on front-facing camera invocation performed by the multi-screen collaboration application, the session 3 is created based on rear-facing camera invocation performed by the short video application B, the session 4 is created based on front-facing camera invocation performed by the camera application in the dual-view shooting mode, and the session 5 is created based on rear-facing camera invocation performed by the camera application in the dual-view shooting mode. Correspondingly, the multimedia module performs corresponding processing on the front-facing image based on the configuration 1 to generate a front-facing image A, processes the rear-facing image based on the configuration 3 to generate a rear-facing image A, processes the front-facing image based on the configuration 4 to generate a front-facing image B, and processes the rear-facing image based on the configuration 5 to generate a rear-facing image B. The multimedia management module outputs the session 1 and the front-facing image A, the session 3 and the rear-facing image A, the session 4 and the front-facing image B, the session 5 and the rear-facing image B, and a correspondence between each session and the image to the camera service. Based on a correspondence between each session and an application ID, the camera service may output the front-facing image A to the multi-screen collaboration application, output the rear-facing image A to the short video application B, output the front-facing image B to the camera application, and output the rear-facing image B to the camera application.

It should be noted that an arrangement manner of the windows shown in this embodiment of this application is merely an example. This is not limited in this application.

It should be further noted that, in this embodiment of this application, the dual-view shooting mode of the camera application is merely used as an example for description. Actually, the camera application or another application having a shooting function may further have a three-view shooting mode or a four-view shooting mode. For example, the three-view shooting mode is triggered in a shooting process of the camera application. The application interface of the camera application may include three display windows, and one display window is used to display an image shot by the rear-facing camera in a wide-angle mode, another display window is used to display an image shot by the camera in a zoom mode, and the third display window is used to display an image shot by the front-facing camera. This is not limited in this application.

It should be further noted that the examples shown in FIG. 15*a*(1) to FIG. 15*l*(2) may also be applied to a single electronic device. For example, a plurality of applications in a mobile phone may simultaneously invoke a front-facing camera and/or a rear-facing camera. This is not limited in this application.

In a possible implementation, the camera invocation method in this embodiment of this application may be further applied to a scenario in which an application twin invokes different cameras. For example, a mobile phone may enable an application twin function in response to an operation of a user. A home screen may display an instant messaging application icon and an instant messaging application twin icon. The user taps the instant messaging application icon to enable an instant messaging application. After the instant messaging application is started, the instant messaging application may enable a shooting function in response to a received operation of the user, invokes a front-facing camera, and displays, in an application interface of the instant messaging application, an image captured by the front-facing camera in real time. In a process in which the instant messaging application displays the image captured by the front-facing camera, the user may enable an instant messaging application twin in a manner such as operating a sidebar. For example, the user taps an instant messaging application twin icon included in the sidebar, and the mobile phone may display the application interface of the instant messaging application and an application interface of the instant messaging application twin in split screens. It should be noted that the instant messaging application and the instant messaging application twin may have different accounts. In other words, the user may log in to the instant messaging application by using an account A, and log in to the instant messaging application twin by using an account B. For example, after the instant messaging application twin is enabled, in response to a received operation of the user, a shooting function may be enabled, the front-facing camera is invoked, and an image captured by the front-facing camera and/or an image captured by a rear-facing camera in real time are/is also displayed in an instant messaging application twin interface. In other words, the method for invoking a same camera by two different applications (for example, TikTok and Kwai) described in this embodiment of this application is also applicable to a scenario in which two same applications (for example, a WeChat application and a WeChat application twin) are logged in by using different accounts. For a specific implementation, refer to related steps in the foregoing method embodiment. Details are not described herein again.

Figure 17:
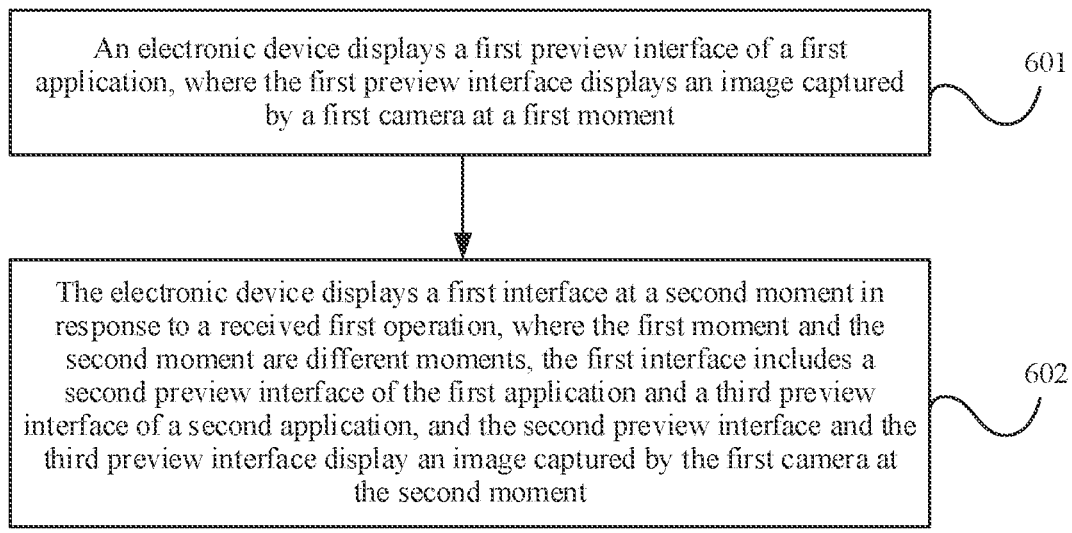
FIG. 17 is a schematic flowchart of a camera invocation method according to an embodiment of this application.

FIG. 17 is a schematic flowchart of a camera invocation method according to an embodiment of this application. Refer to FIG. 17. The method specifically includes the following steps.

S601: An electronic device displays a first preview interface of a first application, where an image captured by a first camera at a first moment is displayed in the first preview interface.

For example, the first application and a second application may be any one of a video call application, a live broadcast application, and an application having a code scanning function.

When the first application is the short video application A, for the first preview interface of the first application, refer to the application interface of the short video application A shown in FIG. 6(2).

When the first application is the multi-screen collaboration application, for the first preview interface of the first application, refer to the application interface 1507 shown in FIG. 15e(1).

S602: The electronic device displays a first interface at a second moment in response to a received first operation, where the first moment and the second moment are different moments, the first interface includes a second preview interface of the first application and a third preview interface of the second application, and an image captured by the first camera at the second moment is displayed in the second preview interface and the third preview interface.

For example, in a process in which the first application of the electronic device invokes the first camera, the electronic device may display, in response to the received first operation, the first interface including the second preview interface of the first application and the preview interface of the second application. An image captured by the first camera in real time is displayed in both the second preview interface and the third preview interface.

For example, the first operation may include a first sub-operation and a second sub-operation. FIG. 6(1), FIG. 6(2), FIG. 6(3), and FIG. 6(4) are used as an example. The first sub-operation is an operation of sliding from a right edge of a screen to the left (or may be sliding from a left edge of the screen to the right), to invoke a sidebar. Correspondingly, the electronic device displays the sidebar in the first interface based on the first sub-operation, and the sidebar includes an application icon of the second application, as shown in FIG. 6(3). The second sub-operation is a second sub-operation on the application icon of the second application. Correspondingly, the electronic device displays the first interface at the second moment in response to the second sub-operation, as shown in FIG. 6(4).

For example, the first interface is a split screen interface, one interface in the split screen interface includes the second preview interface, and another interface in the split screen interface includes the third preview interface. For example, as shown in FIG. 6(1), FIG. 6(2), FIG. 6(3), and FIG. 6(4), the split screen interface includes an interface 613 and an interface 615. The interface 613 includes the preview interface of the first application (for example, the short video application A), and the interface 615 includes the preview interface of the second application (for example, the short video application B).

For example, the second preview interface and/or the third preview interface each are/is a floating interface. For example, as shown in FIG. 2, a display interface of the electronic device (namely, the tablet) displays a plurality of floating interfaces (which may also be referred to as floating windows), and each floating interface includes a preview interface of one application, for example, may include the preview interface of the short video application A and the preview interface of the short video application B.

For example, the second preview interface includes first recording duration, and the first recording duration is used to indicate recording duration that is of the first application and that starts from a moment at which recording is started. For example, as shown in FIG. 6(1), FIG. 6(2), FIG. 6(3), and FIG. 6(4), in FIG. 6(2), the first application displays the recording duration in a shooting process. In FIG. 6(3), the electronic device starts the second application, and the second application invokes the front-facing camera and displays an image captured by the front-facing camera in real time. In addition, the first application still continues to shoot and records the recording duration.

Based on the foregoing method embodiment, before the electronic device displays the first preview interface of the first application, the method further includes the following steps: obtaining first configuration information of the first application; configuring a first session, and storing an association relationship between the first session, the first application, and the first configuration information. Displaying the first interface at the second moment further includes: obtaining second configuration information of the second application; and configuring a second session, and storing an association relationship between the second session, the second application, and the second configuration information.

For example, referring to FIG. 11, a camera service in the electronic device obtains the first configuration information (that is, configuration 1) delivered by the first application, and configures the first session (that is, a session 1). The camera service stores an association relationship between the session 1 and the configuration 1, and sends the association relationship to a multimedia management module. The multimedia management module also stores the association relationship between the session 1 and the configuration 1. The electronic device starts the second application, and the camera service obtains the second configuration information (that is, configuration 2) delivered by the second application, and configures the second session (that is, a session 2). The camera service stores an association relationship between the session 2 and the configuration 2, and sends the association relationship to the multimedia management module. The multimedia management module also stores the association relationship between the session 2 and the configuration 2.

Based on the foregoing method embodiment, that the electronic device displays the first interface at the second moment includes: obtaining the image captured by the first camera at the second moment; determining, based on the first session, the first application and the first configuration information that are associated with the first session, and determining, based on the second session, the second application and the second configuration information that are associated with the second session; obtaining a first sub-image based on the image captured by the first camera at the second moment and the first configuration information, and obtaining a second sub-image based on the image captured by the first camera at the second moment and the second configuration information; and displaying the first sub-image in the second preview interface, and displaying the second sub-image in the third preview interface.

For example, referring to FIG. 14, the multimedia management module in the electronic device may determine, based on a correspondence between the session 1 and the configuration 1 and a correspondence between the session 2 and the configuration 2, that two applications are currently invoking the camera, in other words, two images are generated. For example, the multimedia management module may process the image based on the configuration 1 to obtain an image A (that is, the first sub-image), and process the image based on the configuration 2 to obtain an image B (that is, the second sub-image). The second preview interface (for example, 613 in FIG. 6(4)) of the first application of the electronic device may display the image A, and the third preview interface (for example, 615 in FIG. 6(4)) of the second application may display the image B.

In a possible implementation, the first configuration information is used to indicate a first resolution, the second configuration information is used to indicate a second resolution, and the first resolution is the same as or different from the second resolution.

In a possible implementation, the first configuration information is used to indicate a first zoom ratio, the second configuration information is used to indicate a second zoom ratio, and the first zoom ratio is the same as or different from the second zoom ratio.

Based on the foregoing method embodiment, the electronic device obtains third configuration information of the first application in response to a received second operation, where the third configuration information is used to indicate a third zoom ratio, and the third zoom ratio is different from the first zoom ratio. The electronic device stores an association relationship between the first session, the first application, and the third configuration information. The electronic device obtains an image captured by the first camera at a third moment. The electronic device determines, based on the first session, the first application and the third configuration information that are associated with the first session, and determines, based on the second session, the second application and the second configuration information that are associated with the second session. The electronic device obtains a third sub-image based on the image captured by the first camera at the third moment and the third configuration information, and obtains a fourth sub-image based on the image captured by the first camera at the third moment and the second configuration information. The electronic device displays the third sub-image in the second preview interface, and displays the fourth sub-image in the third preview interface.

For example, still referring to FIG. 6(1), FIG. 6(2), FIG. 6(3), and FIG. 6(4), when the first application (for example, the short video application A) and the second application (for example, the short video application B) simultaneously invoke the first camera (for example, the front-facing camera), a user may tap the zoom option 605 in the application interface 613 of the short video application A, to adjust a zoom ratio (that is, the third zoom ratio) of an image of the first application. For example, the short video application A may deliver, to the camera service, configuration information (that is, the third configuration information) corresponding to a current zoom ratio. The camera service and the multimedia management module may perform corresponding processing, to update an association relationship between the first application and the configuration information, process, based on the new configuration information, that is, the third configuration information, the image captured by the camera, and process, based on the second configuration information of the second application, the image captured by the camera. In other words, after the configuration information of the first application, for example, the zoom ratio (or the resolution), the configuration information of the second application may remain unchanged. That is, the first application displays an image corresponding to the updated zoom ratio, and the second application displays an image corresponding to the original zoom ratio.

Based on the foregoing method embodiment, the method further includes: The electronic device displays a second interface at a fourth moment in response to a received third operation, where the second interface includes a fourth preview interface of the first application and a fifth preview interface of the first application, an image captured by the first camera at the fourth moment is displayed in the fourth preview interface, an image captured by a second camera at the fourth moment is displayed in the fifth preview interface, and the first camera is different from the second camera.

For example, the fifth preview interface of the first application may be an interface of an application twin of the first application.

For example, the fourth preview interface and the fifth preview interface may alternatively be two interfaces of a dual-view shooting function of the first application. As shown in FIG. 15$k$(1) and FIG. 15$k$(2), for example, the fourth preview interface may be the interface 1521, and the fifth preview interface may be the interface 1523.

Based on the foregoing method embodiment, the method further includes: The electronic device displays, in response to a received fourth operation in the second preview interface, an image captured by the first camera at a fifth moment, and an image captured by the second camera at the fifth moment is displayed in the third preview interface, where the second camera is different from the first camera.

For example, as shown in FIG. 15$g$, the third preview interface (for example, the interface 1511) includes the "Camera switching" option 1513, and the fourth operation is used to indicate an operation on the "Camera switching" option, that is, the user taps the "Camera switching" option 1513. As shown in FIG. 15$h$, the second preview interface (for example, the application interface 1507) displays an image captured by the front-facing camera of the tablet in real time, and the third preview interface (for example, the application interface 1511 of the short video application B) displays an image captured by the rear-facing camera of the tablet in real time.

In a possible implementation, the first camera is a first front-facing camera, and the second camera is a first rear-facing camera.

For example, as shown in FIG. 15$h$, the multi-screen collaboration application invokes the front-facing camera of the tablet, and the short video application B invokes the rear-facing camera of the tablet.

In a possible implementation, the first camera is a first front-facing camera, and the second camera is a second front-facing camera, and the first front-facing camera is different from the second front-facing camera.

For example, as shown in FIG. 15$k$(1) and FIG. 15$k$(2), the multi-screen collaboration application invokes one of the front-facing cameras of the tablet, and the camera application invokes two front-facing cameras of the tablet, to implement dual-view shooting.

For example, in this embodiment of this application, the multi-screen collaboration application may invoke one of the front-facing cameras, and the camera application may invoke the other front-facing camera. Optionally, zoom ratios of the two front-facing cameras may be different. For example, one front-facing camera is a wide-angle camera, and an image displayed in the multi-screen collaboration application is an image captured by the wide-angle front-facing camera; and the other front-facing camera is a multi-zoom camera, and an image displayed in the camera application is an image captured by the multi-zoom camera.

In a possible implementation, the first camera is a first rear-facing camera, the second camera is a second rear-facing camera, and the first rear-facing camera is different from the second rear-facing camera. For example, a same application or different applications may simultaneously invoke a plurality of rear-facing cameras in the cameras.

It may be understood that, to implement the foregoing functions, the electronic device includes corresponding hardware and/or software modules for performing the functions. In combination with example algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

Figure 18:
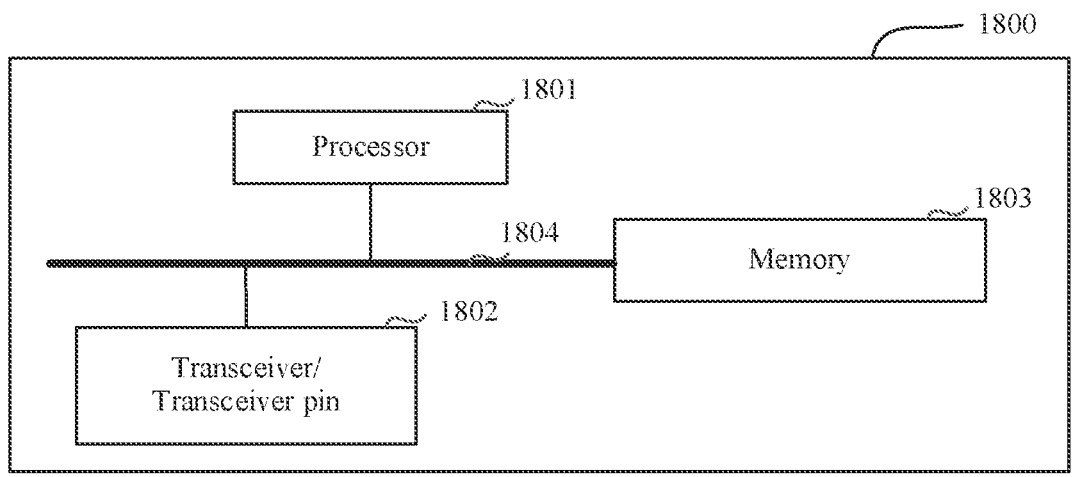
FIG. 18 is a schematic diagram of a structure of an apparatus according to an embodiment of this application.

In an example, FIG. 18 is a schematic block diagram of an apparatus 1800 according to an embodiment of this application. The apparatus 1800 may include a processor 1801 and a transceiver/transceiver pin 1802, and optionally, further include a memory 1803.

Components of the apparatus 1800 are coupled together by using A bus 1804. In addition to a data bus, the bus 1804 further includes a power bus, a control bus, and a status signal bus. However, for clear description, various buses in the figure are referred to as the bus 1804.

Optionally, the memory 1803 may be used for instructions in the foregoing method embodiments. The processor 1801 may be configured to: execute instructions in the memory 1803, control a receive pin to receive a signal, and control a transmit pin to send a signal.

The apparatus 1800 may be the electronic device or a chip of the electronic device in the foregoing method embodiments.

All related content of the steps in the foregoing method embodiments may be cited in function descriptions of the corresponding functional modules. Details are not described herein again.

This embodiment further provides a computer storage medium. The computer storage medium stores computer instructions. When the computer instructions are run on the electronic device, the electronic device is enabled to perform the related method steps, to implement the camera invocation method in the foregoing embodiments.

This embodiment further provides a computer program product. When the computer program product runs on a computer, the computer is enabled to perform the foregoing related steps, to implement the camera invocation method in the foregoing embodiments.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, to enable the chip to perform the camera invocation method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

Any content of the embodiments of this application and any content of a same embodiment may be freely combined. Any combination of the foregoing content shall fall within the scope of this application.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

Methods or algorithm steps described in combination with the content disclosed in this embodiment of this application may be implemented by hardware, or may be implemented by a processor by executing a software instruction.

The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

What is claimed is:

1. A method implemented by an electronic device, wherein the method comprises:
 capturing, using a first camera of the electronic device, a first image at a first moment;
 displaying a first preview interface of a first application, wherein the first preview interface displays the first image;
 receiving a first operation;
 capturing, using the first camera, a second image at a second moment; and
 displaying a first interface at the second moment in response to the first operation,
 wherein the first moment and the second moment are different moments,
 wherein the first interface comprises a second preview interface of the first application and a third preview interface of a second application, and
 wherein the second preview interface and the third preview interface display the second image.

2. The method of claim 1, wherein the second preview interface comprises a first recording duration of the first application that starts from a third moment at which recording is started.

3. The method of claim 1, further comprising:
 obtaining first configuration information of the first application;
 configuring a first session;
 storing a first association relationship among the first session, the first application, and the first configuration information;
 obtaining second configuration information of the second application;
 configuring a second session; and
 storing a second association relationship among the second session, the second application, and the second configuration information.

4. The method of claim 3, further comprising:
 obtaining the second image ;
 determining, based on the first session, the first application and the first configuration information and;
 determining, based on the second session, the second application and the second configuration information;
 obtaining a first sub-image based on the second image and the first configuration information;
 obtaining a second sub-image based on the second image and the second configuration information;
 displaying the first sub-image in the second preview interface; and
 displaying the second sub-image in the third preview interface.

5. The method of claim 3, wherein the first configuration information indicates a first resolution, and wherein the second configuration information indicates a second resolution.

6. The method of claim 3, wherein the first configuration information indicates a first zoom ratio, and wherein the second configuration information indicates a second zoom ratio.

7. The method of claim 6, wherein the method further comprising:
 receiving a second operation;
 obtaining third configuration information of the first application in response to a the second operation, wherein the third configuration information indicates a third zoom ratio, and wherein the third zoom ratio is different from the first zoom ratio;
 storing a third association relationship among the first session, the first application, and the third configuration information;
 capturing, using the first camera, a third image at a third moment;
 obtaining the third image;
 determining, based on the first session, the first application and the third configuration information;
 determining, based on the second session, the second application and the second configuration information;
 obtaining a third sub-image based on the third image and the third configuration information;
 obtaining a fourth sub-image based on the third image and the second configuration information;
 displaying the third sub-image in the second preview interface; and
 displaying the fourth sub-image in the third preview interface.

8. The method of claim 1, further comprising:
 receiving a second operation;
 capturing, using the first camera, a third image at a third moment;
 capturing, using a second camera of the electronic device, a fourth image at the third moment, wherein the first camera is different from the second camera;
 displaying a second interface at the third moment in response to the second operation, wherein the second interface comprises a fourth preview interface of the first application and a fifth preview interface of the first application,
wherein the fourth preview interface displays the third image, and
wherein the fifth preview interface displays the fourth image.

9. The method of claim 1, further comprising:
receiving a second operation;
capturing, using the first camera, a third image at a third moment;
capturing, using a second camera of the electronic device, a fourth image at the third moment, wherein the first camera is different from the second camera;
displaying, in response to the second operation and in the second preview interface, the third image; and
displaying, in response to the second operation and in the third preview interface, the fourth image.

10. The method of claim 8, wherein the first camera is a first front-facing camera and the second camera is a first rear-facing camera, the first camera is the first front-facing camera and the second camera is a second front-facing camera, or the first camera is the first rear-facing camera and the second camera is a second rear-facing camera, wherein the first rear-facing camera is different from the second rear-facing camera, and wherein the first front-facing camera is different from the second front-facing camera.

11. The method of claim 9, wherein the third preview interface further comprises a camera switching option, and wherein the second operation is acts on the camera switching option.

12. The method of claim 1, wherein the first interface is a split screen interface comprising a second interface and a third interface, wherein the second interface comprises the second preview interface, and wherein the third interface comprises the third preview interface.

13. The method of claim 1, wherein the second preview interface or the third preview interface is a floating interface.

14. The method of claim 1, further comprising:
receiving a first sub-operation;
displaying, in response to receiving the first sub-operation, a sidebar in the first interface, wherein the sidebar comprises an application icon of the second application;
receiving a second sub-operation on the application icon; and
displaying the first interface at the second moment.

15. The method of claim 1, wherein the first application is a camera application, and wherein the second application is any one of:
a video call application;
a live broadcast application; or
a third application having a code scanning function.

16. An electronic device comprising:
a first camera configured to:
capture a first image at a first moment; and
capture a second image at a second moment, wherein the first moment and the second moment are different moments; and
one or more processors coupled to the first camera and configured to:
display a first preview interface of a first application, wherein the first preview interface displays the first image;
receive a first operation; and
display a first interface at the second moment in response to the first operation,
wherein the first interface comprises a second preview interface of the first application and a third preview interface of a second application, and
wherein the second preview interface and the third preview interface display the second image.

17. The electronic device of claim 16, wherein the second preview interface comprises a first recording duration of the first application that starts from a third moment at which recording is started.

18. The electronic device of claim 16, wherein the one or more processors are further configured to:
obtain first configuration information of the first application;
configure a first session;
store a first association relationship among the first session, the first application, and the first configuration information;
obtain second configuration information of the second application;
configure a second session; and
store a second association relationship among the second session, the second application, and the second configuration information.

19. A computer program product comprising computer-executable instructions that are stored on a non-transitory computer-readable medium and that, when executed by a processor, cause an electronic device to:
capture, using a first camera of the electronic device, a first image at a first moment;
display a first preview interface of a first application, wherein the first preview interface displays the first image;
receive a first operation;
capture, using the first camera, a second image at a second moment; and
display a first interface at the second moment in response to the first operation,
wherein the first moment and the second moment are different moments,
wherein the first interface comprises a second preview interface of the first application and a third preview interface of a second application, and
wherein the second preview interface and the third preview interface display the second image.

20. The electronic device of claim 18, wherein the one or more processors are further configured to:
obtain the second image;
determine, based on the first session, the first application and the first configuration information;
determine, based on the second session, the second application and the second configuration information;
obtain a first sub-image based on the second image and the first configuration information;
obtain a second sub-image based on the second image and the second configuration information;
display the first sub-image in the second preview interface; and
display the second sub-image in the third preview interface.

* * * * *

UNITED STATES PATENT AND TRADEMARK OFFICE
CERTIFICATE OF CORRECTION

PATENT NO.        : 12,356,066 B2
APPLICATION NO.   : 18/037719
DATED             : July 8, 2025
INVENTOR(S)       : Chang Liu Page 1 of 1

It is certified that error appears in the above-identified patent and that said Letters Patent is hereby corrected as shown below:

In the Claims

Claim 4, Column 44, Line 14: "tion and the first configuration information and;" should read "tion and the first configuration information;"

Claim 7, Column 44, Line 33: "The method of claim 6, wherein the method further" should read "The method of claim 6, further"

Claim 7, Column 44, Line 37: "application in response to a the second operation," should read "application in response to the second operation,"

Claim 11, Column 45, Line 30: "wherein the second operation is acts on the camera switch-" should read "wherein the second operation acts on the camera switch-"

Signed and Sealed this
Nineteenth Day of August, 2025

Coke Morgan Stewart
*Acting Director of the United States Patent and Trademark Office*